United States Patent
Yang

(10) Patent No.: US 7,179,194 B2
(45) Date of Patent: Feb. 20, 2007

(54) DYNAMO-ELECTRIC DRIVE UNIT CONTROLLED COMPOUND POWER SYSTEM

(76) Inventor: Tai-Her Yang, No. 59, Chung Hsing 8 St., Si-Hu Town, Dzan-Hwa (TW)

( * ) Notice: Subject to any disclaimer, the term of this patent is extended or adjusted under 35 U.S.C. 154(b) by 107 days.

(21) Appl. No.: 11/029,377

(22) Filed: Jan. 6, 2005

(65) Prior Publication Data
US 2005/0145062 A1    Jul. 7, 2005

Related U.S. Application Data

(62) Division of application No. 09/982,178, filed on Oct. 19, 2001, now Pat. No. 6,843,751.

(51) Int. Cl.
*B60K 6/02* (2006.01)
(52) U.S. Cl. .................................. 477/3; 477/5
(58) Field of Classification Search .................. 477/3, 477/5
See application file for complete search history.

(56) References Cited

U.S. PATENT DOCUMENTS

| | | | | |
|---|---|---|---|---|
| 5,193,634 A | * | 3/1993 | Masut ........................ | 74/661 |
| 5,547,433 A | * | 8/1996 | Yang ............................ | 477/5 |
| 5,644,200 A | * | 7/1997 | Yang .......................... | 180/65.2 |
| 2003/0104900 A1 | * | 6/2003 | Takahashi et al. ............. | 477/3 |

* cited by examiner

*Primary Examiner*—Sherry Estremsky
(74) *Attorney, Agent, or Firm*—Bacon & Thomas, PLLC

(57) ABSTRACT

A dynamo-electric drive unit controlled compound system includes one dynamo-electric unit, a primary and a secondary dynamo-electric unit, or more than two dynamo-electric units incorporated with an engine or other rotating device, and one or more control units including a centrifugal clutch, one-way transmission mechanism, output clutch, or related transmission mechanism, a manual control interface, a central controller, and a storage device to create a specific control pattern and to execute the operation of a specific compound power function by selection among the control units and control of drive control device operation.

15 Claims, 38 Drawing Sheets

DYNAMO-ELECTRIC DRIVE UNIT CONTROLLED COMPOUND POWER SYSTEM

This application is a divisional of U.S. patent application Ser. No. 09/982,178, filed Oct. 19, 2001, and now U.S. Pat. No. 6,843,751.

BACKGROUND OF THE INVENTION (a) Field of the Invention

The present invention relates to a dynamo-electric drive unit controlled compound system including one dynamo-electric unit, a primary and a secondary dynamo-electric unit, or more than two dynamo-electric units incorporated with an engine or other rotating device, and one or more control units including a centrifugal clutch, one-way transmission mechanism, output clutch, or related transmission mechanism, a manual control interface, a central controller and a storage device to provide a specific control pattern and to execute the operation of specific compound power function 15 by selection among the control units and control of drive control device operation.

(b) Description of the Prior Art

The present invention combines an engine, a primary dynamo-electric unit, and a transmission mechanism to create new functions that are in addition to those created by incorporating an engine with a single dynamo-electric unit as disclosed in U.S. Pat. No. 5,644,200 invented by the same inventor as the present application.

SUMMARY OF THE INVENTION

The primary purpose of the present invention is to provide a dynamo-electric drive unit controlled compound system including one dynamo-electric unit, a primary and a secondary dynamo-electric unit, or more than two dynamo-electric units incorporated with an engine or other rotating device, and one or more control units including a centrifugal clutch, one-way transmission mechanism, output clutch, or related transmission mechanism, a manual control interface, a central controller, and a storage device to create a specific control pattern and to execute the operation of a specific compound power function by selection among the control units and control of drive control device operation.

DETAILED DESCRIPTION OF THE PREFERRED EMBODIMENTS

Figure 1:
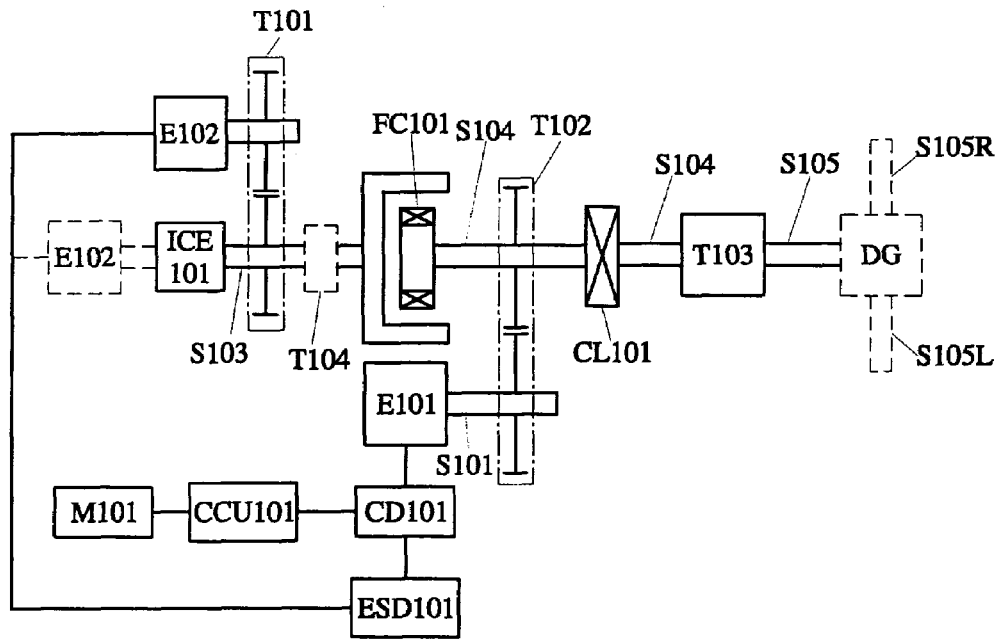
FIG. 1 is a view of a first preferred embodiment of the present invention having an application system with a centrifugal clutch as the drive control.

The present invention relates to a dynamo-electric drive unit controlled compound system including one dynamo-electric unit, a primary and a secondary dynamo-electric unit, or more than two dynamo-electric units incorporated with an engine or other rotating moment device, and one or more control units such as a centrifugal clutch, one-way transmission mechanism, or output clutch, or related transmission mechanism and a manual control interface, a central controller and a storage device arranged to create a specific control pattern and to execute the operation of a specific compound power function by selection among the control units and control of drive control device operation. The system of the invention includes centrifugal clutches comprised of one centrifugal clutch unit FC101 (FIG. 1) or two centrifugal clutch units of FC101 and FC102 engaged to each other or sharing a same structure (FIG. 2), or a double-acting centrifugal clutch to having two independent centrifugal clutch units coupled to each other by means of a transmission device. The structure includes three layers: an inner layer, an intermediate layer and an outer layer. The inner layer contains a drive power-locking unit to act outwardly when the centrifugal force reaches a preset value and is incorporated with an output shaft. The intermediate layer incorporates an engine ICE101 and has a coupling surface or an inner circumference and a drive power-locking unit on its outer side to act outwardly when the centrifugal force reaches its preset value so to couple to a power-locking inner circumference of the outer layer and thereby execute the function of an output clutch. The outer layer also is connected to the output shaft so to temporarily cut off linkage to a load when the engine runs at low rpm.

One-way transmission mechanism SWC101 is comprised of various known mechanisms that execute one-way transmission to be directly provided or jointly provided with other transmission mechanisms between a primary dynamo-electric unit E101 and a steering shaft S103 driven by engine ICE101 to transmit power at a pre-selected rotation direction in relation to the rotation part of the primary dynamo-electric unit E101 and also execute idling to interrupt the power transmission. That is, if the engine ICE101 drives clockwise (CW), the steering shaft S102 transmits power to the primary dynamo-electric unit E101; and if engine ICE101 is driven counterclockwise (CCW), power transmission is interrupted. Meanwhile, if the primary dynamo-electric unit E101 drives counterclockwise (CCW), the steering shaft S102 drives the engine ICE101 in an opposite direction; and if unit E101 is driven clockwise (CW), power transmission is interrupted. Selection of the direction for the one-way transmission mechanism SWC101 selects the rotation direction, and whether the transmission to be continued or interrupted between the engine ICE101 and the primary dynamo-electric unit E101.

The one-way transmission mechanism SWC101 is independently provided or provided at the same time as the centrifugal clutch FC101 to cause the system to exhibit various compound power characteristics. As required, the relative locations between the one-way transmission mechanism SWC101, the centrifugal clutch FC101 provided close to the side of the steering shaft S103 of the engine ICE101, and the one-way transmission mechanism provided close to the side of the primary dynamo-electric unit E101 or the centrifugal clutch. Alternatively, both the centrifugal clutch FC101 and the one-way transmission mechanism SWC101 may be provided between the steering shaft S103 of the engine ICE101 and the rotation part of the primary dynamo-electric unit, while both of the centrifugal clutch FC101 and the one-way transmission mechanism SWC101 are separately provided or share the same structure.

Primary dynamo-electric unit E101 essentially functions as a motor and also as a secondary generator. It may use series excitation or a compound winding having the characteristic that the speed becomes higher when the load gets smaller, or an AC or DC brush or brushless device that executes amperage control (including control of constant current) to generate kinetic energy of rotation that increases torque as the load increases. The dynamo-electric device may also take the form of another AC or DC, brush or brushless, synchronous or asynchronous, inner or outer rotor dynamo-electric unit.

Secondary dynamo-electric unit E102 also essentially functions as a generator and secondary motor, comprised of an inner or outer rotor rotation dynamo-electric unit that generates AC or DC using a brush or brushless structure to provide synchronous or asynchronous energy and convert kinetic energy of rotation into electric energy.

Engine ICE101 may be comprised of various known internal combustion engines, related start-up and operation speed control devices, and peripheral interface devices including fuel system, air inlet & exhaust system, ignition system and cooling system, to directly drive the steering shaft S103 or by way of a fixed speed ratio, variable speed ratio, or variable steering transmission mechanism or planetary transmission mechanism T104.

The fixed, variable speed ratio, variable steering, or planetary transmission mechanism T104 is an optional mechanism comprised of various known coaxial or non-coaxial transmissions, e.g. a fixed speed ratio, or stage or stageless variable transmission mechanism, comprised of a gear set, belt gear set, sprocket gear set, or power-locking gear set.

The optional fixed, variable speed ratio, or variable steering, or planetary transmission mechanisms T101, T102, T103 includes structures arranged to execute variable speed ratio or steering functions, comprised of a gear set, chain and sprocket gear set, power-locking gear set, planetary gear set, or other staged or variable, manual or automatic shift transmission mechanisms.

Optional output clutches CL101, CL301 are comprised of output clutches connected in series between the steering shaft S104 on the load side and the load, and are controlled by manual, mechanical, electromagnetic or hydraulic, or centrifugal force.

Optional differential gear set DG is comprised of a gear or power-locking gear arranged to receive rotational kinetic energy inputted by a steering shaft S105 for driving two differential steering shafts S105R and S105L.

Storage discharging device ESD101 is comprised of a (dis)chargeable secondary battery or super capacitor.

Central control unit CCU101 is comprised of mechanical-electric or solid-state electronic devices, or a digital or analog central control circuit comprised of a micro-processor and related software subject to operation and setup via a manual control interface M101 to control the operation of the system.

Drive control device CD101 is controlled by the manual control interface M101 and the central control unit CCU101 to operate both dynamo-electric units as motors and execute control of startup, stop, speed variation or positive/negative rotation and torque, or as generators to control power generation voltage, amperage, frequency and power performance, input of charging energy to the storage discharging device ESD101, and output of electric energy from the storage discharging device ESD101.

Finally, manual control interface M101 is a digital or analog manual control interface comprised of mechanical-electric or solid-state electronic circuitry to control the operation of the system via the central control unit CCU101 by manual operation.

By combining those devices and mechanisms described above, the present invention executes some or all of the following functions:

(1) the primary dynamo-electric unit functions as a starting motor, and causes the activating side of the centrifugal clutch to close and start the engine.
(2) the secondary dynamo-electric unit also can function as a starting motor to start the engine;
(3) once the engine starts, the load is driven by controlling the operation of the centrifugal clutch, a manual, mechanical, electromagnetic, or hydraulic force controlled power-locking clutch, or a hydraulic force coupled type clutch;
(4) in addition to driving the load, the running engine continues to cause the secondary dynamo-electric unit to operate as a generator for driving the primary dynamo-electric unit to jointly drive the load or to charge the storage discharging device ESD101;
(5) the engine runs to drive the load while the primary dynamo-electric unit functions as amotor with electric energy supplied from the storage discharging device ESD101 to jointly drive the load;
(6) during the down time of the primary dynamo-electric unit, the engine runs to drive the secondary dynamo-electric unit to function as a generator so to charge the storage discharging device ESD101 or output electric energy to other loads;
(7) the running engine drives the secondary dynamo-electric unit to generate power for driving the primary dynamo-electric unit to further drive the load, to simultaneously charge the batteries, or to output electric energy to other loads;
(8) the primary dynamo-electric unit drives the load at low speed as controlled by the electric energy supplied from the storage discharging device via a drive control device while the engine is not running;
(9) the electric energy drive includes regenerative braking either by the primary or the secondary dynamo-electric units, or both at the same time, the engine becoming a braking resistance when the centrifugal clutch closes once the sliding speed exceeds the preset value; or
(10) any related functions provided by other structures as described above.

Additional to providing those functions as described in the preceding subparagraphs (1) through (10), preferred embodiments of the application system with drive control by the centrifugal clutch FC101 essentially operates in the following patterns A1, A2 and A3:

A1: with the system on standby and the engine not running, the manual control interface M101 initiates acceleration of the system by starting the primary dynamo-electric unit E101, which executes low speed drive operation to drive the load until the centrifugal clutch FC101 is closed, at which time the engine starts and causes the secondary dynamo-electric unit E102 to generate electricity or stop generation as required.

Once the manual control interface M101 is executing acceleration on the throttle of the engine and a centrifugal clutch FC102 is provided for the system, the centrifugal clutch FC102 is closed to cause the steering shaft S104 on the load side to drive the load; or the closed centrifugal clutch FC101 is used to cause the steering shaft S104 on the load side to further drive the load.

As the manual control interface M101 increases to accelerate the throttle, the engine rpm is further promoted to increase the power to drive the load, at which time the primary dynamo-electric unit E101 may stop transmitting power or convert to function as a generator, or may input electric energy to operate as a motor to provide parallel kinetic energy for the engine ICE101.

A2: With the system on standby, the engine also is on standby at low speed or is driving a peripheral load, e.g. an air conditioner or secondary air pump, and the secondary dynamo-electric unit E102 generates electricity or stops generation.

When the manual control interface M101 starts to accelerate the system, the primary dynamo-electric unit E101 is activated o execute drive operation at low speed to drive the load.

Once the manual control interface M101 causes acceleration of the primary dynamo-electric unit E101 by controlling the electric energy supplied from the storage discharging device ESD101 or a generator, the manual control interface M101 synchronously accelerates the throttle on the engine. If the system is provided with a centrifugal clutch FC102, the engine rpm increases until the centrifugal clutch FC102 is closed to cause the steering shaft S104 on the load to drive the load, or the centrifugal clutch FC102 connects the engine in parallel to drive the load when the primary dynamo-electric unit E101 accelerates until the centrifugal clutch FC101 is closed.

As the manual control interface M101 increases to accelerate the throttle, the engine rpm is further promoted to increase the power to drive the load, and the primary dynamo-electric unit E101 may stop transmitting power or convert to function as a generator, or input electric energy to operate as a motor to provide parallel kinetic energy for the engine ICE101.

A3: With the system on standby, the engine also is on standby at constant speed or is driving a peripheral load, e.g. an air conditioner or secondary air pump, and the secondary dynamo-electric unit E102 generates electricity or stops generation;

When the manual control interface M101 starts to accelerate the system by controlling the electric energy supplied from the storage discharging device ESD101 or a generator, the manual control interface M101 synchronously accelerates the throttle on the engine. If the system is provided with a centrifugal clutch FC102, the engine rpm increases until the centrifugal clutch FC102 is closed to cause the steering shaft S104 on the load side to drive the load, or the centrifugal clutch FC102 connects the engine in parallel to drive the load when the primary dynamo-electric unit E101 accelerates until the centrifugal clutch FC102 is closed.

Based on the basic configuration and the application of its operation, multiple preferred embodiments of a compound power system controlled by a drive dynamo-electric unit speed of the present invention are described as follows:

A. FIGS. 1 through 8 shows applications of the system having the centrifugal clutch FC101 as the drive control for the compound power system controlled by a drive dynamo-electric unit speed of the present invention.

FIG. 1 shows a first preferred embodiment of the present invention having a centrifugal clutch as the drive control, essentially comprised of a centrifugal clutch FC101 provided between a steering shaft S103 driven by an engine ICE101 and another steering shaft on the load side S104 for controlling both the steering shaft S103 and another steering shaft S104 20 on the load side to couple or interrupt transmission. The steering shaft S103 driven by the engine ICE101 is coupled to the driven side of the centrifugal clutch FC101 while another steering shaft S104 on the load side is coupled to the drive side of the centrifugal clutch FC101 so that once the steering shaft S104 on the load side reaches the preset rpm, it closes the centrifugal clutch FC101, thus causing the steering shaft S103 to be directly driven by the engine ICE101, or to be driven by engine ICE101 through a fixed or variable speed ratio device, a variable steering device, or a planetary transmission mechanism T104. The steering shaft S104 on the load side is provided to drive the load, and a fixed or variable speed ratio, or variable steering, transmission mechanism T102 is connected to the steering shaft S104 on the load side to engage in mutual transmission with a primary dynamo-electric unit E101.

The load side steering shaft S104 is directly outputted to the load, or alternatively, to an output clutch CL101 controlled by manual, mechanical, electromagnetic, hydraulic or centrifugal force before being directly outputted to the load, or as required, to provide a single shaft output through a fixed speed ratio, variable speed ratio, or variable steering transmission, or a planetary transmission mechanism T103, and then through a steering shaft S105, or through an optional transmission mechanism comprised of a differential gear set DG for differential output through two units of differential steering shafts S105R and S105L.

The engine ICE101 is comprised of any of a variety of known internal combustion engines and related start-up, operation speed control, and peripheral interface devices including a fuel system, air inlet and exhaust system, ignition system and cooling system, to directly drive the steering shaft S103, or to drive shaft S103 by way of a fixed or variable speed ratio, or variable steering transmission mechanism, or a planetary transmission mechanism T104.

The fixed or variable speed ratio, transmission or variable steering transmission, or planetary transmission mechanism T104 is an optional mechanism comprised of various known coaxial or non-coaxial transmissions, e.g. a fixed speed ratio multi stage or stageless variable transmission mechanism comprised of a gear set, belt gear set or sprocket gear set or power-locking gear set.

The primary dynamo-electric unit E101 essentially functions as a motor and also as a secondary generator. It may use series excitation or a compound type winding having the characteristic that the speed becomes higher when the load gets smaller, or an AC or DC brush or brushless device that executes amperage control (including control of constant current) to generate kinetic energy of rotation that increases torque as the load increases. The dynamo-electric device may also take the form of another AC or DC, brush or brushless, synchronous or asynchronous, inner or outer rotor dynamo-electric unit. The primary dynamo-electric unit is coupled to the load side steering shaft S104 and to the drive side of the centrifugal clutch FC101 by means of a fixed or variable speed ratio transmission, variable steering transmission or planetary transmission mechanism T102.

The secondary dynamo-electric unit E102 also essentially functions as a generator and as a secondary motor, comprised of an inner or outer rotor rotation dynamo-electric unit that generates AC or DC using a brush or brushless structure to provide synchronous or asynchronous energy and convert kinetic energy of rotation into electric energy. The secondary dynamo-electric unit E102 is coupled to the steering shaft S103 driven by the engine ICE101 and the driven side of the centrifugal clutch FC102 by means of a fixed or variable speed ratio transmission variable steering transmission, or planetary transmission mechanism T101, or the secondary dynamo-electric unit E102 is directly coupled to the steering shaft S103 of the engine.

The combination of those structures described above for the system are subject to control by the manual control interface M101, the central control unit CCU101, the drive control device CD101 and the storage discharging device ESD101. The specific system structure described above provides functions related to those described in subparagraphs (1) through (10) or other specific function, and also provides patterns related to those operation patterns described in A1 through A3 or other specific operation pattern.

Figure 2:
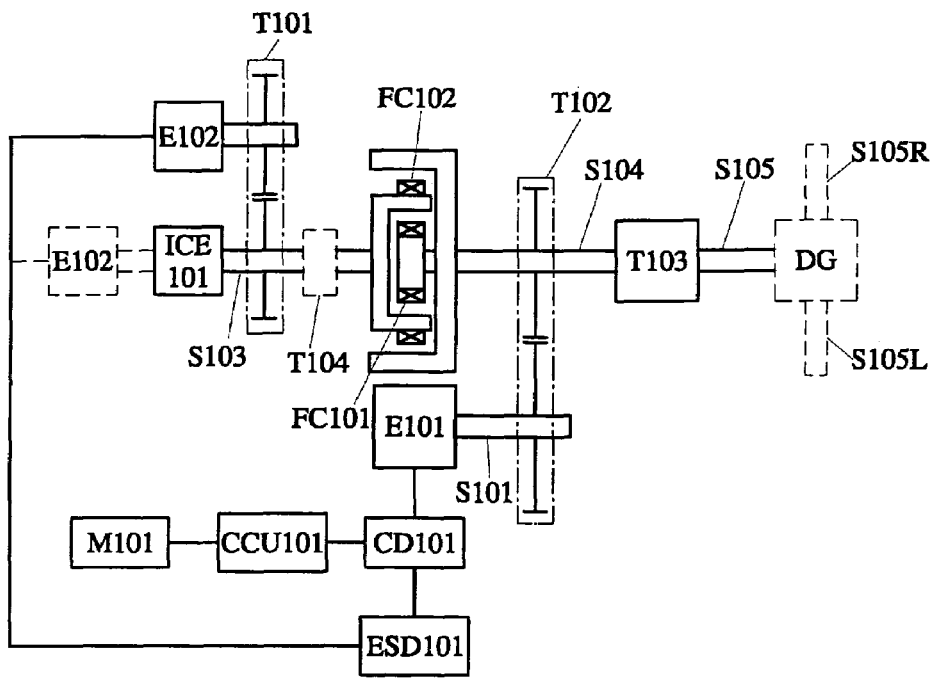
FIG. 2 is a view of a second preferred embodiment of the present invention having an application system with a centrifugal clutch as the drive control.

FIG. 2 shows a second preferred embodiment of the present invention having an application system with a centrifugal clutch as the drive control. A centrifugal clutch FC101 is connected in series to another centrifugal clutch FC102 between the steering shaft S103 and the drive load side steering shaft 5104 of the engine ICE101. The double acting centrifugal clutches FC101 and FC102 may be integrated into a 3-layer structure containing an inner layer, an intermediate layer and an outer layer. The inner layer and the inner side of the intermediate layer form the centrifugal clutch FC101, the inner layer being connected to the load side steering shaft S104 and provided with a drive power-locking unit to act outwardly when the centrifugal force reaches a preset value. The outer side of the intermediate layer and the inner side of the outer layer form the centrifugal clutch FC102. The intermediate layer is coupled to the steering shaft S103 driven by the engine having its inner side provided with a circumferential coupling surface for power-locking and its outer side provided with a drive power-locking unit acting outwardly when the centrifugal force reaches its preset value performs the functions as an output clutch with the power-locking circumferential coupling surface on the inner side of the outer layer. The outer layer is also incorporated with the load side steering shaft S104 so to provide linkage with the load when the engine runs at low rpm or is temporarily cut off. The steering shaft S103 is either directly driven by the engine or driven by the engine through a fixed variable speed ratio transmission, variable steering transmission mechanism, or planetary transmission mechanism T104, and is coupled to the driven side of the centrifugal clutch FC101 and the load side steering shaft S104 is coupled to the drive side of the centrifugal clutch FC101 so as to close the centrifugal clutch FC101 and further cause the steering shaft S103 to be driven by the engine ICE101 when the load side steering shaft S104 reaches its preset rpm. Alternatively, a fixed speed or variable speed ratio transmission, variable steering transmission mechanism, or planetary transmission mechanism T102 may be provided on the load side steering shaft S104 to engage in mutual transmission with the primary dynamo-electric unit.

The load side steering shaft S104 is directly outputted to the load, or alternatively, to an output clutch CL101 controlled by manual, mechanical, electromagnetic, hydraulic or centrifugal force before being outputted to the load or, as required, to provide a single shaft output through a fixed or variable speed ratio transmission, variable steering transmission, or planetary transmission mechanism T103, and then through a steering shaft S105, or through an optional transmission mechanism comprised of a differential gear set DG for differential output through two units of differential steering shafts S105R and S105L.

The engine ICE101 is comprised of any known internal combustion engine and related start-up, operation speed control, and peripheral interface devices including fuel system, air inlet and exhaust system, ignition system and cooling system to directly drive the steering shaft S103 or to drive the steering shaft S103 by way of a fixed or variable speed ration transmission, variable steering transmission mechanism, or planetary transmission mechanism T104.

The fixed or variable speed ratio transmission, variable steering transmission, or planetary transmission mechanism T104 is an optional mechanism comprised of various known coaxial or non-coaxial transmissions, e.g. a fixed speed ratio or multistage or stageless variable transmission mechanism comprised of a gear set, belt gear set or sprocket gear set or power-locking gear set.

The primary dynamo-electric unit E101 essentially functions as a motor and also as a secondary generator. It may use series excitation or a compound type winding having the characteristic that the speed becomes higher when the load gets smaller; or an AC or DC brush or brushless device that executes amperage control (including control of constant current) for the input electric energy to generate kinetic energy of rotation mechanical that increases torque as the load increases. The dynamo-electric device may also take the form of another AC or DC, brush or brushless, synchronous or asynchronous, inner or outer rotor dynamo-electric unit. The primary dynamo-electric unit E101 is coupled to the load side steering shaft S104 and to the drive side of the centrifugal clutch FC101 by means of a fixed or variable speed ratio transmission, variable steering transmission, or planetary transmission mechanism T102.

The secondary dynamo-electric unit E102 also essentially functions as a generator and as a secondary motor, comprised of an inner or outer rotor rotation dynamo-electric unit that generates AC or DC using a brush or brushless structure to provide synchronous or asynchronous energy to convert kinetic energy of rotation into electric energy. The secondary dynamo-electric unit E102 is coupled to the steering shaft S103 driven by the engine ICE101 and the driven side of the centrifugal clutch FC102 by means of a fixed or variable speed ratio transmission, variable steering transmission, or planetary transmission mechanism T101, or the secondary dynamo-electric unit E102 is directly coupled to the steering shaft S103 of the engine.

The combination of those structures described above for the system are subject to control by the manual control interface M101, the central control unit CCU101, the drive control device CD101 and the storage discharging device ESD101. The specific system structure described above provides functions related to those described in subparagraphs (1) through (10) or other specific function It also provides patterns related to those operation patterns described in A1 through A3 or other specific operation pattern.

Figure 3:
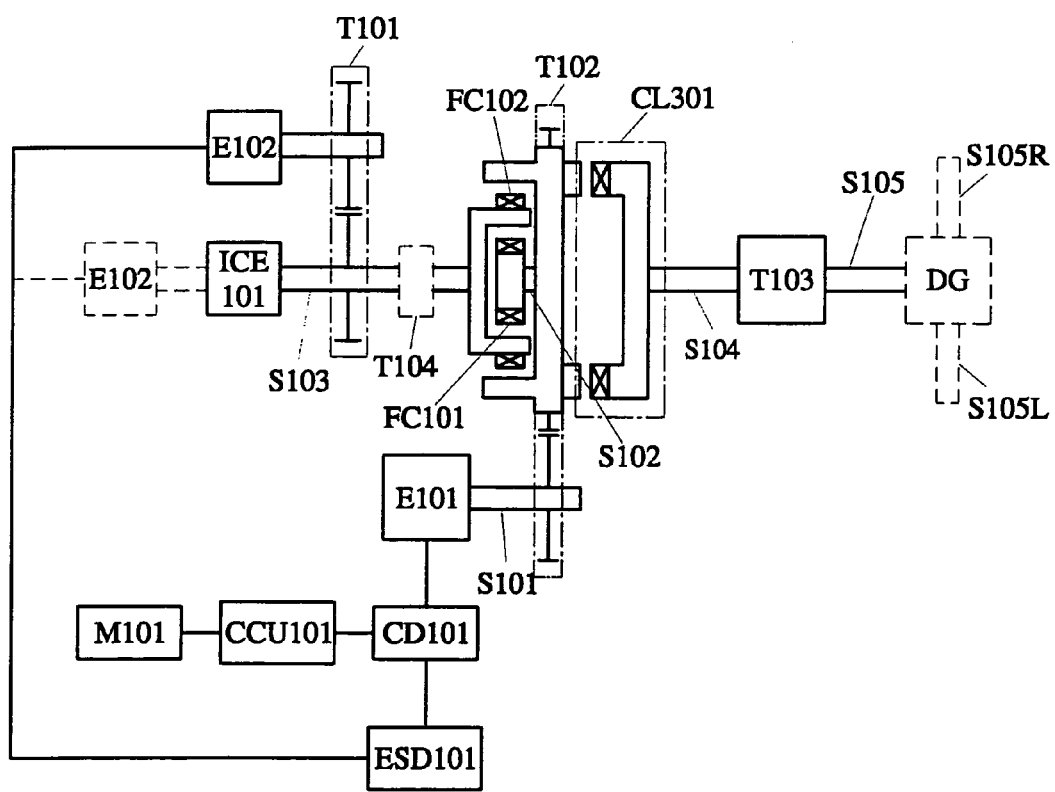
FIG. 3 is a view of a third preferred embodiment of the present invention having an application system with a centrifugal clutch as the drive control.

FIG. 3 shows a third preferred embodiment of the present invention having an application system with a centrifugal clutch as the drive control, in which an intermediate steering shaft S102 is coupled to the fixed or variable speed ratio transmission, variable steering transmission mechanism, or planetary transmission mechanism T102. The power-locking coupling surface on the outer circumference of the double-acting centrifugal clutch FC101 and the outer circumference power-locking surface of the double-acting centrifugal clutch FC102 function in the same manner as in the preferred embodiment as illustrated in FIG. 2. Those double-acting centrifugal clutches are comprised of two units of centrifugal clutches FC101 and FC102 incorporated to form a three-layer structure containing inner, intermediate and outer layers. The inner layer and the inner side of the intermediate layer form the centrifugal clutch FC101. The inner layer and the inner side of the intermediate layer incorporated with the intermediate steering shaft S102 are provided with a drive power-locking unit to act outwardly when the centrifugal force reaches a preset value. The outer side of the intermediate layer and the inner side of the outer layer form the centrifugal clutch FC102. The intermediate layer is coupled to the steering shaft S103 driven by the engine having its inner side provided with circumferential coupling surface for power-locking and its outer side provided with a drive power-locking unit acting outwardly when the centrifugal force reaches its preset value to perform the function of an output clutch in combination with the power-locking circumferential coupling surface on the inner side of the outer layer. The outer layer is also incorporated with the intermediate steering shaft S102 so as to provide linkage with the load when the engine runs at low rpm or is temporarily cut off. The steering shaft S103 is either directly driven or driven through a fixed or variable speed ratio transmission, variable steering transmission mechanism, or planetary transmission mechanism T104 by the engine and is coupled to the driven side of the centrifugal clutch FC101, the intermediate steering shaft S102 being coupled to the drive side of the centrifugal clutch FC101 so as to forthwith close the centrifugal clutch FC101 and further to cause the steering shaft S103 to be driven by the engine when the intermediate steering shaft S102 reaches its preset rpm.

The intermediate steering shaft S102, is directly outputted to the load, or alternatively, to an output clutch CL301 controlled by manual, mechanical, electromagnetic, hydraulic or centrifugal force before being outputted to the load or, as required, to execute single shaft output through a fixed or variable speed ratio transmission, variable steering transmission, or planetary transmission mechanism T103, then through a steering shaft S105, or through an optional transmission mechanism comprised of a differential gear set DG for differential output through two units of differential steering shafts S105R and S105L. The additional output clutch CL301 is provided between the intermediate steering shaft S102 and the load side steering shaft 5104 with both steering shafts driven by the power-locking coupling surfaces on the inner and outer circumferences of the double-acting centrifugal clutches FC101 and FC102.

The engine ICE101 is comprised of any of various known internal combustion engines and related start-up, operation speed control, and peripheral interface devices including fuel system, air inlet and exhaust system, ignition system and cooling system to directly drive the steering shaft S103, or is driven by way of a fixed or variable speed ratio transmission, variable steering transmission mechanism, or planetary transmission mechanism T104.

The fixed or variable speed ratio transmission, variable steering transmission, or planetary transmission mechanism T104 is an optional mechanism comprised of various known coaxial or non-coaxial transmissions, e.g. a fixed speed ratio or multistage or stageless variable transmission mechanism comprised of a gear set belt gear set or sprocket gear set or power-locking, gear set.

The primary dynamo-electric unit E101 essentially functions as a motor and also as a secondary generator, as described above. In this embodiment, the primary dynamo-electric unit E101 is coupled to the intermediate steering shaft S102, which in turn is incorporated to the centrifugal clutch FC101 by means of a fixed or variable speed ratio transmission, variable steering transmission, or planetary transmission mechanism T102.

The secondary dynamo-electric unit E102 also essentially functions as a generator and secondary motor as described above. In this embodiment, the secondary dynamo-electric unit E102 is coupled to the centrifugal clutch FC101 and the steering shaft S103 of the engine ICE101 by means of a fixed or variable speed ratio transmission, variable steering transmission, or planetary transmission mechanism T101, or the secondary dynamo-electric unit E102 is directly coupled to the steering shaft S103 of the engine.

The combination of those structures described above for the system is subject to control by the manual control interface M101, the central control unit CCU101, the drive control device CD101 and the storage discharging device ESD101, and provides the same functions as those by the preferred embodiment illustrated in FIG. 2 when the output clutch CL301 is closed; and additional functions when the output clutch CL301 is disengaged, including those functions related to subparagraphs (1) through (10) or other specific functions, and patterns related to those operation patterns described in A1 through A3 or other specific operation patterns.

Figure 4:
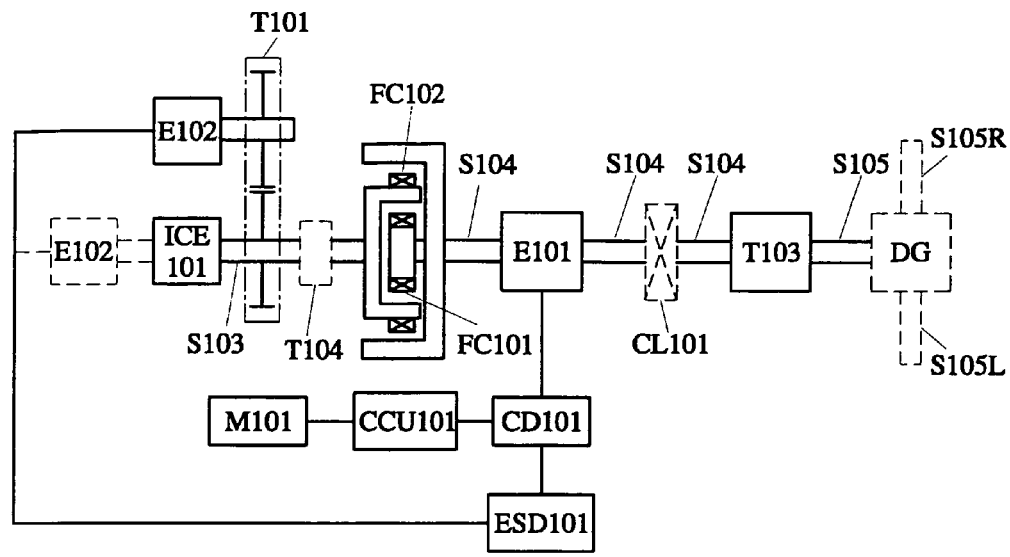
FIG. 4 is a view of a fourth preferred embodiment of the present invention having an application system with a centrifugal clutch as the drive control.

FIG. 4 shows a fourth preferred embodiment of the present invention having an application system with a centrifugal clutch as the drive control, in which the dynamo-electric unit E101 and the load side steering shaft S104 form a coaxial structure. A structure of the double-acting centrifugal clutches FC101 and FC102 provided between the dynamo-electric unit E101 and the engine ICE101 has its inner layer and outer layer incorporated to the load side steering shaft S104 coupled to the output shaft of the primary dynamo-electric unit E101 and its intermediate layer incorporated to the steering shaft S103 driven by the engine ICE101. The double-acting centrifugal clutches are comprised of two centrifugal FC101 and FC102 combined to form a three-layer structure containing inner, the intermediate and the outer layers. The inner layer and the inner side of the intermediate layer form the centrifugal clutch FC101, the inner layer and the inner side of the intermediate layer are incorporated to the intermediate steering shaft S102 and provided with a drive power-locking unit to act outwardly when the centrifugal force reaches a preset value. The outer side of the intermediate layer and the inner side of the outer layer form the centrifugal clutch FC102. The intermediate layer is coupled to the steering shaft S103 driven by the engine, and has its inner side provided with a circumferential coupling surface for power-locking and its outer side provided with a drive power-locking unit acting outwardly when the centrifugal force reaches its preset value to function as an output clutch with the power-locking circumferential coupling surface on the inner side of the outer layer. The outer layer is also incorporated to the load side steering shaft 5104 so to provide linkage with the load when the engine runs at low rpm or is temporarily cut off. The ICE101 is directly driven, or driven through a steering shaft S103, by a fixed or variable speed ratio transmission, variable steering transmission mechanism, or planetary transmission mechanism T104, and the load side steering shaft S102 is incorporated with the drive side of the centrifugal clutch FC101 so as to forthwith close the centrifugal clutch FC101 and further to cause the steering shaft S103 to be driven by the engine ICE101 when the load side steering shaft S102 reaches its preset rpm.

The engine ICE101 is comprised of various known internal combustion engines as described above to directly drive the steering shaft S103, or by way of a fixed or variable speed ratio transmission, variable steering transmission mechanism, or planetary transmission mechanism T104.

The fixed or variable speed ratio transmission, variable steering transmission, planetary transmission mechanism T104 or optional mechanism as described above.

The primary dynamo-electric unit E101 again functions as a motor and secondary generator as described above, and is coupled to the load side steering shaft S104 and to the drive side of the centrifugal clutch FC101 by means of a fixed or variable speed ratio transmission, variable steering transmission, or planetary transmission mechanism T102. The load side steering shaft S104 is forthwith outputted to the load, or as required, provides uniaxial output through a selected fixed or variable speed ratio transmission, variable steering transmission mechanism, or planetary transmission mechanism T103 through the steering shaft S105, or alternatively, through a transmission mechanism comprised of a differential gear set DG to execute differential output through two units of differential steering shafts S105R and S105L.

The secondary dynamo-electric unit E102 essentially functions as a generator and secondary motor, as described above, and is coupled to the steering shaft S103 of the engine ICE101 and the centrifugal clutch FC101 by means of a fixed or variable speed ratio transmission, variable steering transmission, or planetary transmission mechanism T101, or the secondary dynamo-electric unit E102 is directly coupled to the steering shaft S103 of the engine.

The output clutch CL101 is an optional mechanism provided between the output side of the primary dynamo-electric unit E101 and the transmission mechanism T103, is controlled by manual, mechanical, electromagnetic or hydraulic or centrifugal force.

The combination of those structures described above for the system are subject to control by the manual control interface M101, the central control unit CCU101, the drive control device CD101 and the storage discharging device ESD101. The specific system structure described above provides functions related to those described in subparagraphs (1) through (10) or other specific function, and also provides patterns related to those operation patterns described in A1 through A3, or other specific operation pattern.

Figure 5:
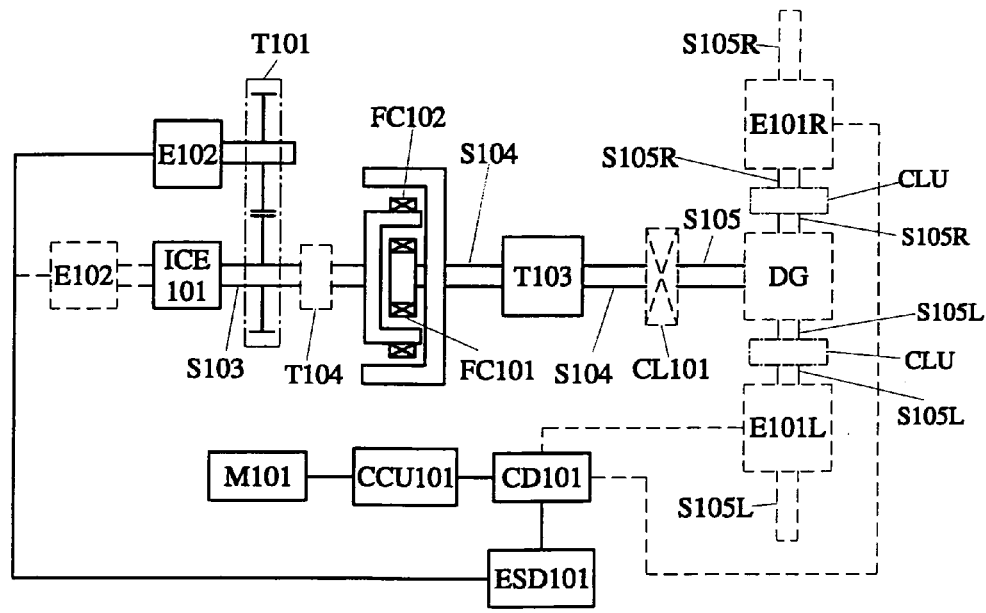
FIG. 5 is a schematic view showing that a first dynamo-electric unit from the fourth preferred embodiment of the present invention is replaced by two independent dynamo-electric unit units respectively provided by the side of two output shafts from the differential gear unit.

FIG. 5 is a schematic view of the preferred embodiment of the present invention taken from FIG. 4, wherein the primary dynamo-electric unit is replaced with two dynamo-electric units respectively provided on the output shaft sides of the differential gear set. The primary dynamo-electric unit E101 in the preferred embodiment to illustrated in FIG. 4 is replaced by a primary dynamo-electric unit E101R to the right and another primary dynamo-electric unit E101L on the left. The primary dynamo-electric unit E101R is directly connected in series with a steering shaft S105R to the right of a differential gear set DG or alternatively adapted with a one-way or two-way clutch CLU before being connected in series to the steering shaft S105R to the right of the differential gear set DG. The other primary dynamo-electric unit E101 is directly connected in series with a steering shaft S105L to the left of a differential gear set DG or alternatively adapted with a one-way or two-way clutch CLU before being connected in series to the steering shaft S105L to the left of the differential gear set DG. The steering shaft S104 on the load side of the centrifugal clutch FC101 is directly outputted to the steering shaft S105 of the differential gear set DG, or through the fixed or variable speed ratio transmission, variable steering transmission, or planetary transmission mechanism T103 before being outputted to the steering shaft S105 of the differential gear set DG, or alternatively, by means of the output clutch CL101 controlled by manual, mechanical, electromagnetic, hydraulic or centrifugal force before being outputted to the steering shaft S105 of the differential gear set DG. Both of the primary dynamo-electric units E101R and E101L are subject to equal speed or differential drive by the drive control device CD101.

Figure 6:
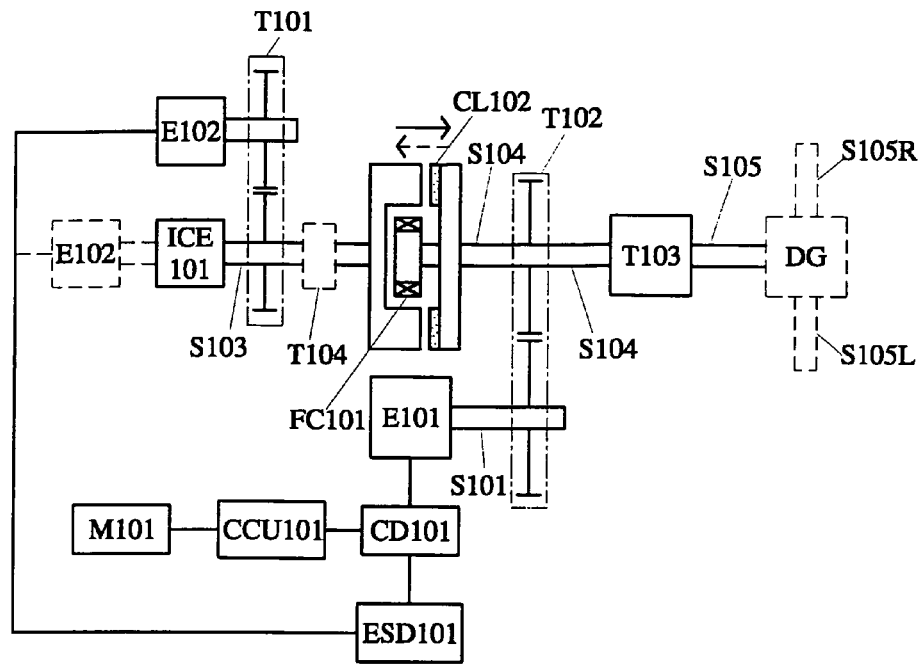
FIG. 6 is a view showing that the first preferred embodiment of the present invention is provided with a controllable clutch.

FIG. 6 is a view showing that the first preferred embodiment of the present invention as illustrated in FIG. 1 is provided with a controllable clutch. The centrifugal clutch FC101 and another clutch CL102 controlled by manual, mechanical, electromagnetic, hydraulic power-locking or hydraulic coupling type are provided between the engine steering shaft S103 and the load side steering shaft 5104 so as to execute power coupling or interruption with respect to both the engine steering shaft S103 and the load side steering shaft S104. Because the system is equipped with a power-locking type or hydraulic coupling type controllable clutch CL102 and engine throttle, it acquires another specific function for the engine rotation power driven load in that the steering shaft S103 may either be directly driven by the engine ICE101, or through transmission mechanism T104 as described above, which is coupled to the driven side of the centrifugal clutch FC101 while the load side steering shaft S104 is coupled to the drive side of the centrifugal clutch FC101. That is, once the load-side steering shaft S104 reaches the preset rpm, the centrifugal clutch FC101 is forthwith closed to cause the steering shaft S103 to be driven by the engine ECE101. The centrifugal clutch FC101 and the controllable clutch CL102 are individually provided or share the same structure.

In this embodiment, the engine ICE101 may again be any of a variety of known internal combustion engines and related devices, as described above, to directly drive the steering shaft S103 or byway of transmission mechanism or planetary transmission mechanism T104;

The transmission mechanism T104 may again, be comprised of various known coaxial or non-coaxial transmissions, as described above.

The primary dynamo-electric unit E101 again functions as a motor and secondary generator, as described above, but in this embodiment the steering shaft S101 of the primary dynamo-electric unit E101 is coupled to the load side steering shaft S104 of the centrifugal clutch FC101 by means of transmission mechanism T102.

The secondary dynamo-electric unit E102 also essentially functions as a generator and secondary motor, as described above and is coupled to the steering shaft 5103 of the engine ICE101 and the centrifugal clutch FC101 by means transmission mechanism T101, or the secondary dynamo-electric unit E102 is directly coupled to the steering shaft S103 of the engine.

The combination of those structures described above for the system are subject to control by the manual control interface M101, the central control unit CCU101, the drive control device CD101 and the storage discharging device ESD101. The specific system structure described above provides functions related to those described in subparagraphs (1) through (10) or other specific function, and also provides patterns related to those operation patterns described in A1 through A3 or other specific operation pattern.

Figure 7:
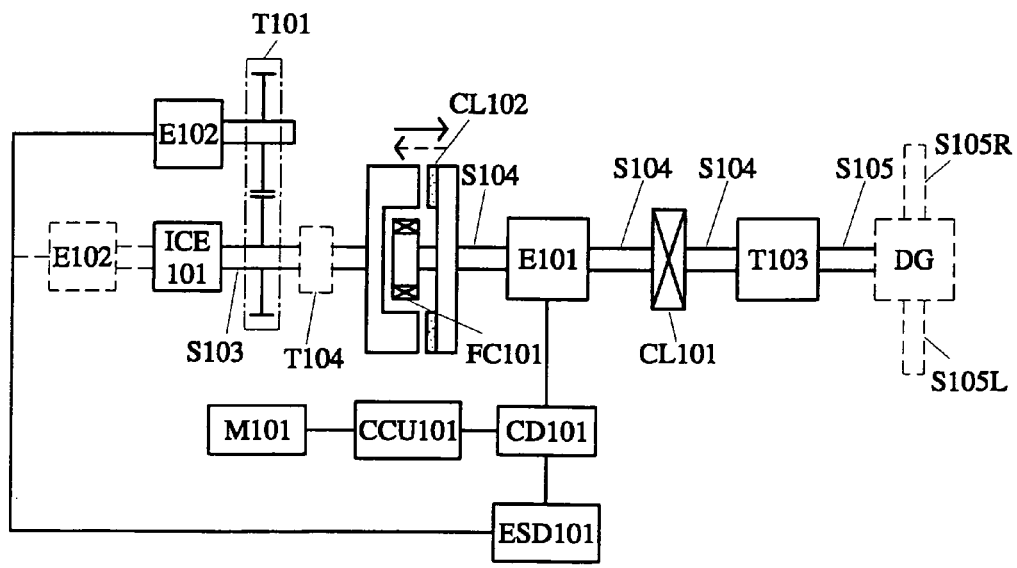
FIG. 7 is a view showing that the first preferred embodiment given in FIG. 6 is provided with an output clutch.

FIG. 7 is a view showing that the preferred embodiment given in FIG. 6 is provided with an output clutch CL101 controlled by manual, mechanical, electromagnetic, and hydraulic or centrifugal force. The output clutch CL101 is provided between the load side steering shaft S104 driven by the primary dynamo-electric unit E101 and the load. When the output clutch CL101 is closed, it provides the same function as the preferred embodiment illustrated in FIG. 6; and additional functions when the output clutch CL101 is disengaged, including being separated from the load to permit the engine to simultaneously drive the first and the second dynamo-electric units E101 and E102 to function as generators, or to drive the primary dynamo-electric E101 alone to operate as a generator while the primary dynamo-electric unit E101 is provided between the output clutch CL101 and the controllable to clutch CL102; as well as those functions related to subparagraphs (1) through (10) or other specific is function, and patterns related to those operation patterns described in A1 through A3 or other specific operation pattern.

Figure 8:
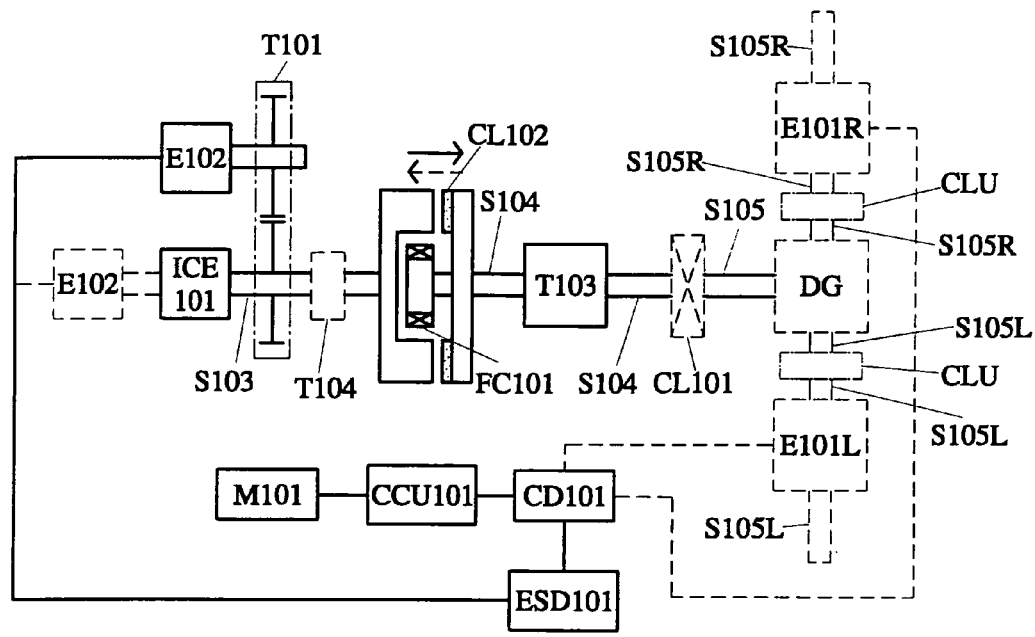
FIG. 8 is a schematic view of a preferred embodiment showing that the primary dynamo-electric unit given in FIG. 7 is further replaced by two independent dynamo-electric units respectively provided by the side of two output shafts from the differential gear unit.

FIG. 8 is a schematic view showing a variation of the preferred embodiment illustrated in FIG. 7 in which the primary dynamo-electric unit is replaced by two independent dynamo-electric units respectively provided on the side of two output shafts of a differential gear set. The primary dynamo-electric unit E101 of the preferred embodiment in FIG. 7 is replaced by a primary dynamo-electric unit E101R to the right and another primary dynamo-electric unit E101L on the left. The primary dynamo-electric unit E101R to the right is directly connected in series with the steering shaft S105R to the right of the differential gear set DG, or alternatively, a one-way or two-way clutch alternatively adapted with a one-way or two-way clutch CLU before being connected in series to the steering shaft S105R to the right of the differential gear set DG. The other primary dynamo-electric unit E101L on the left is directly connected in series with a steering shaft S105L to the left of a differential gear set DG or alternatively adapted with a one-way or two-way clutch CLU before being connected in series to the steering shaft S105L to the left of the differential gear set DG. The steering shaft S104 on the load side of the centrifugal clutch FC101 is directly outputted to the steering shaft S105 of the differential gear set DG, or through the transmission mechanism T103 before being outputted to the steering shaft S105 of the differential gear set DG, or alternatively, connected by means of the output clutch CL101 before being outputted to the steering shaft S105 of the differential gear set DG. Both the primary dynamo-electric unit E101R to the right and the other primary dynamo-electric unit E101L on the left are subject to equal speed or differential drive by a drive control device CD101 to provide the same functions as those of the preferred embodiment given in FIG. 7.

FIGS. 9 through 21 show variations of the preferred embodiments illustrated in FIGS. 1 through 8 having centrifugal clutches disposed between the steering shaft 103 driven by the engine ICE101 and the load side steering shaft 5104 and arranged in opposite directions to provide drive controlled application systems.

Figure 9:
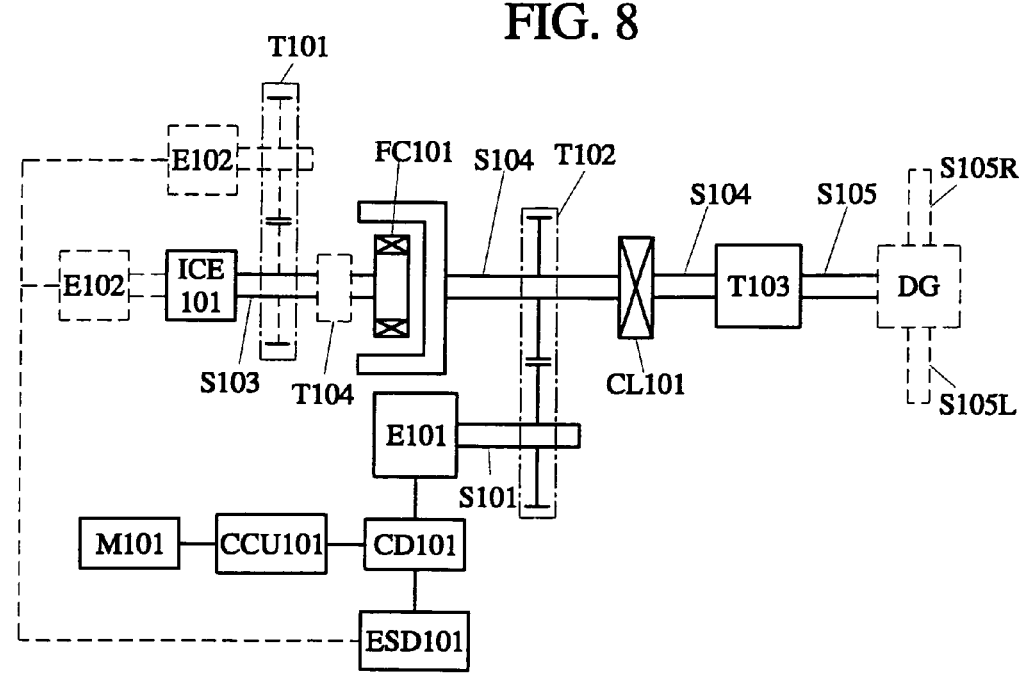
FIG. 9 is a view of a first preferred embodiment of the present invention having a centrifugal clutch as the drive control provided opposite to the acting direction.

FIG. 9 shows a first preferred embodiment of a drive controlled application system in which the centrifugal clutch FC101 is provided between the steering shaft S103 driven by the engine ICE101 and the load side steering shaft S104 to control the operation of coupling or interruption the transmission by both of the steering shafts S103 and S104.

The steering shaft S103 driven by the engine ICE101 is coupled to the drive side of the centrifugal clutch FC101, and the load side steering shaft S104 is coupled to the driven side of the centrifugal clutch FC101 so that once the steering shaft S103 which is directly driven by the engine ICE101 or through a transmission mechanism T104 reaches the preset rpm, it drives to close the centrifugal clutch FC101 and couple the load side steering shaft S104. The steering shaft S104 on the load side is provided to drive the load, and a fixed speed ratio or variable speed ratio or variable steering transmission mechanism T102 is provided on the steering shaft S104 on the load side to engage in mutual transmission with a primary dynamo-electric unit E101.

The load side steering shaft S104, engine ICE101, transmission mechanism T104, primary dynamo-electric unit E101, and secondary dynamo-electric unit E102 function in the same manner as described above in connection with FIG. 2.

The combination of those structures described above for the system are subject to control by the manual control interface M101, the central control unit CCU101, the drive control device CD101 and the storage discharging device ESD101. The specific system structure described above provides functions related to those described in subparagraphs (1) through (10) or other specific function, and also provides patterns related to those operation patterns described in A1 through A3 or other specific operation pattern.

Figure 10:
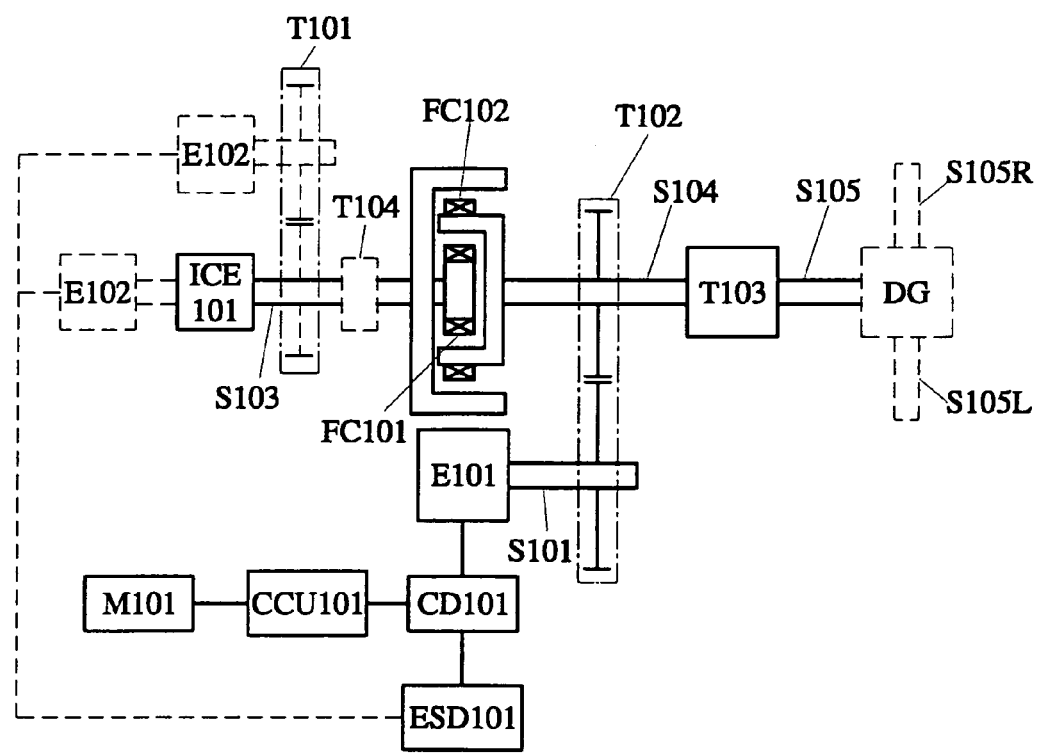
FIG. 10 is a view of a second preferred embodiment of the present invention having a centrifugal clutch as the drive control provided opposite to the acting direction.

FIG. 10 shows a second preferred embodiment of the present invention having an application system with a centrifugal clutch provided in the opposite direction as the drive control, essentially comprised of having connected in series a centrifugal clutch FC101 then another centrifugal clutch FC102 between the steering shaft S103 and the drive load side steering shaft S104 of the engine ICE101. The double acting centrifugal clutches FC101 and FC102 are integrated into a 3-layer structure containing an inner layer, an intermediate layer and an outer layer. The inner layer and the inner side of the intermediate layer form the centrifugal clutch FC101, the inner layer being incorporated to the load side steering shaft S103 of the engine ICE101 and provided with a drive power-locking unit to act outwardly when the centrifugal force reaches a preset value. The outer side of the intermediate layer and the inner side of the outer layer form the centrifugal clutch FC102. The intermediate layer is coupled to the load side steering shaft S104 having its inner side provided with a circumferential coupling surface for power-locking and its outer side provided with a drive power-locking unit acting outwardly when the centrifugal force reaches its preset value to function as an output clutch with the power-locking circumferential coupling surface on the inner side of the outer layer. The outer layer is also incorporated to the steering shaft S103 on the side of the engine ICE101 so as to provide linkage with the load when the engine runs at low rpm or is temporarily cut off. The steering shaft S103 is either directly driven by the engine or driven through a transmission mechanism or planetary transmission mechanism T104, as described above and is coupled to the drive side of the centrifugal clutch FC101, the load side steering shaft S104 being coupled to the driven side of the centrifugal clutch FC101 so as to forthwith close the centrifugal clutch FC101 and further cause the steering shaft S103 to be driven by the engine ICE101 when the steering shaft S103 on the side of the engine ICE101 reaches its preset rpm. Alternatively, transmission mechanism T102 as described above may be provided on the load side steering shaft S104 to engage mutual transmission with the primary dynamo-electric unit.

The primary dynamo-electric unit E101 again functions as a motor and secondary generator as described above, and is coupled to the load side steering shaft S104, the driven side of the centrifugal clutch FC101, and the drive side of the other centrifugal clutch FC102 by means of transmission mechanism T102, also described above.

Similarly, the secondary dynamo-electric unit E102 essentially functions as a generator and secondary motor, and is coupled to the steering shaft S103 driven by the engine ICE101, the drive side of the centrifugal clutch FC101, and the driven side of the other centrifugal clutch FC102 by means of transmission mechanism T101, or the secondary dynamo-electric unit E102 is directly coupled to the steering shaft S103 of the engine.

The combination of those structures described above for the system are subject to control by the manual control interface M101, the central control unit CCU101, the drive control device CD101 and the storage discharging device ESD101. The specific system structure described above provides functions related to those described in subparagraphs (1) through (10) or other Y specific function, and also provides patterns related to those operation patterns described in A1 through A3 or other specific operation pattern.

Figure 11:
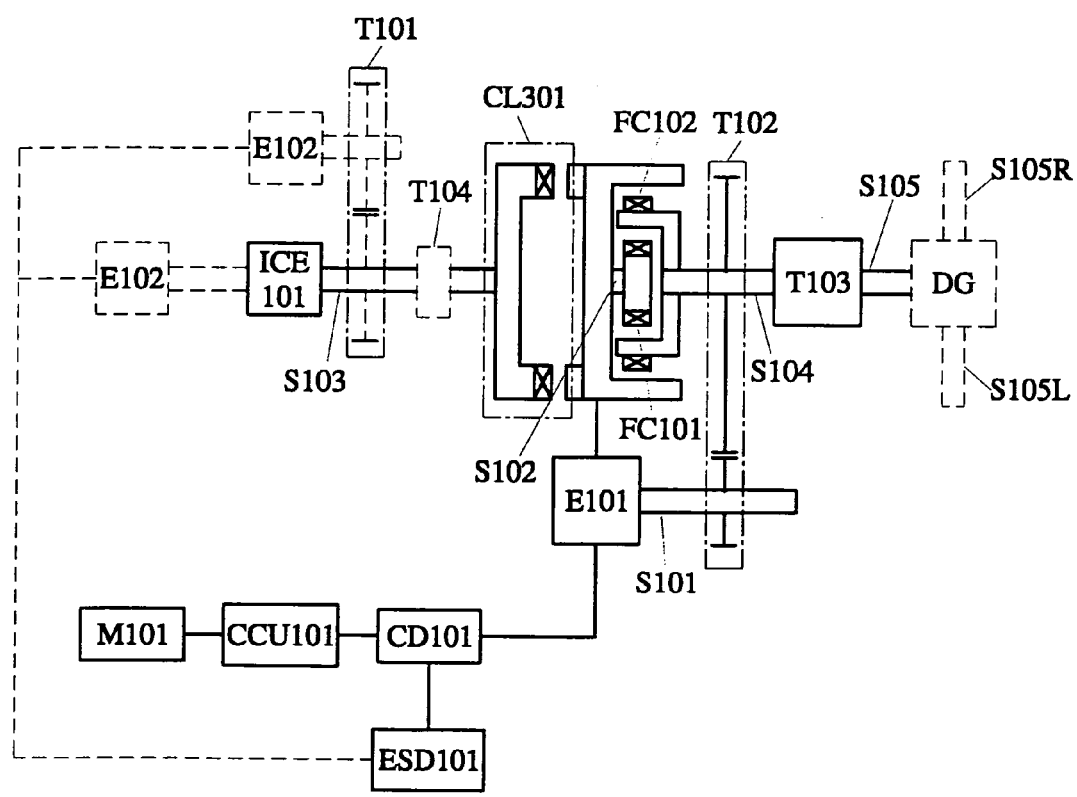
FIG. 11 is a view of a third preferred embodiment of the present invention having a centrifugal clutch as the drive control provided opposite to the acting direction.

FIG. 11 shows a third preferred embodiment of the present invention having an application system with a centrifugal clutch provided in the opposite direction as the drive control, essentially comprised of having alternatively provided an output clutch CL301 of the type described above, between the steering shaft S103 on the same side of the engine ICE101 as that of the preferred embodiment illustrated in FIG. 10, and between the drive side of the double-acting centrifugal clutch FC101, and the driven side of the other centrifugal clutch FC102. Again, this system is subject to the control by the manual control interface M101, the central control unit CCU101, the drive control device CD101 and the storage discharging device ESD101 to provide the same functions as those by the preferred embodiment from FIG. 10 when the output clutch CL301 is closed; and when the output clutch CL301 is disengaged, to provide additional functions, those functions related to subparagraphs (1) through (10) or other specific function, and patterns related to those operation patterns described in A1 through A3 or other specific operation pattern.

Figure 12:
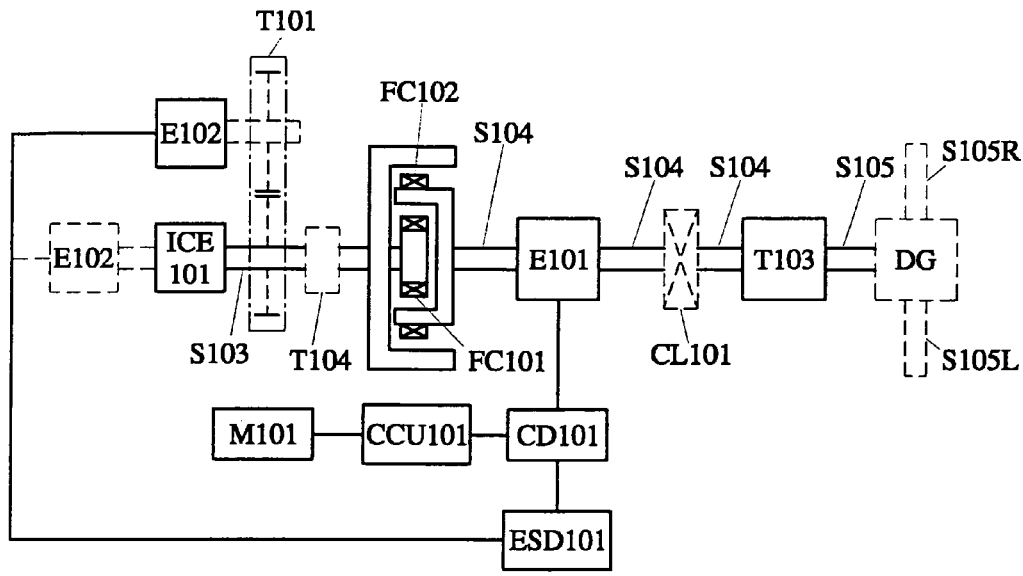
FIG. 12 is a view of a fourth preferred embodiment of the present invention having a centrifugal clutch as the drive control provided opposite to the acting direction.

FIG. 12 shows a fourth of an application system of the present invention having provided a centrifugal clutch in the opposite direction as the drive control, in which the dynamo-electric unit E101 and the load side steering shaft S104 have a coaxial structure while the double-acting centrifugal clutches FC101 and FC102 are provided between the dynamo-electric unit E101 and the engine ICE101. The intermediate structure is integrated with the load side steering shaft S104 in the same structure of the output shaft of the primary dynamo-electric unit E101, and the inner and outer layers incorporated to the engine steering shaft S103. The double acting centrifugal clutches FC101 and FC102 form a 3-layer structure containing an inner layer, an intermediate layer and an outer layer. The inner layer and the inner side of the intermediate layer form the centrifugal clutch FC101. The inner layer is integrated with the engine steering shaft S103 and is provided with a drive power-locking unit to act outwardly when the centrifugal force reaches a preset value. The outer side of the intermediate layer and the inner side of the outer layer form the centrifugal clutch FC102. The intermediate layer is coupled to the steering shaft S103 driven by the primary dynamo-electric unit E101 having its inner side provided with circumferential coupling surface for power-locking and its outer side provided with a drive power-locking unit acting outwardly when the centrifugal force reaches its preset value to function as an output clutch with the power-locking circumferential coupling surface on the inner side of the outer layer. The drive side of the centrifugal clutch FC101 is incorporated with the steering shaft S103 on the side of the engine ICE101 so to couple to the engine to drive the load when the engine runs at high rpm, and to cut off the linkage to the load when the engine runs at low rpm. The engine ICE101 is either directly, or by means of the steering shaft S103 driven by transmission mechanism T104, coupled to the drive side of the centrifugal clutch FC101 and the driven side of the other centrifugal clutch FC102. Meanwhile, the load side steering shaft S104 is coupled to the driven side of the centrifugal clutch FC101 and the drive side of the other centrifugal clutch FC102 so that when the load side steering shaft S104 reaches its preset rpm, the other centrifugal clutch FC102 is closed to cause the steering shaft S103 to be driven by the engine ICE101, or when the steering shaft S103 on the side of the engine ICE101 reaches its preset rpm, the centrifugal clutch FC101 is closed, thus causing the load side steering shaft S104 to drive the load.

Engine ICE101 and transmission T104 of this embodiment correspond to those of FIG. 2, while primary dynamo-electric unit E101 again functions as a motor and also a secondary generator as described above.

The primary dynamo-electric unit E101 is coupled to load side steering shaft S104 of the centrifugal clutch FC101 by means transmission mechanism T102. The load side steering shaft S104 is forthwith outputted to the load, or alternatively, executes uniaxial output through the steering shaft 5105 by means of a transmission mechanism T103, or executes differential output through two units of differential steering shafts S105R and S105L by means of a transmission mechanism comprised of the differential gear set DG.

The secondary dynamo-electric unit E102 again function as a generator and also a secondary motor and has the same structure as in the above embodiments, and is coupled to the centrifugal clutch FC101 and the steering shaft S103 of the engine ICE 101 by means of transmission mechanism T101, or the secondary dynamo-electric unit E102 is directly coupled to the steering shaft S103 of the engine.

An optional output clutch CL101 may also be included as described above.

The combination of those structures described above for the system are subject to control by the manual control interface M101, the central control unit CCU101, the drive control device CD101 and the storage discharging device ESD101. The specific system structure described above provides functions related to those described in subparagraphs (1) through (10) or other specific function, and also provides patterns related to those operation patterns described in A1 through A3 or other specific operation pattern.

Figure 13:
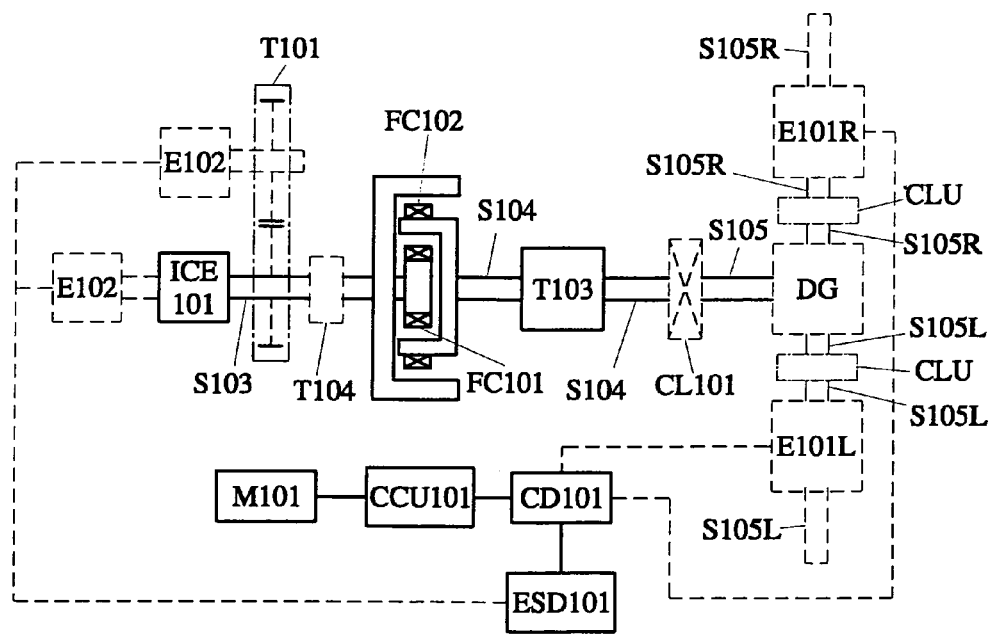
FIG. 13 is a schematic view showing that in the fourth preferred embodiment of the present invention, the primary dynamo-electric unit is replaced by two independent dynamo-electric units respectively provided by the side of two output shafts from the differential gear unit.

FIG. 13 is a schematic view showing that the primary dynamo-electric unit in the preferred embodiment of the present invention illustrated in FIG. 12 is replaced by two independent dynamo-electric units respectively provided on two output shafts of the differential gear set, essentially by replacing the primary dynamo-electric unit E101 in the preferred embodiment illustrated in FIG. 12 with two independent primary dynamo-electric units E101R and E101L respectively to the right and left. The primary dynamo-electric unit E101R to the right is directly connected or alternatively connected through G a one-way or two-way clutch CLU in series to the steering shaft S105R to the right of the differential gear set DG. The primary dynamo-electric unit E101L on the left is directly connected or alternatively connected through a one-way or two-way clutch CLU in series to the steering shaft S105L to the left of the differential gear set DG. The steering shaft S104 on the load side of the centrifugal clutch FC101 is directly outputted to the steering shaft S105 of the differential gear set DG, or through the transmission mechanism T103 before being outputted to the steering shaft S105 of the differential gear set DG, or alternatively, by means of the output clutch CL101 controlled by manual, mechanical, electromagnetic, hydraulic or centrifugal force before being outputted to the steering shaft S105 of the differential gear set DG. Both of the primary dynamo-electric units E101R and another primary dynamo-electric unit E101L are subject to equal speed or differential drive by the drive control device CD101.

Figure 14:
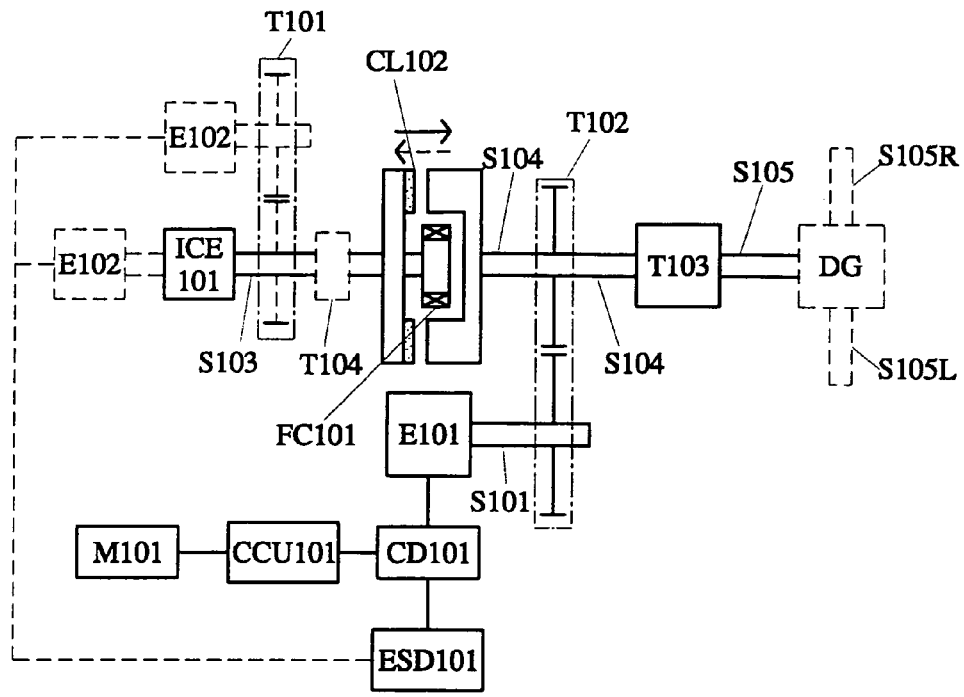
FIG. 14 is a view showing that the preferred embodiment of the present invention given in FIG. 15 is provided with an output clutch.

FIG. 14 shows that the preferred embodiment given in FIG. 9 is further provided with a centrifugal clutch FC101 and a controllable clutch CL102, as described above, between the engine steering shaft S103 and the load side steering shaft S104 so to execute power coupling or interruption on both of the engine steering shaft S103 and the load side steering shaft S104. The steering shaft S103 either is directly driven by the engine ICE101, or driven through transmission mechanism T104, and is coupled to the driven drawn side of the centrifugal clutch FC101 while the load side steering shaft S104 is coupled to the drive side of the centrifugal clutch FC101. That is, once the steering shaft S103 on the side of the engine ICE101 reaches its preset rpm, the centrifugal clutch FC101 is forthwith closed to couple the load side steering shaft S104. The centrifugal clutch FC101 and the controllable clutch CL102 are individually provided or share the same structure; and other units comprising the system are the same as those provided in the preferred embodiment illustrated in FIG. 1.

The combination of those structures described above for the system are subject to control by the manual control interface M101, the central control unit CCU101, the drive control device CD101 and the storage discharging device ESD101. The specific system structure described above provides functions related to those described in subparagraphs (1) through (10) or other specific function, and also provides patterns related to those operation patterns described in A1 through A3 or other specific operation pattern.

Figure 15:
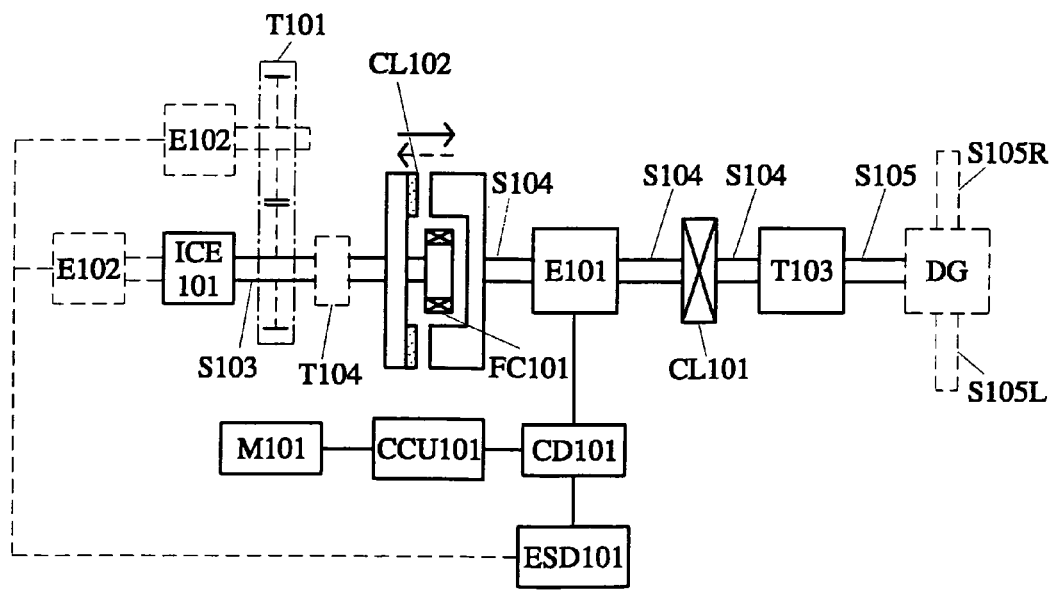
FIG. 15 is a view showing that the preferred embodiment of the present invention given in FIG. 14 is provided with an output clutch.

FIG. 15 is a view showing that the preferred embodiment given in FIG. 14 is provided with an output clutch CL101 as described above. The output clutch CL101 is provided between the load side steering shaft S104 driven by the primary dynamo-electric unit E101 and the load. When the output clutch CL101 is closed, it provides the same function as provided by the preferred embodiment illustrated in FIG. 14; and additional functions when the output clutch CL101 is disengaged, including being separated from the load to permit the engine to simultaneously drive the first and the second dynamo-electric units E101 and E102 to function as generators, or to drive the primary dynamo-electric E101 alone to operate as a generator while the primary dynamo-electric unit E101 is provided between the output clutch CL101 and the controllable clutch CL102; as well as those functions related to subparagraphs (1) through (10) or other specific function, and patterns related to those operation patterns described in A1 through A3 or other specific operation pattern.

Figure 16:
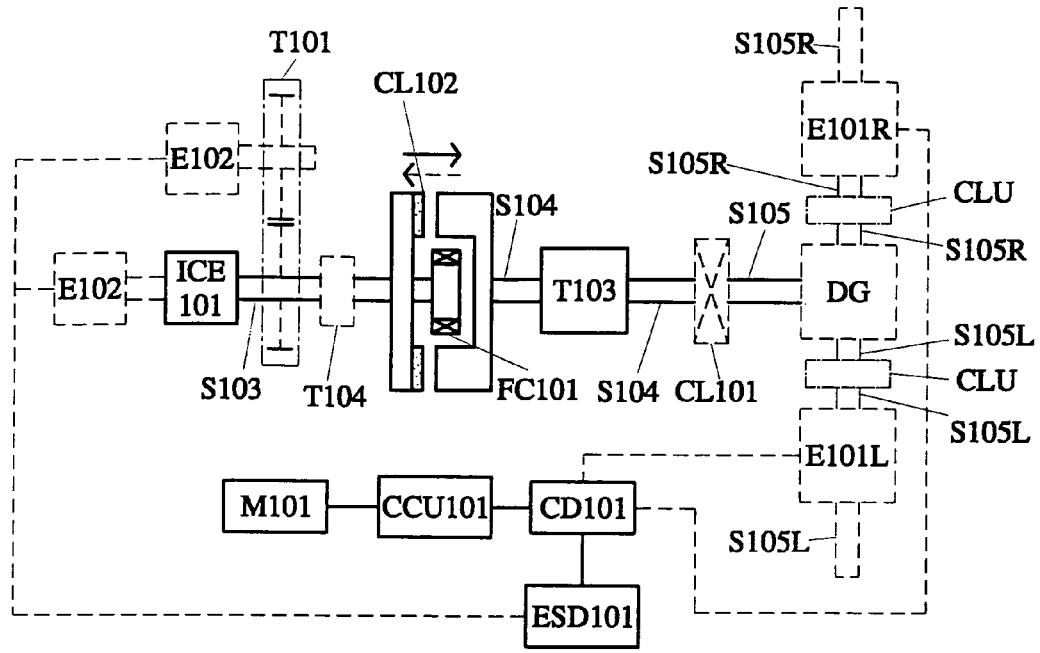
FIG. 16 is a view showing that the primary dynamo-electric unit of the preferred embodiment of the present invention given in FIG. 15 is further replaced by two independent dynamo-electric unit units respectively provided by the side of two output shafts from the differential gear unit.
Figure 20:
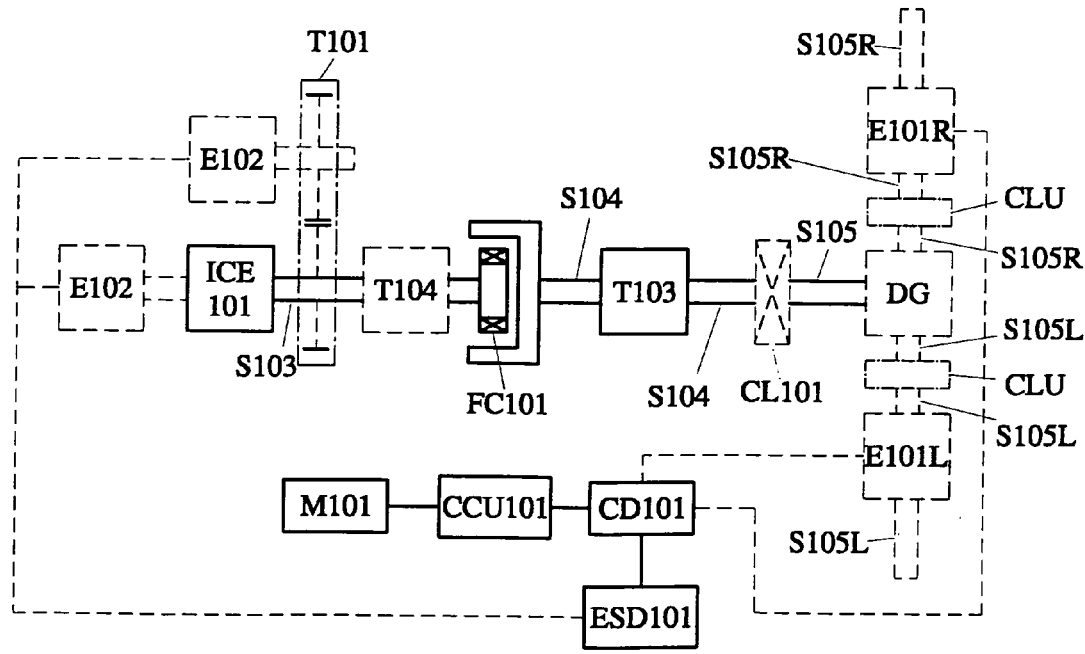
FIG. 20 is a view showing that the primary dynamo-electric unit in the preferred embodiment taken from FIG. 18 is replaced by two independent dynamo-electric units respectively provided by the side of two output shafts from the differential gear unit.

FIG. 16 is a schematic view showing that the preferred embodiment illustrated in FIG. 15 is further modified by having the primary dynamo-electric unit replaced by two independent dynamo-electric units respectively provided on the side of two output shafts of a differential gear set. The primary dynamo-electric unit E101 of the preferred embodiment in FIG. 20 is replaced by a primary dynamo-electric unit E101R to the right and another primary dynamo-electric unit E101L on the left. The primary dynamo-electric unit E101R to the right is directly connected in series with the steering shaft S105R to the right of the differential gear set DG, or alternatively, a one-way or two-way alternatively adapted with a one-way or two-way clutch CLU before being connected in series to the steering shaft S105R to the right of the differential gear set DG. The other primary dynamo-electric unit E101L on the left is directly connected in series with a steering shaft S105L to the left of a differential gear set DG or alternatively adapted with a one-way or two-way clutch CLU before being connected in series to the steering shaft S105L to the left of the differential gear set DG. The steering shaft S104 on the load side of the centrifugal clutch FC101 is directly outputted to the steering shaft S105 of the differential gear set DG, or through the transmission mechanism T103, before being outputted to the steering shaft S105 of the differential gear set DG, or alternatively, by means of the output clutch to CL101 before being outputted to the steering shaft S105 of the differential gear set DG. Both the primary dynamo-electric unit E101R to the right and the other primary dynamo-electric unit E101L on the left are subject to equal speed or differential drive by a drive control device CD101 to provide the same functions as those by the preferred embodiment given in FIG. 15.

Figure 17:
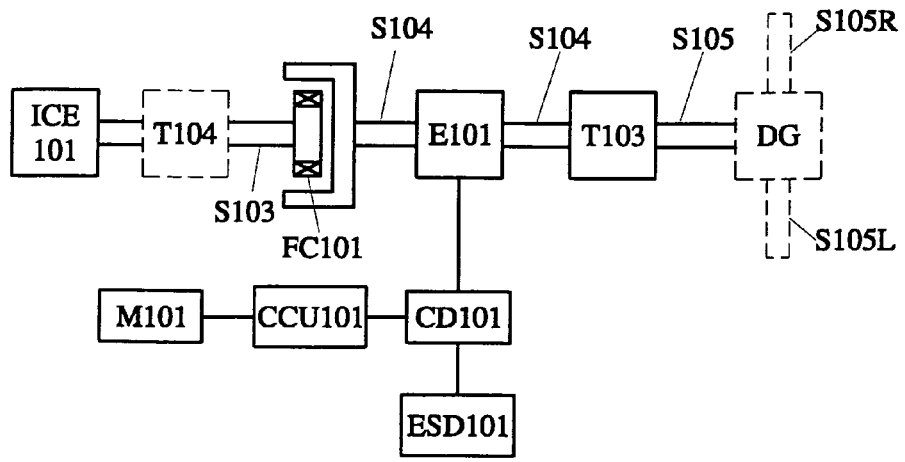
FIG. 17 is a view showing that the primary dynamo-electric unit and a steering shaft on a load side of the first preferred embodiment from FIG. 9 share the same structure.

FIG. 17 shows that the primary dynamo-electric unit and the load side steering shaft illustrated in FIG. 9 share the same structure. The preferred embodiment illustrated in FIG. 9 is further modified to have the primary dynamo-electric unit E101 and the load side steering shaft S104 provided in the same structure. The centrifugal clutch FC101 is provided between the steering shaft S103 and the load side steering shaft S104 of the engine ICE101 to control coupling or interruption of the transmission by both of the steering shafts S103 and S104. The steering shaft S103 driven by the engine ICE101 is coupled to the drive side of the centrifugal clutch FC101 and the load side steering shaft S104 is coupled to the driven side of the centrifugal clutch FC101 so that once the steering shaft S103, which is directly driven by the engine ICE101 or through transmission mechanism T104, reaches the preset rpm, it closes the centrifugal clutch FC101, thus coupling the load side steering shaft S104. The steering shaft S104 on the load side is provided to drive the load, and shares the coaxial structure with the primary dynamo-electric unit E101.

The load side steering shaft S104, engine ICE101, and transmission ae as described above, while, the primary dynamo-electric unit E101 functions as a motor and secondary generator, as described above. The primary dynamo-electric unit E101 shares the coaxial structure with the load side steering shaft S104 and is coupled to the driven side of the centrifugal clutch FC101.

The combination of those structures described above for the system are subject to control by the manual control interface M101, the central control unit CCU101, the drive control device CD101 and the storage discharging device ESD101. The specific system structure described above provides functions related to those described in subparagraphs (1) through (10) or other specific function, and also provides patterns related to those operation patterns described in A1 through A3 or other specific operation pattern.

Figure 18:
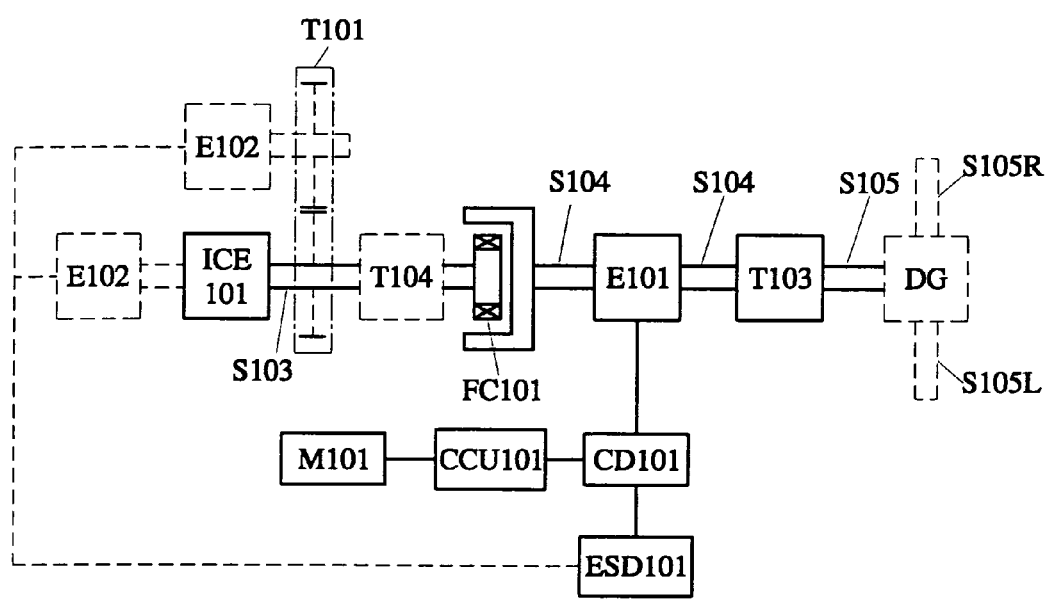
FIG. 18 is a view showing that an additional secondary dynamo-electric unit is directly coupled to the engine steering shaft or engaged in mutual transmission with the transmission mechanism.

FIG. 18 shows that the preferred embodiment taken from FIG. 17 is provided with a secondary dynamo-electric unit directly coupled to the engine steering shaft or engaging in mutual transmission with the engine steering shaft by means of a transmission mechanism. As illustrated in FIG. 17, the preferred embodiment, when required, is provided with the secondary dynamo-electric unit E102 which is directly coupled to the steering shaft S103 of the engine ICE101 or engaged in mutual transmission with the steering shaft S103 of the engine ICE101 by means of a variable steering or planetary transmission mechanism T101 with fixed or variable speed ratio so to function at the same time as a generator and as a motor.

The secondary dynamo-electric unit E102: essentially also functions as a generator and secondary motor as described above, and is coupled to the centrifugal clutch FC101 and the steering shaft S5103 driven by the engine ICE101 and to the drive side of the centrifugal clutch FC101 by means of transmission mechanism T101, or the secondary dynamo-electric unit E102 is directly coupled to the steering shaft S103 of the engine.

The combination of those structures described above for the system are subject to control by the manual control interface M101, the central control unit CCU101, the drive control device CD101 and the storage discharging device ESD101. The specific system structure described above provides functions related to those described in subparagraphs (1) through (10) or other specific function, and also provides patterns related to those operation patterns described in A1 through A3 or other specific operation pattern.

FIGS. 17 and 18 show that the primary dynamo-electric unit E101 is further replaced by two independent units of the primary dynamo-electric unit E101R to the right and another primary dynamo-electric unit E101L on the left. The primary dynamo-electric unit E101R to the right is directly connected in series with the steering shaft S105R to the right of the differential gear set DG, or alternatively, adapted with a one-way or two-way clutch CLU before being connected in series to the steering shaft S105R to the right of the differential gear set DG, while the primary dynamo-electric unit E101L on the left is directly connected in series with the steering shaft S105L to the left of the differential gear set DG, or alternatively, adapted with a one-way or two-way clutch CLU before being connected in series to the steering shaft S105L to the left of the differential gear set DG. The load side steering shaft S104 of the centrifugal clutch FC101 is directly, or through transmission mechanism T103, outputted to the steering shaft S105 of the differential gear set DG, or alternatively, outputted to the output clutch CL101 before being outputted to the steering shaft S105 of the differential gear set DG. Meanwhile, both of the primary dynamo-electric units E101R and E101L respectively to the right and the left are subject to drive at equal speed or differential drive by the drive control device CD101.

Figure 19:
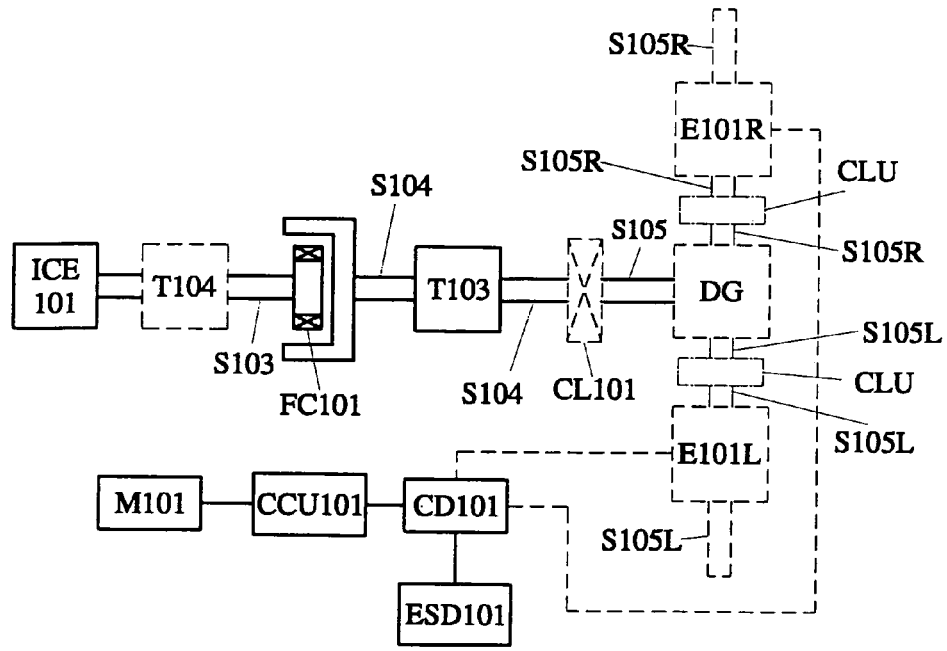
FIG. 19 is a view showing that the primary dynamo-electric unit in the preferred embodiment taken from FIG. 17 is replaced by two independent dynamo-electric unit units respectively provided by the side of two output shafts from the differential gear unit.

FIG. 19 shows that the preferred embodiment taken from FIG. 17 further has its primary dynamo-electric unit replaced by two independent dynamo-electric units respectively provided on the side of two output shafts of the differential gear set.

FIG. 20 shows that the preferred embodiment taken from FIG. 18 further has its primary dynamo-electric unit replaced by two independent dynamo-electric units respectively provided on the side of two output shafts of the differential gear set.

Figure 21:
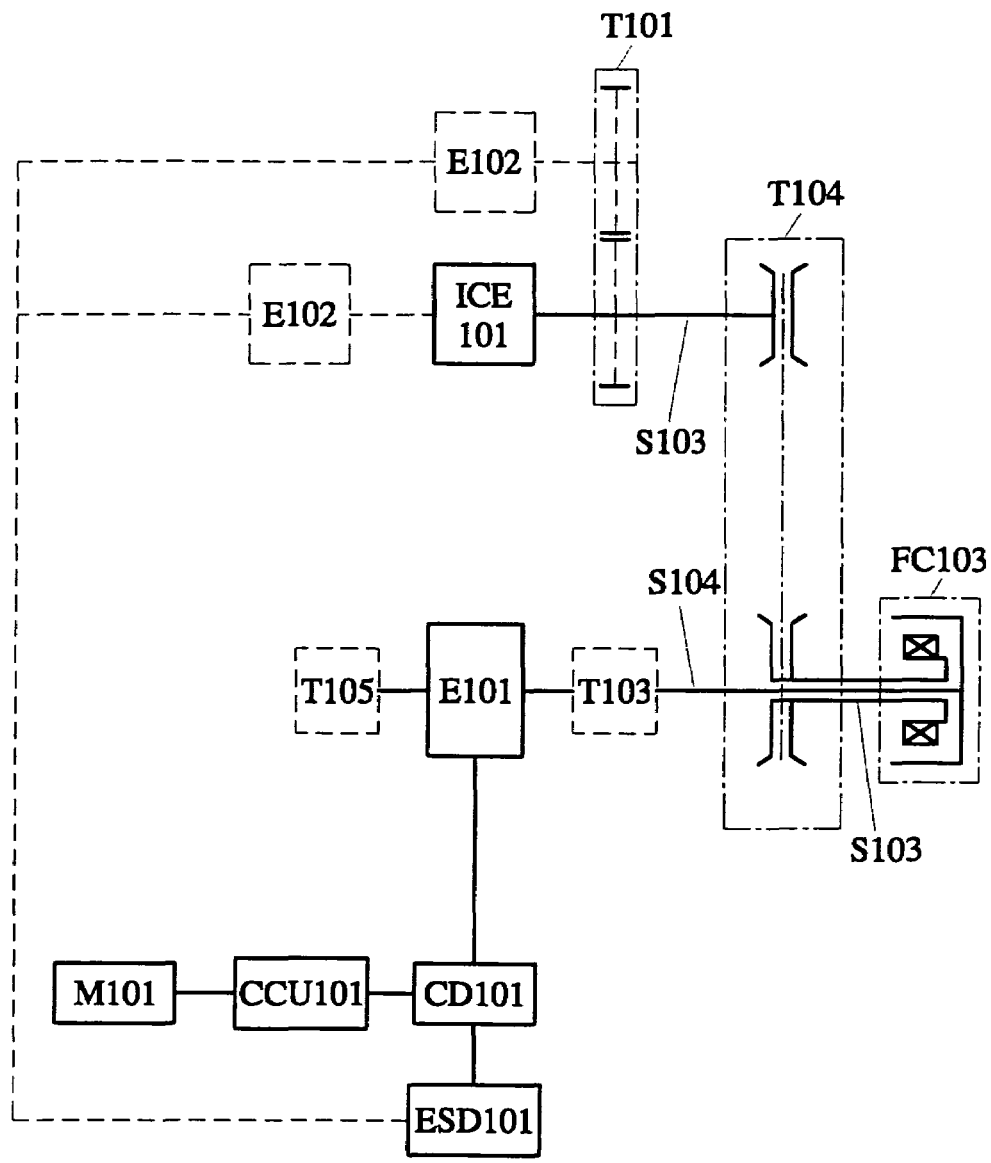
FIG. 21 is a view showing an automatic transmission mechanism provided between the engine and the drive shaft of the present invention.

Furthermore, as required, an automatic transmission to mechanism T1040 may be provided between the engine ICE101 and the drive shaft S103 to comply with demands on performance or structural space. FIG. 21 shows a preferred embodiment of having an automatic transmission mechanism provided between the engine and the drive shaft of the present invention, in which, the automatic transmission mechanism T1040 includes automatic transmission belt gear set (CTV) or other known automatic transmission device provided between the engine ICE101 and the steering shaft S103. A centrifugal clutch FC103 provided between the steering shaft S103 and the load side steering shaft S104 to control the operation of transmission coupling or transmission interruption of both the steering shaft S103 and the load side steering shaft S104. The steering shaft S103 driven by the engine ICE101 is provided to drive the automatic transmission mechanism T1040 before being coupled to the drive side of the centrifugal clutch FC103 by the structure of the output terminal of the automatic transmission mechanism T1040, while the load side steering shaft S104 is coupled to the driven side of the centrifugal clutch FC103 so that the centrifugal clutch FC103 is forthwith closed to couple the load side steering shaft S104 once the structure of the output terminal of the automatic transmission mechanism reaches its preset rpm.

Configurations of the output structure comprised by the load side steering shaft S104 and the primary dynamo-electric unit E101 include:

1. A directly coaxial structure provided between the load side steering shaft S104 and the primary dynamo-electric unit E101 so that the coaxial structure of the load side steering shaft S104 directly drives the load; or
2. Alternatively, a planetary transmission mechanism T103 as described above provided between the load side steering shaft S104 and the primary dynamo-electric unit E101 for the output terminal of the primary dynamo-electric unit E101 to directly drive the load; or
3. A transmission mechanism T105 as described above (which may also be a differential transmission) is further provided between the output terminal of the primary dynamo-electric unit E101 and the load as described in subparagraph 1, then the output terminal is selected as required to drive the load; or
4. A transmission mechanism T103 is provided between the coaxial structure of the load side steering shaft S104 and the primary dynamo-electric unit E101 and the driven load, the transmission mechanism T105 is provided as required, and the output terminal is selected as required to drive the load.

The engine ICE101 is as described above.

The automatic transmission mechanism T1040 may be comprised of various known coaxial or non-coaxial transmission devices, e.g. a gear set, belt gear set, sprocket gear set, power-locking gear set or hydraulic coupling device, automatic transmission mechanism, multistage or stageless variable transmission comprised of a electromagnetic coupling device.

The primary dynamo-electric unit E101 functions as a motor and secondary generator as described above.

The primary dynamo-electric unit E101 is directly coupled to the driven side of the centrifugal clutch FC101, or alternatively, by means of a fixed or variable speed ratio or variable to steering transmission or planetary transmission mechanism T103, coupled to the load side steering shaft S104 driven by the driven side of the centrifugal clutch FC101. The primary dynamo-electric unit E101 directly drives the load, or alternatively, a transmission mechanism T105 is provided to drive the load.

The secondary dynamo-electric unit E102 functions as a generator and also as a secondary motor, and is coupled to the centrifugal clutch FC101 and the steering shaft S103 driven by the engine ICE101, and to the drive side of the centrifugal clutch FC101 by means of a fixed or variable speed ratio or variable steering transmission or planetary transmission mechanism T101, or the secondary dynamo-electric unit E102 is directly coupled to the steering shaft S103 of the engine.

The combination of those structures described above for the system are subject to control by the manual control interface M101, the central control unit CCU101, the drive control device CD101 and the storage discharging device ESD101. The specific system structure described above provides functions related to those described in subparagraphs (1) through (10) or other specific function, it also provides patterns related to those operation patterns described in A1 through A3 or other specific operation pattern.

FIGS. 22 through 29 respectively show an application system having a one-way transmission mechanism SWC101 as a drive control connected in series with the driven side of the centrifugal clutch FC101 taken from the preferred embodiment of FIGS. 1 through 8.

Figure 22:
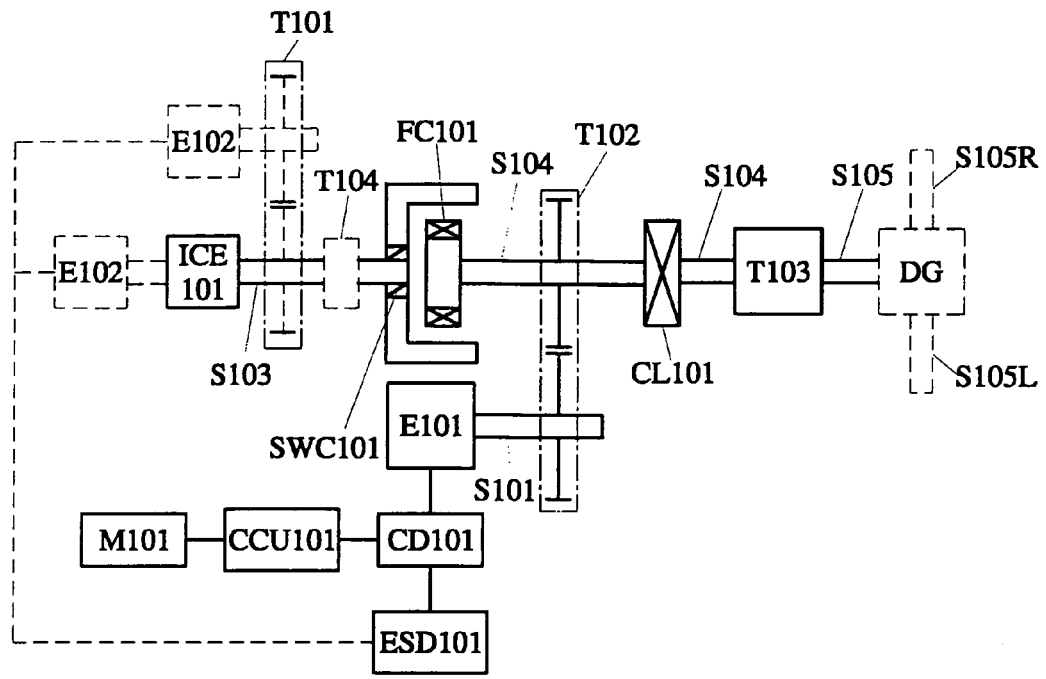
FIG. 22 is a first preferred embodiment of the present invention taken from FIG. 1 that has a one-way transmission mechanism connected in series with the driven side of the centrifugal clutch as the drive control.

FIG. 22 is a view showing a first preferred embodiment of the application system taken from FIG. 1 that has a one-way transmission mechanism SWC101 as a drive control connected in series with the driven side of the centrifugal clutch FC101. The centrifugal clutch FC101 is provided between the steering shaft S103 driven by the engine ICE101 and the load side transmission shaft S104 for controlling the operation of the steering shaft S103 and the load side steering shaft S104 to couple or interrupt transmission, and a one-way transmission mechanism SWC101 is selected for steering operation.

The steering shaft S103 driven by the engine ICE101 is coupled to the driven side of the centrifugal clutch FC101 through the one-way transmission mechanism SWC101 selected for steering operation while the load side steering shaft S104 is coupled to the drive side of the centrifugal clutch FC101 so that when the load side steering shaft S104 reaches its preset rpm, the centrifugal clutch FC101 is forthwith closed, thus causing the steering shaft S103 to be directly driven by the engine ICE101 or through the transmission mechanism T104. The load side steering shaft S104 to drive the load is provided with another transmission mechanism T102 to engage in mutual transmission with the first primary dynamo-electric unit E101 while other units comprising the system are the same as those provided in the preferred embodiment illustrated in FIG. 1.

The combination of those structures described above for the system are subject to control by the manual control interface M101, the central control unit CCU101, the drive control device CD101 and the storage discharging device ESD101. The specific system structure described above provides functions related to those described in subparagraphs (1) through (10) or other specific function, and also provides patterns related to those operation patterns described in A1 through A3 or other specific operation pattern.

Figure 23:
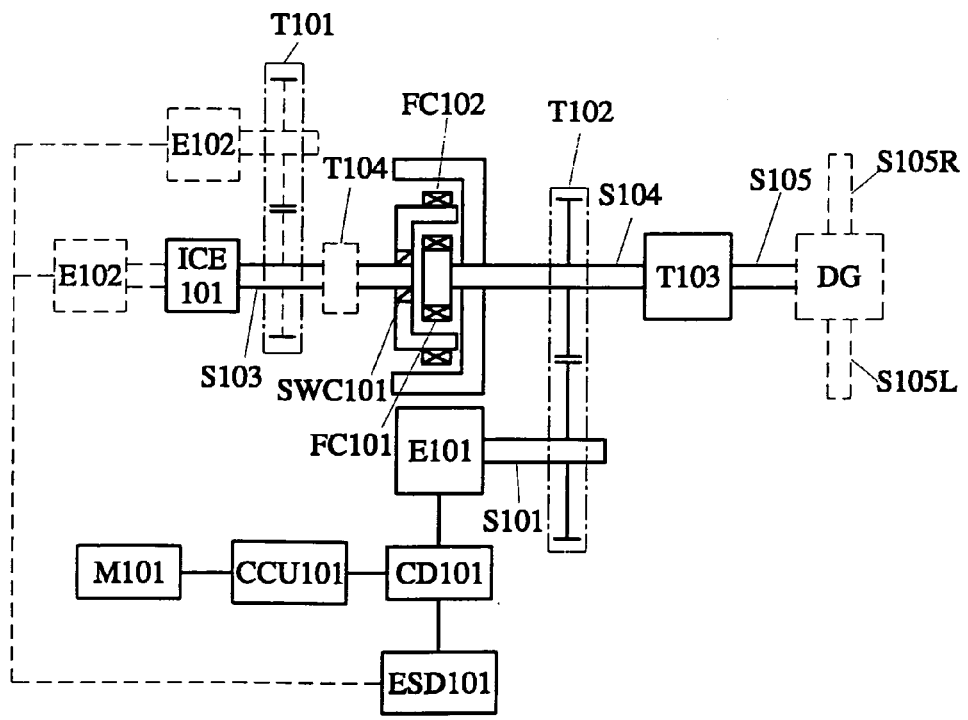
FIG. 23 is a second preferred embodiment of the present invention taken from FIG. 2 that has a one-way transmission mechanism connected in series with the driven side of the centrifugal clutch as the drive control.

FIG. 23 is a view showing a second preferred embodiment of an application system, in which a one-way transmission mechanism as the driven control is connected in series with the driven side of the centrifugal clutch of the preferred embodiment taken from FIG. 2. The double-acting centrifugal clutches FC101 and FC102 and the one-way transmission mechanism SWC101 selected for steering operation are connected in sequence between the steering shaft S103 and the drive loads ide steering shaft S104 of the engine ICE101. The double-acting centrifugal clutches are comprised of two units FC101 and FC102 in a three-layer structure including inner, intermediate, and outer layers, either by insertion within each other or ry integration. The inner layer and the inner side of the intermediate layer form the centrifugal clutch FC101. The inner layer is integral with the load side steering shaft S104 and provided with a drive power-locking unit to act outwardly when the centrifugal force reaches a preset value. The outer side of the intermediate layer and the inner side of the outer layer form the centrifugal clutch FC102. The intermediate layer related to the one-way transmission mechanism SWC101 selected for steering operation is coupled to the steering shaft S103 driven by the engine. The inner side of the intermediate layer is provided with a circumferential coupling surface for power-locking and its outer side is provided with a drive power-locking unit acting outward when the centrifugal force reaches its preset value to function as an output clutch with the power-locking circumferential coupling surface on the inner side of the outer layer. The outer layer is also integral with the load side steering shaft S104 so as to provide linkage with the load when the engine runs at low rpm or is temporarily cut off. The steering shaft S103 is either directly driven or driven by the engine through transmission mechanism T104, as described above, and is coupled to the driven side of the centrifugal clutch FC101, the load side steering shaft S104 being coupled to the drive side of the centrifugal clutch FC101 so as to forthwith close the centrifugal clutch FC101 and further cause the steering shaft S103 to be driven by the engine ICE101 when the load side steering shaft S104 reaches its preset rpm. Alternatively, a fixed speed ratio or variable speed ratio, or variable steering transmission mechanism or planetary to transmission mechanism T102 is provided on the load side steering shaft S104 to engage in mutual transmission with the primary dynamo-electric unit while other units comprising the system are the same as those provided in the preferred embodiment illustrated in FIG. 2.

The combination of those structures described above for the system are subject to control by the manual control interface M101, the central control unit CCU101, the drive control device CD101 and the storage discharging device ESD101. The specific system structure described above provides functions related to those descriaed in subparagraphs (1) through (10) or other specific function, and also provides patterns related to those operation patterns described in A1 through A3 or other specific operation pattern.

Figure 24:
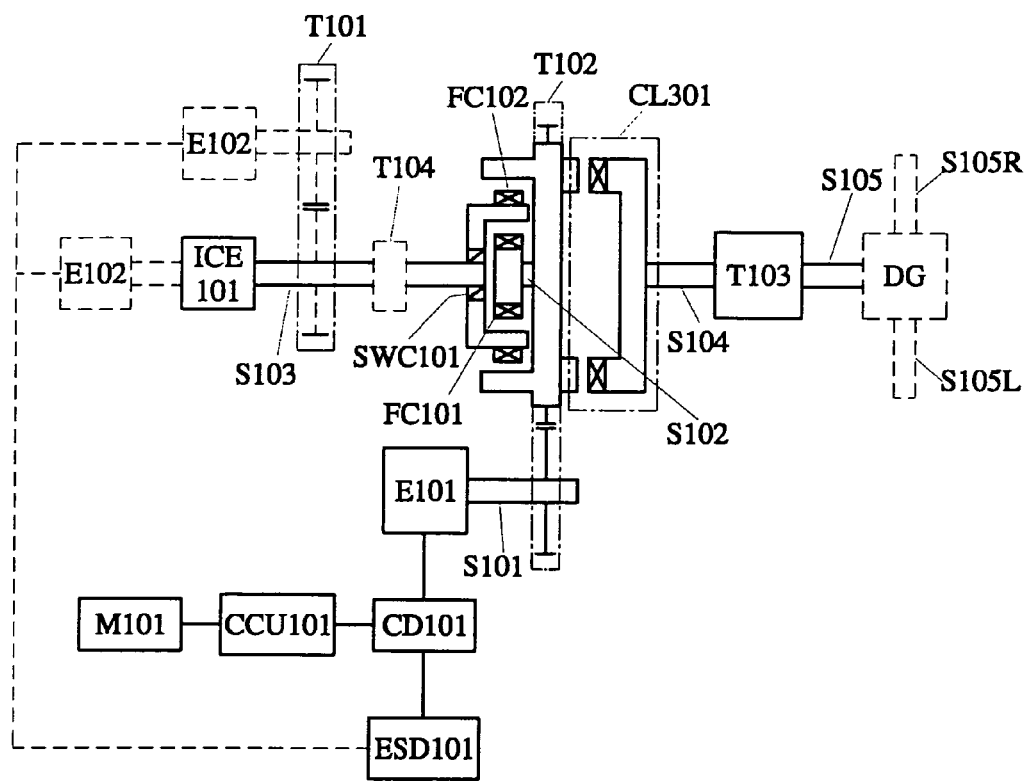
FIG. 24 is a third preferred embodiment of the present invention taken from FIG. 3 that has a 5 one-way transmission mechanism connected in series with the driven side of the centrifugal clutch as the drive control.

FIG. 24 is a view showing a third preferred embodiment of an application system that has a one-way transmission mechanism as the driven control connected in series with the driven side of the centrifugal clutch of the preferred embodiment taken from FIG. 3. The transmission mechanism T102, the inner circumference of the coupling surface for power-locking of the double-acting centrifugal clutch FC101 and the outer circumference of the coupling surface for power-locking of the double-acting centrifugal clutch FC102 are jointly incorporated with an intermediate steering shaft S102. The double-acting centrifugal clutches are comprised of two units of centrifugal clutches FC101 and FC102 inserted within each other in a three-layer structure, having inner, intermediate and outer layers. The inner layer and the inner side of the intermediate layer form the centrifugal clutch FC101. The inner layer is incorporated with the intermediate steering shaft S102 and provided with a drive power-locking unit to act outwardly when the centrifugal force reaches a preset value. The outer side of the intermediate layer and the inner side of the outer layer form the centrifugal clutch FC102. The intermediate layer related to the one-way transmission mechanism SWC101 selected for steering operation is coupled to the steering shaft S103 driven by the engine. The inner side of the intermediate layer is provided with a circumferential coupling surface for power-locking and its outer side is provided with a drive power-locking unit acting outwardly when the centrifugal force reaches its preset value to function as an output clutch with the power-locking circumferential coupling surface on the inner side of the outer layer. The outer layer is also incorporated with the intermediate steering shaft S104 so as to provide linkage with the load when the engine runs at low rpm or is temporarily cut off. The steering shaft S103 either directly driven or driven by the engine through transmission mechanism T104, and is coupled to the driven side of the centrifugal clutch FC101, the intermediate steering shaft S102 being coupled to the drive side of the centrifugal clutch FC101 so as to forthwith close the centrifugal clutch FC101 and further to draw the steering shaft S103 driven by the engine ICE101 when the intermediate steering shaft S102 reaches its preset rpm.

The intermediate steering shaft S102 is directly outputted to the load, or alternatively, to an output clutch CL301 as described above, before being outputted to the load via the load side steering shaft S104; or as required, to execute single shaft output through transmission mechanism T103, then through a steering shaft S105; or through an optional transmission mechanism comprised of a differential gear set DG for differential output through two units of differential steering shafts S105R and S105L. The additional output clutch CL301 is provided between the intermediate steering shaft S102 and the load side steering shaft S104 with both steering shafts driven by the power-locking coupling surfaces on the inner and outer circumferences of the double-acting centrifugal clutches FC101 and FC102 while the other units comprising the system are the same as those provided in the preferred embodiment illustrated in FIG. 3.

The combination of those structures described above for the system are subject to control by the manual control interface M101, the central control unit CCU101, the drive control device CD101 and the storage discharging device ESD101. The specific system structure described above provides the same functions as the preferred embodiment illustrated in FIG. 23 when the output clutch CL301 is closed; and provides additional functions when the output clutch CL301 is disengaged, including functions related to those described in subparagraphs (1) through (10) or other specific function, and operation patterns related to those operation patterns described in A1 through A3 or other specific operation pattern.

Figure 25:
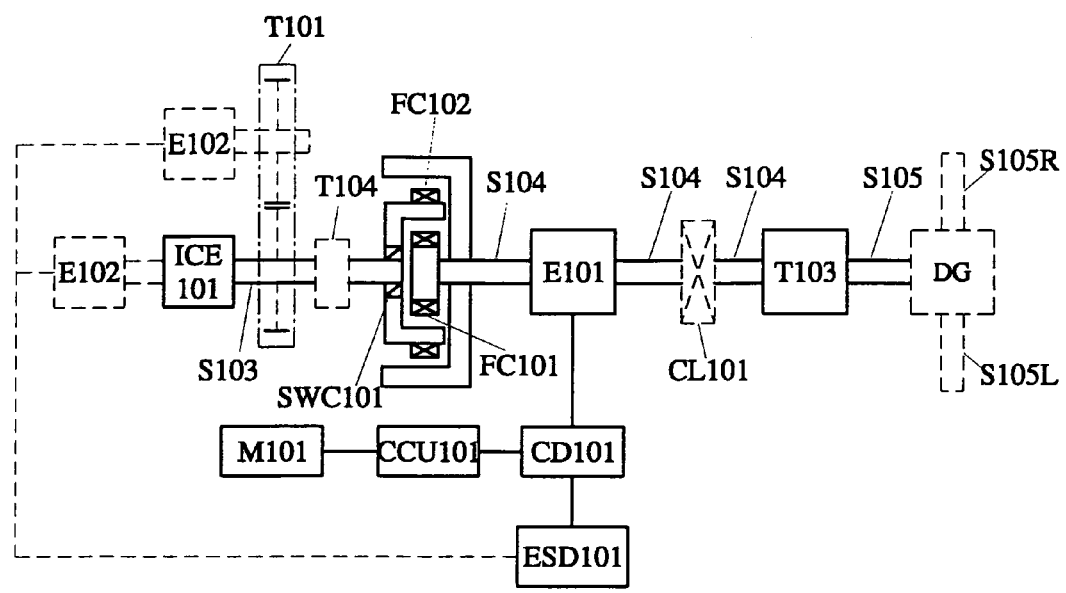
FIG. 25 is a fourth preferred embodiment of the present invention taken from FIG. 4 that has a one-way transmission mechanism connected in series with the driven side of the centrifugal clutch as the drive control.

FIG. 25 is a view showing a fourth preferred embodiment to of an application system that has a one-way transmission mechanism as the driven control connected in series with the driven draw side of the centrifugal clutch of the preferred embodiment taken from FIG. 4. The primary dynamo-electric unit E101 and the load side steering shaft S104 form a coaxial structure, and between the dynamo-electric unit E101 and the engine ICE101 are provided double-acting centrifugal clutches FC101 and FC102, and the one-way transmission mechanism SWC101 selected for steering operation. Both the inner and the outer structures of the double-acting centrifugal clutches FC101 and FC102 are incorporated with the load side steering shaft S104 coupled to the output shaft of the primary dynamo-electric unit E101, and its intermediate layer structure is mutually incorporated into the steering shaft S103 driven by the engine ICE101. The double-acting centrifugal clutches are again comprised of two units of centrifugal clutches FC101 and FC102 inserted with each other in a three-layer structure, including inner, intermediate, and outer layers. The inner layer and the inner side of the intermediate layer form the centrifugal clutch FC101. The inner layer incorporated to the load side steering shaft S104 is provided with a drive power-locking unit to act outwardly when the centrifugal force reaches a preset value. The outer side of the intermediate layer and the inner side of the outer layer form the centrifugal clutch FC102. The intermediate layer related to the one-way transmission mechanism SWC101 selected for steering operation is coupled to the steering shaft S103 driven by the engine. The inner side of the intermediate layer is provided with a circumferential coupling surface for power-locking and its outer side is provided with a drive power-locking unit acting outwardly when the centrifugal force reaches its preset value to function as an output clutch with the power-locking circumferential coupling surface on the inner side of the outer layer. The outer layer is also incorporated with the load side steering shaft S103 so as to provide linkage with the load when the engine runs at low rpm or is temporarily cut off. The steering shaft S103 either directly driven by the engine or driven through transmission mechanism T104 and is coupled to the driven side of the centrifugal clutch FC101, the load side steering shaft S103 being coupled to the drive side of the centrifugal clutch FC101 so as to forthwith close the centrifugal clutch FC101 and further cause the steering shaft S103 to be driven by the engine ICE101 when the load side steering shaft S102 reaches its preset rpm. The output clutch CL101 when required is provided between the output side of the primary dynamo-electric unit E101 and the transmission mechanism T103. The output clutch CL101 is controlled by manual, mechanical, electromagnetic, hydraulic or centrifugal force while the other units comprising the system are the same as those provided in the preferred embodiment illustrated in FIG. 4.

The combination of those structures described above for the system are subject to control by the manual control interface M101, the central control unit CCU101, the drive control device CD101 and the storage discharging device ESD101. The specific system structure described above provides functions related to those described in subparagraphs (1) through (10) or other specific function, and also provides patterns related to those operation patterns described in A1 through A3 or other specific operation pattern.

Figure 26:
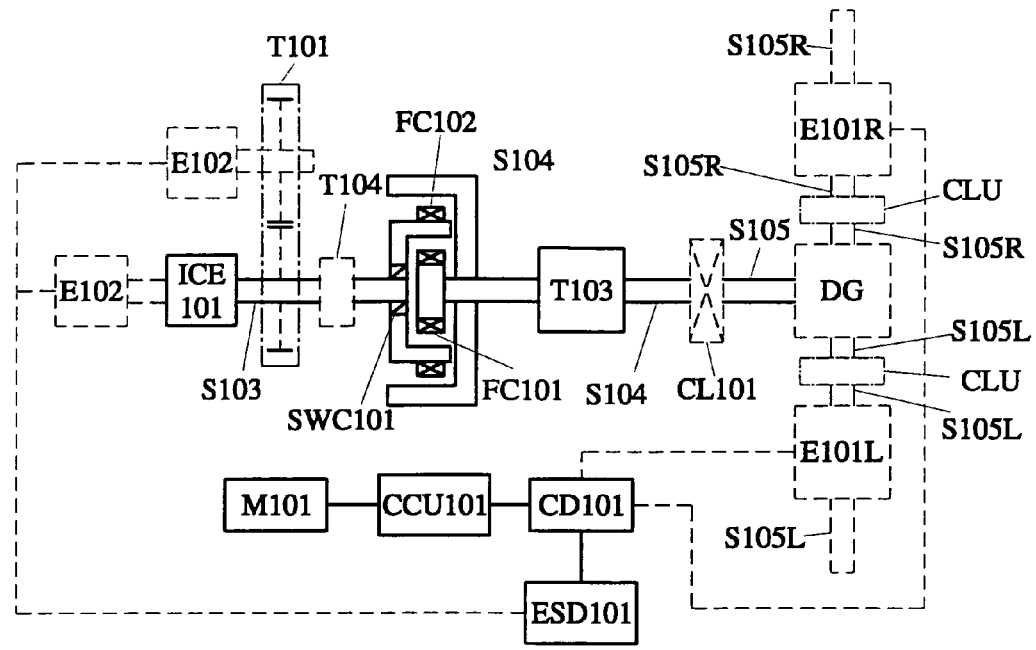
FIG. 26 is a view showing that the primary dynamo-electric unit in the preferred embodiment taken from FIG. 25 is replaced by two independent dynamo-electric unit units respectively provided by the side of two output shafts from the differential gear unit.

FIG. 26 is a schematic view in which the primary dynamo-electric unit in the preferred embodiment illustrated in FIG. 25 is replaced by two independent dynamo-electric units respectively provided on the side of two output shafts of a differential gear set. The primary dynamo-electric unit E101 of the preferred embodiment in FIG. 25 is replaced by a primary dynamo-electric unit E101R to the right and another primary dynamo-electric unit E101L on the left. The primary dynamo-electric unit E101R to the right is directly connected in series with the steering shaft S105R to the right of the differential gear set DG, or alternatively, a one-way or two-way alternatively adapted with a one-way or two-way clutch CLU before being connected in series to the steering shaft S105R to the right of the differential gear set DG. The other primary dynamo-electric unit E101L on the left is directly connected in series with a steering shaft S105L to the left of a differential gear set DG or alternatively adapted with one-way or two-way clutch CLU before being connected in series to the steering shaft S105L to the left of the differential gear set DG. The steering shaft S104 on the load side of the centrifugal clutch FC101 is directly outputted to the steering shaft S105 of the differential gear set DG, or through the transmission mechanism T103 before being outputted to the steering shaft S105 of the differential gear set DG, or alternatively, by means of the output clutch CL101, before being outputted to the steering shaft S105 of the differential gear set DG. Both the primary dynamo-electric unit E101R to the right and the other primary dynamo-electric unit E101L on the left are subject to equal speed or differential drive by a drive control device CD101.

Figure 27:
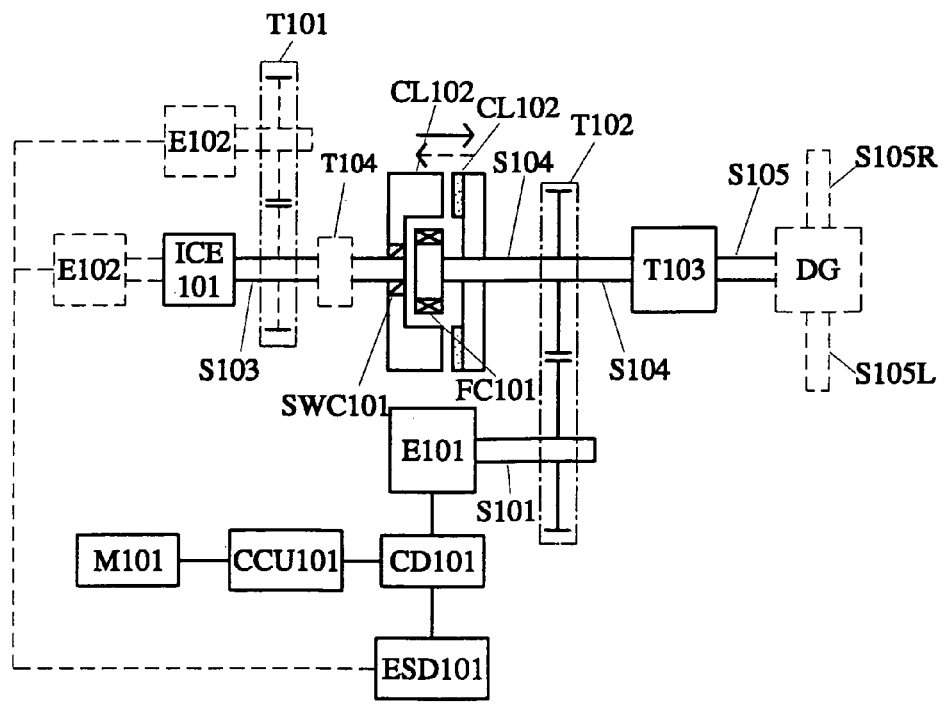
FIG. 27 is a view showing that the preferred embodiment of the present invention given in FIG. 22 is provided with a controllable clutch.

FIG. 27 is a view showing that the preferred embodiment of the present invention illustrated in FIG. 22 is provided with a controllable clutch. The centrifugal clutch FC101 and a controllable clutch CL102 are provided between the engine steering shaft S103 and the load side steering shaft S104 so to execute power coupling or interruption on both the engine steering shaft S103 and the load side steering shaft S104, to further acquire another specific function for the engine rotation power driven load. The steering shaft S103 is either directly driven by the engine ICE101, or through a transmission mechanism T104, and is coupled to the driven side of the centrifugal clutch FC101 while the load side steering shaft S104 is coupled to the drive draw side of the centrifugal clutch FC101. That is, once the load-side steering shaft S104 reaches the preset rpm, the centrifugal clutch FC101 is forthwith closed to draw the steering shaft S103 driven by the engine ECE101. The centrifugal clutch FC101 and the controllable clutch CL102 are individually provided or share the same structure.

The combination of those structures described above for to the system are subject to control by the manual control interface M101, the central control unit CCU101, the drive control device CD101 and the storage discharging device ESD101. The specific system structure described above provides functions related to those described in subparagraphs (1) through (10) or other specific function, and also provides patterns related to those operation patterns described in A1 through A3 or other specific operation pattern.

Figure 28:
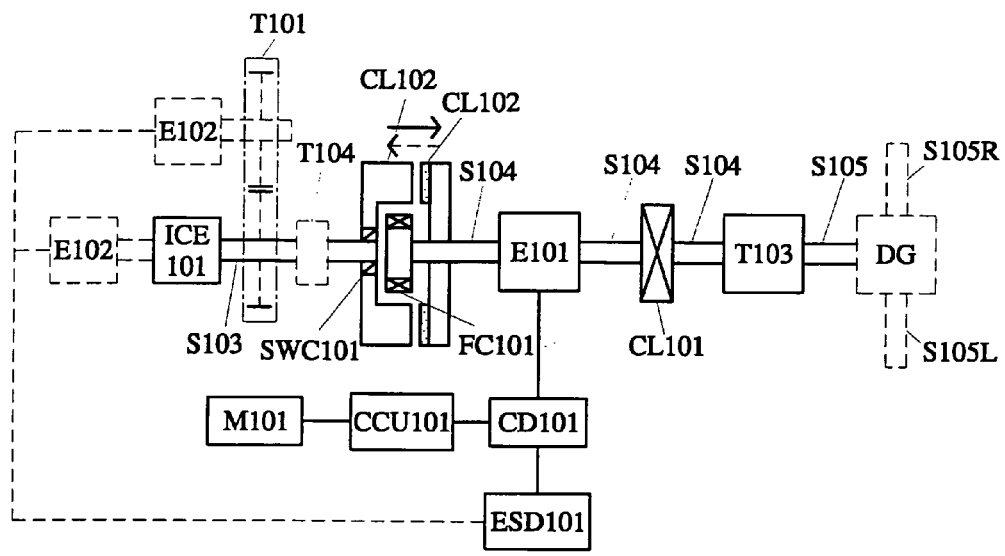
FIG. 28 is a view showing that the preferred embodiment of the present invention given in FIG. 27 is provided with an output clutch.

FIG. 28 shows the preferred embodiment illustrated in FIG. 27 is provided with an output clutch. The preferred embodiment illustrated in FIG. 27 is provided with an output clutch CL101 controlled by manual, mechanical, electromagnetic, hydraulic or centrifugal force. The output clutch CL101 is provided between the load side steering shaft S104 driven by the primary dynamo-electric unit E101 and the load. When the output clutch CL101 is closed, it provides the same function as in the preferred embodiment illustrated in FIG. 27, and additional functions when the output clutch CL101 is disengaged, including being separated from the load to permit the engine to simultaneously drive the first and the second dynamo-electric units E101 and E102 to function as generators, or to drive the primary dynamo-electric E101 alone to operate as a generator, as well as those functions related to subparagraphs (1) through (10) or other specific function, and patterns related to those operation patterns described in A1 through A3 or other specific operation pattern.

Figure 29:
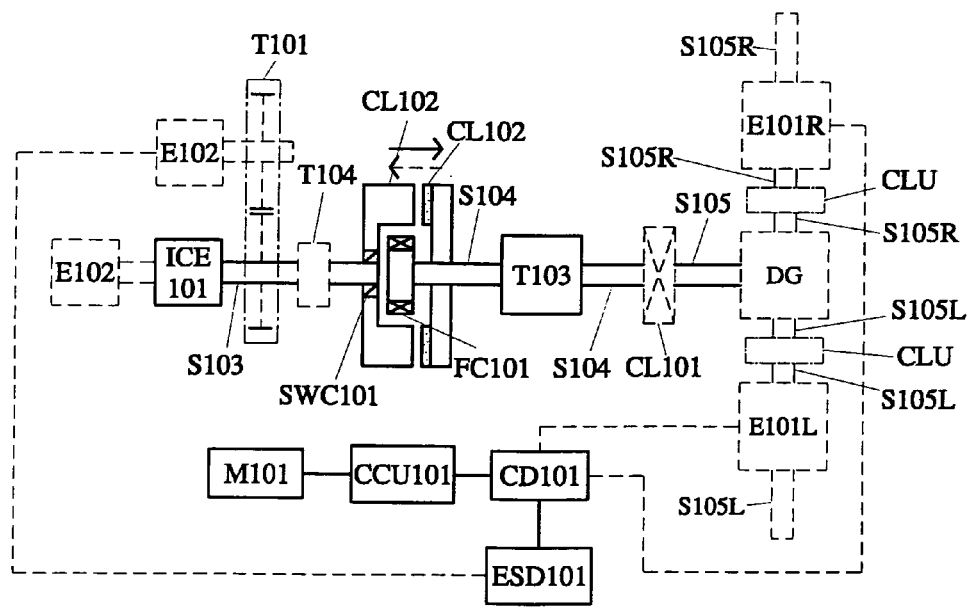
FIG. 29 is a view showing that the primary dynamo-electric unit in the preferred embodiment taken from FIG. 28 is replaced by two independent dynamo-electric unit units respectively provided by the side of two output shafts from the differential gear unit.

FIG. 29 is a schematic view showing that the preferred embodiment given in FIG. 28 in which the primary dynamo-electric unit is replaced by two independent dynamo-electric units respectively provided on the side of two output shafts of the differential gear set. The primary dynamo-electric unit E101 of the preferred embodiment in FIG. 28 is replaced by a primary dynamo-electric unit E101R to the right and another primary dynamo-electric unit E101L on the left. The primary dynamo-electric unit E101R to the right is directly connected in series with the steering shaft S105R to the right of the differential gear set DG, or alternatively, a one-way or two-way clutch is alternatively adapted with a one-way or two-way clutch CLU before being connected in series to the steering shaft S105R to the right of the differential gear set DG. The other primary dynamo-electric unit E101L on the left is directly connected in series with a steering shaft S105L to the left of a differential gear set DG, or alternatively adapted with a one-way or two-way clutch CLU, before being connected in series to the steering shaft S105L to the left of the differential gear set DG. The steering shaft S104 on the load side of the centrifugal clutch FC101 is directly outputted to the steering shaft S105 of the differential gear set DG, or through the transmission mechanism T103, before being outputted to the steering shaft S105 of the differential gear set DG, or alternatively, by means of the output clutch CL101 before being outputted to the steering shaft S105 of the differential gear set DG. Both the primary dynamo-electric unit E101R to the right and the other primary dynamo-electric unit E101L on the left are subject to equal speed or differential drive by a drive control device CD101 to provide the same functions as those by the preferred embodiment given in FIG. 28.

D. In FIGS. 30 through 37, the centrifugal clutches disposed between the steering shafts S103 driven by the engine ICE101 and the load side steering shaft S104 of the preferred embodiments given in FIGS. 9 through 16 are provided in opposition to function as drive application systems.

Figure 30:
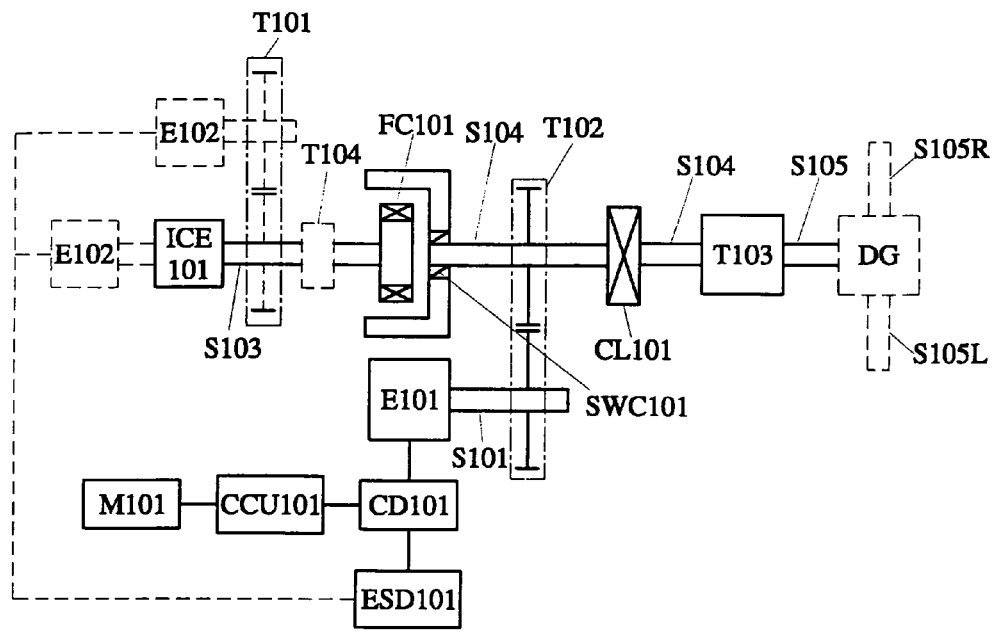
FIG. 30 is a view showing a first preferred embodiment of an application system of the preferred embodiment given in FIG. 22 in which the drive control is comprised of a centrifugal clutch provided in opposition to the acting direction and a one-way transmission mechanism with a selected steering direction.

FIG. 30 shows a first preferred embodiment of a drive application system of the present invention, in which the centrifugal clutches from the preferred embodiment of FIG. 22 are provided in opposite directions and a one-way transmission mechanism is elected for steering operation. The centrifugal clutch FC101 is provided between the steering shaft S103 driven by the engine ICE101 and the load side steering shaft S104 to control the operation of coupling or interruption the transmission by both the steering shafts S103 and S104. The steering shaft S103 driven by the engine ICE101 is coupled to the drive side of the centrifugal clutch FC101, and the load side steering shaft S104 is coupled to the driven side of the centrifugal clutch FC101, so that once the steering shaft S103 which is directly driven by the engine ICE101 or through transmission mechanism T104 reaches the preset rpm, it drives to close the centrifugal clutch FC101, thus coupling the load side steering shaft S104. The steering shaft S104 on the load side is provided to drive the load, and a fixed speed ratio or variable speed ratio or variable steering transmission mechanism T102 is provided on the steering shaft S104 on the load side to engage in mutual transmission with a primary dynamo-electric unit E101 while the other units comprising the system are the same as those provided in the preferred embodiment illustrated in FIG. 9.

The combination of those structures described above for the system are subject to control by the manual control interface M101, the central control unit CCU101, the drive control device CD101 and the storage discharging device ESD101. The specific system structure described above provides functions related to those described in subparagraphs (1) through (10) or other specific function, and also provides patterns related to those operation patterns described in A1 through A3 or other specific operation pattern.

Figure 31:
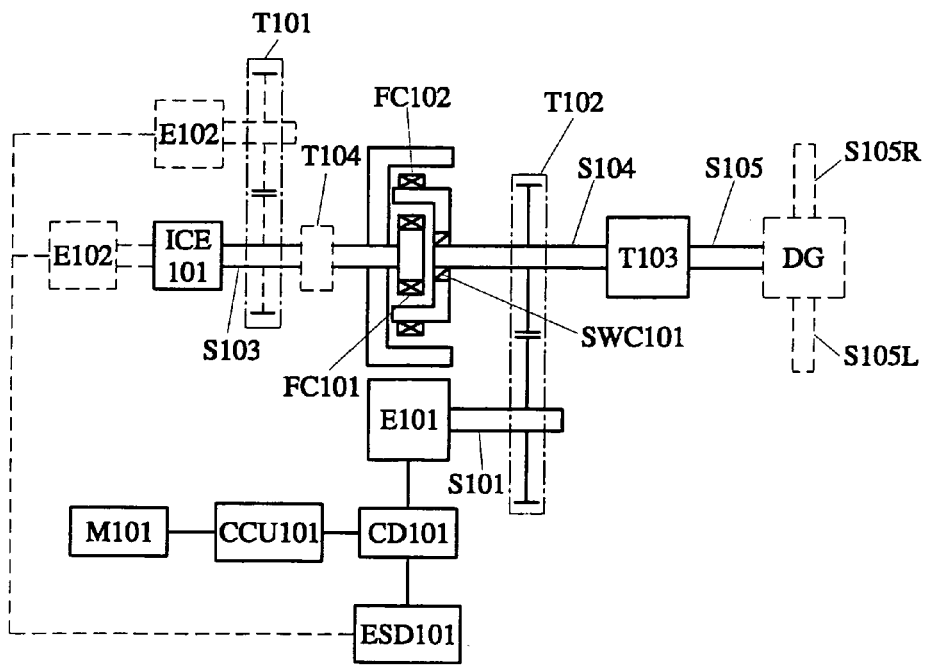
FIG. 31 is a view showing a second preferred embodiment of the preferred embodiment given in FIG. 23 in which the drive control is comprised of a centrifugal clutch provided in opposition to the acting direction and a one-way transmission mechanism with a selected steering direction.

FIG. 31 shows that a second preferred embodiment of a drive application system the present invention is comprised of having the centrifugal clutch from the preferred embodiment of FIG. 23 be provided in opposite directions and a one-way transmission mechanism selected for steering operation. The double-acting centrifugal clutches FC101 and FC102 are connected in series between the steering shaft S103 and the drive load side steering shaft S104 of the engine ICE101. The double acting centrifugal clutches FC101 and FC102 form a 3-layer structure containing an inner layer, an intermediate layer and an outer layer. The inner layer and the inner side of the intermediate layer form the centrifugal clutch FC101. The inner layer is incorporated with the steering shaft S103 on the side of the engine ICE101 and is provided with a drive power-locking unit to act outwardly when the centrifugal force reaches a preset value. The outer side of the intermediate layer and the inner side of the outer layer form the centrifugal clutch FC102. The intermediate layer is coupled to the load side steering shaft S103 and has its inner side provided with a circumferential coupling surface for power-locking, and its outer side provided with a drive power-locking unit acting outwardly when the centrifugal force reaches its preset value to function as an output clutch with the power-locking circumferential coupling surface on the inner side of the outer layer. The outer layer is also incorporated with the steering shaft S103 on the side of the engine ICE101 so to provide linkage with the load when the engine runs at low rpm or is temporarily cutoff. The load side steering shaft S103 is either directly driven by the engine or driven through a transmission mechanism T104, and is coupled through the one-way transmission mechanism SWC1 selected for steering operation to the drive side of the centrifugal clutch FC101, the load side steering shaft S104 to the driven draw side of the centrifugal clutch FC101 so to forthwith close the centrifugal clutch FC101 and further to draw the load side steering shaft S104 when the load side steering shaft S104 reaches its preset rpm. Alternatively, transmission mechanism T102 is provided on the load side steering shaft S104 to engage in mutual transmission with the primary dynamo-electric unit, while the other units comprising the system are the same as those provided in the preferred embodiment illustrated in FIG. 10.

The combination of those structures described above for the system are subject to control by the manual control interface M101, the central control unit CCU101, the drive control device CD101 and the storage discharging device ESD101. The specific to system structure described above provides functions related to those described in subparagraphs (1) through (10) or other specific function, and also provides patterns related to those operation patterns described in A1 through A3 or other specific operation pattern.

Figure 32:
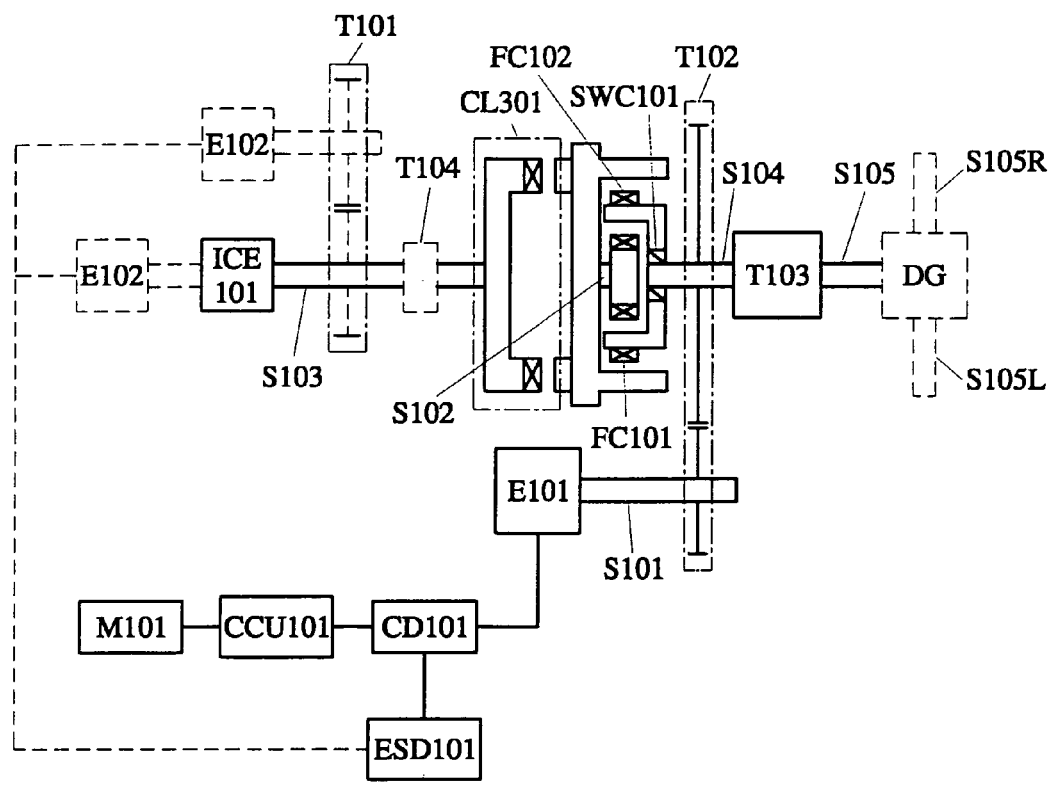
FIG. 32 is a view showing a third preferred embodiment of the preferred embodiment given in FIG. 24 in which the drive control is comprised of a centrifugal clutch provided in opposition to the acting direction and a one-way transmission mechanism with a selected steering direction.

FIG. 32 shows a third preferred embodiment of a drive application system of the present invention in which the centrifugal clutch from the preferred embodiment of FIG. 24 is provided in opposite directions and a one-way transmission mechanism selected for steering operation. The output clutch CL301 controlled by manual, mechanical, electromagnetic or hydraulic force is alternatively provided between the steering shaft S103 on the side of the engine ICE101 and the double-acting centrifugal clutches, between the drive side of the centrifugal clutch FC101 and the driven side of the centrifugal clutch FC102, while the other units comprising the system are the same as those provided in the preferred embodiment illustrated in FIG. 11.

The combination of those structures described above for the system are subject to control by the manual control interface 30 M101, the central control unit CCU101, the drive control device CD101 and the storage discharging device ESD101. The specific system structure described above provides the same functions as the preferred embodiment illustrated in FIG. 31 when the output clutch CL301 is closed; and when the output clutch CL301 is disengaged, the specific system structured described above provides additional functions related to those described in subparagraphs (1) through (10) or other specific functions, and also provides patterns related to those operation patterns described in A1 through A3 or other specific operation pattern.

Figure 33:
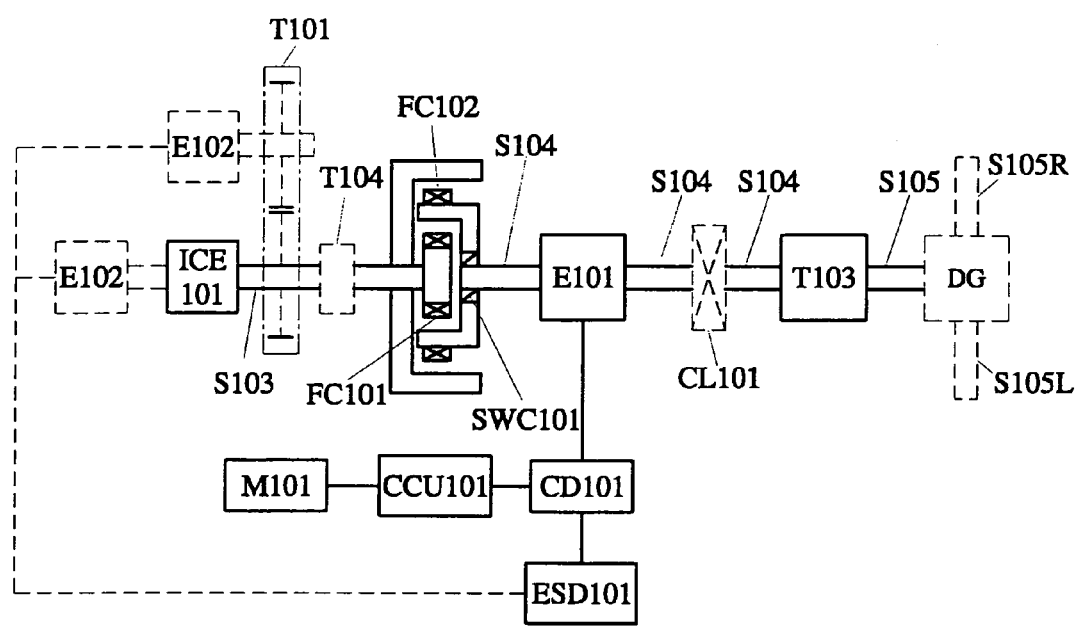
FIG. 33 is a view showing a fourth preferred embodiment of an application system of the preferred embodiment given in FIG. 25 in which the drive control is comprised of an centrifugal clutch provided in opposition to the acting direction and a one-way transmission mechanism with a selected steering direction.

FIG. 33 shows that a fourth preferred embodiment of a drive application system the present invention is comprised of having the centrifugal clutch from the preferred embodiment of FIG. 25 be provided in opposite directions and a one-way transmission mechanism selected for steering operation. The dynamo-electric unit E101 and the load side steering shaft S104 are arranged as a coaxial structure with the double-acting centrifugal clutches FC101 and FC102 provided between the dynamo-electric unit E101 and the engine ICE101. The intermediate structure is incorporated with the load side steering shaft S104 in the same structure of the output shaft of the primary dynamo-electric unit E101, and its inner and outer layers are incorporated with the engine steering shaft S103. The double acting centrifugal clutches FC101 and FC102 form a 3-layer structure containing an inner layer, an intermediate layer and an outer layer. The inner layer and the inner side of the intermediate layer form the centrifugal clutch FC101, the inner layer incorporated to the engine steering shaft S103 is provided with a drive power-locking unit to act outwardly when the centrifugal force reaches a preset value; the outer side of the intermediate layer and the inner side of the outer layer form the centrifugal clutch FC102. The intermediate layer is coupled to the steering shaft S103 driven by the primary dynamo-electric unit E101 having its inner side provided with circumferential coupling surface for power-locking and its outer side provided with a drive power-locking unit acting outward when the centrifugal force reaches its preset value to function as an output clutch with the power-locking circumferential coupling surface on the inner side of the outer layer. The drive side of the centrifugal clutch FC101 is incorporated with the steering shaft S103 on the side of the engine ICE101 so to couple to the engine to drive the load when the engine runs at high rpm, and to cut off the linkage to the load when the engine runs at low rpm. The engine ICE101 is either directly or by means of the steering shaft S103 driven by transmission mechanism T104, and is coupled to the drive side of the centrifugal clutch FC101 and the driven side of the other centrifugal clutch FC102. Meanwhile, the load side steering shaft S104 is coupled to the driven side of the centrifugal clutch FC101 and the drive side of the other centrifugal clutch FC102 so that when the load side steering shaft S104 reaches its preset rpm, the other centrifugal clutch FC102 is closed thus to draw the steering shaft S103 driven by the engine ICE101, or when the steering shaft S103 on the side of the engine ICE101 reaches its preset rpm, the centrifugal clutch FC101 is closed, thereby causing the load side steering shaft S104 to drive the load. As required, the output clutch CL101 is provided between the output side of the primary dynamo-electric unit E101 and the transmission mechanism T103. The output clutch CL101 is controlled by manual, mechanical, electromagnetic, hydraulic or centrifugal force while the other units comprising the system are the same as those provided in the preferred embodiment illustrated in FIG. 12.

The combination of those structures described above for to the system are subject to control by the manual control interface M101, the central control unit CCU101, the drive control device CD101 and the storage discharging device ESD101. The specific system structure described above provides functions related to those described in subparagraphs (1) through (10) or other 15 specific function, and also provides patterns related to those operation patterns described in A1 through A3 or other specific operation pattern.

Figure 34:
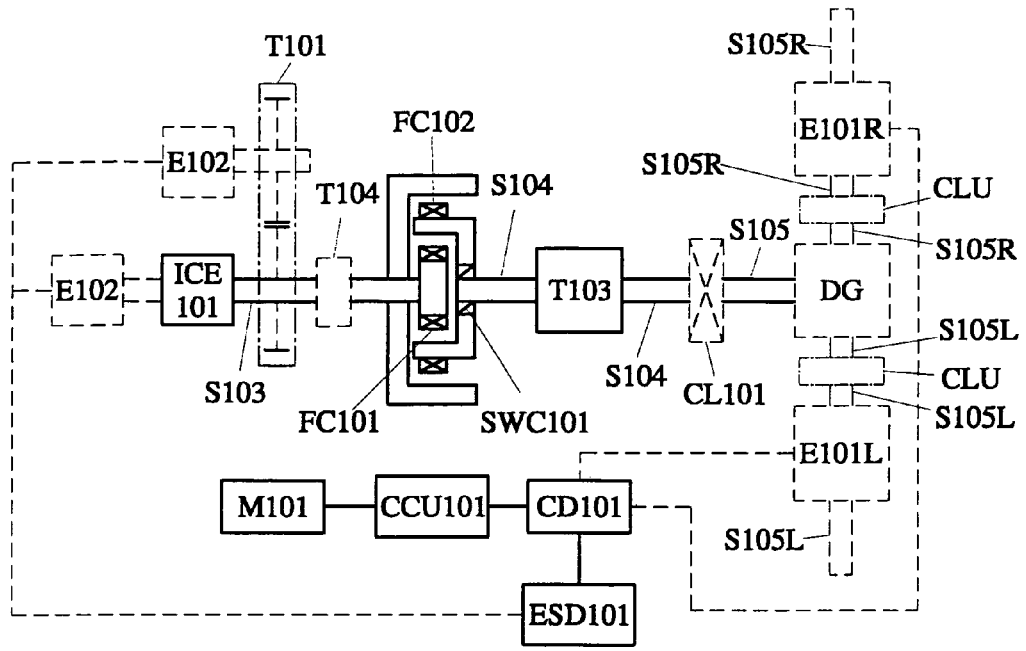
FIG. 34 is a view showing that the primary dynamo-electric unit in the preferred embodiment taken from FIG. 33 is replaced by two independent dynamo-electric unit units respectively provided by the side of two output shafts from the differential gear unit.

FIG. 34 is a schematic view showing that the primary dynamo-electric unit in the preferred embodiment taken from FIG. 33 is replaced by two independent dynamo-electric units respectively provided on the side of two output shafts of the differential gear set. The primary dynamo-electric unit E101 of the preferred embodiment in FIG. 33 is replaced by a primary dynamo-electric unit E101R to the right and another primary dynamo-electric unit E101L on the left. The primary dynamo-electric unit E101R to the right is directly connected in series with the steering shaft S105R to the right of the differential gear set DG, or alternatively, adapted with a one-way or two-way clutch CLU before being connected in series to the steering shaft S105R to the right of the differential gear set DG. The other primary dynamo-electric unit E101L on the left is directly connected in series with a steering shaft S105L to the left of a differential gear set DG or alternatively adapted with a one-way or two-way clutch CLU before being connected in series to the steering shaft S105L to the left of the differential gear set DG. The steering shaft S104 on the load side of the centrifugal clutch FC101 is directly outputted to the steering shaft S105 of the differential gear set DG, or through transmission mechanism T103 before being outputted to the steering shaft S105 of the differential gear set DG, or alternatively, by means of the output clutch CL101, before being outputted to the steering shaft S105 of the differential gear set DG. Both the primary dynamo-electric unit E101R to the right and the other primary dynamo-electric unit E101L on the left are subject to equal speed or differential drive by a drive control device CD101.

Figure 35:
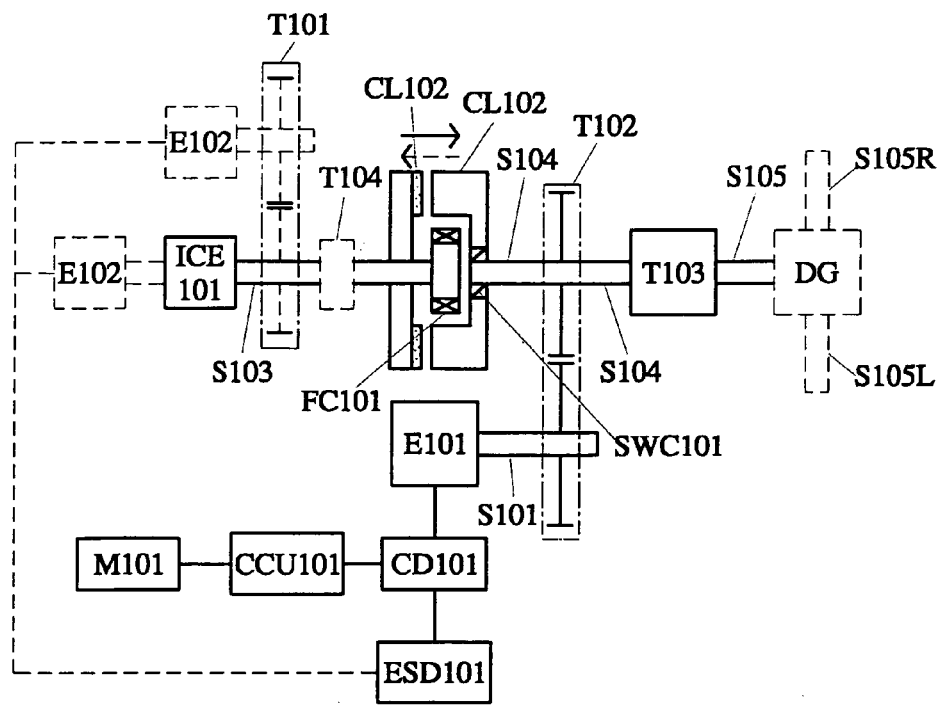
FIG. 35 is a view showing that the preferred embodiment of the present invention given in FIG. 30 is provided with a 25 controllable clutch.

FIG. 35 shows that the preferred embodiment of FIG. 30 is provided with the centrifugal clutch FC101 and another clutch CL102 of the type described above between the engine steering shaft S103 and the load side steering shaft S104 so as to execute power coupling or interruption on both of the engine steering shaft S103 and the load side steering shaft S104. The steering shaft S103 is either directly driven by the engine ICE101, or through transmission mechanism T104, and is coupled to the drive side of the centrifugal clutch FC101 while the load side steering shaft S104 is coupled to the driven side of the centrifugal clutch FC101. That is, once the steering shaft S103 on the side of the engine ICE101 reaches the preset rpm, the centrifugal clutch FC101 is forthwith closed to couple to the load side steering shaft S104. The centrifugal clutch FC101 and the controllable clutch CL102 are individually provided or share the same structure, while the other units comprising the system are the same as those provided in the preferred embodiment illustrated in FIG. 30.

The combination of those structures described above for the system are subject to control by the manual control interface M101, the central control unit CCU101, the drive control device CD101 and the storage discharging device ESD101. The specific system structure described above provides functions related to those described in subparagraphs (1) through (10) or other specific function, and also provides patterns related to those operation patterns described in A1 through A3 or other specific operation pattern.

Figure 36:
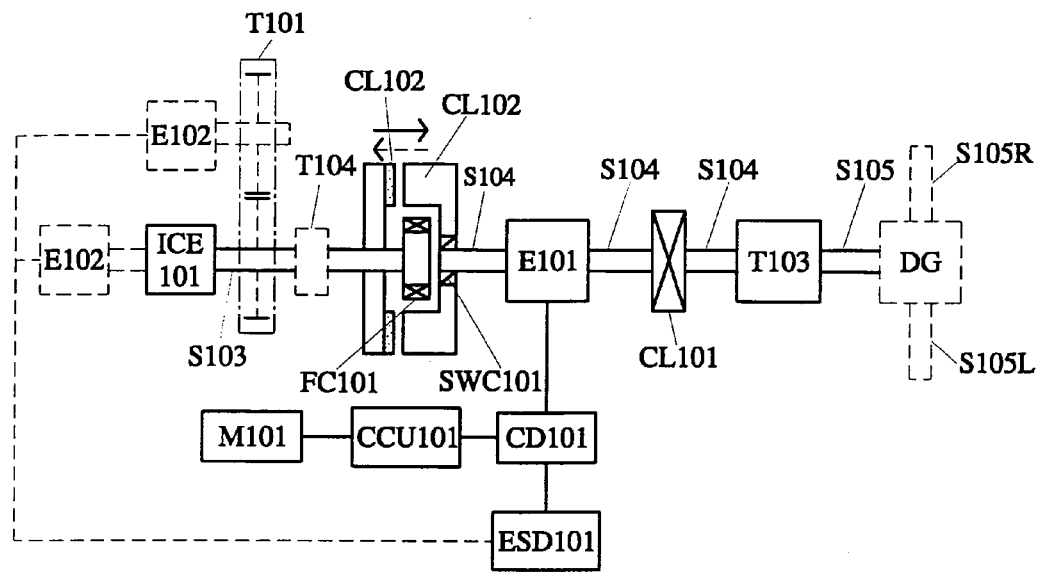
FIG. 36 is a view showing that the preferred embodiment of the present invention given in FIG. 35 is provided with an output clutch.

FIG. 36 shows that the preferred embodiment of FIG. 35 is provided with an output clutch CL101 disposed at where between the load side steering shaft S104 driven by the primary dynamo-electric unit E101 and the load. When the output shaft CL101 is closed, it provides the same functions as those by the preferred embodiment given in FIG. 35; and when it is disengaged, the engine ICE101 simultaneously drives the primary dynamo-electric unit E101 and the secondary dynamo-electric unit E102 to operate as a generator, or the primary dynamo-electric unit E101 is driven alone to operate as a generator and also provide additional functions related to those described in subparagraphs (1) through (10) or other specific function, and also provides patterns related to those operation patterns described in A1 through A3 or other specific operation pattern.

Figure 37:
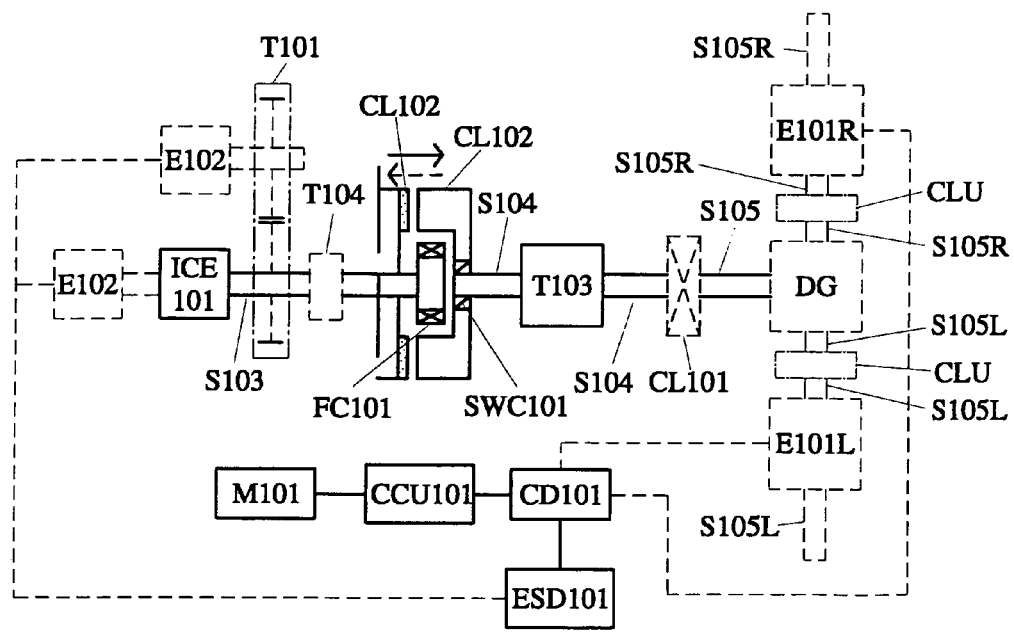
FIG. 37 is a view showing that the primary dynamo-electric unit in the preferred embodiment taken from FIG. 36 is replaced by two independent dynamo-electric unit units respectively provided by the side of two output shafts from the differential gear unit.

FIG. 37 is a schematic view showing that the primary dynamo-electric unit in the preferred embodiment taken from FIG. 36 is replaced by two independent dynamo-electric units respectively provided on the side of two output shafts of the differential gear set. The primary dynamo-electric unit E101 of the preferred embodiment in FIG. 36 is replaced by a primary dynamo-electric unit E101R to the right and another primary dynamo-electric unit E101L on the left. The primary dynamo-electric unit E101R to the right is directly connected in series with the steering shaft S105R to the right of the differential gear set DG, or alternatively, adapted with a one-way or two-way clutch CLU before being connected in series to the steering shaft S105R to the right of the differential gear set DG. The other primary dynamo-electric unit E101L on the left is directly connected in series with a steering shaft S105L to the left of a differential gear set DG or alternatively adapted with a one-way or two-way clutch CLU before being connected in series to the steering shaft S105L to the left of the differential gear set DG. The steering shaft S104 on the load side of the centrifugal clutch FC101 is directly outputted to the steering shaft S105 of the differential gear set DG, or through the transmission mechanism T103, before being outputted to the steering shaft S105 of the differential gear set DG, or alternatively, by means of the output clutch CL101, before being outputted to the steering shaft to S105 of the differential gear set DG. Both the primary dynamo-electric unit E101R to the right and the other primary dynamo-electric unit E101L on the left are subject to equal speed or differential drive by a drive control device CD101, while providing the same functions as those provided in the preferred embodiment illustrated in FIG. 36.

E. FIGS. 38 through 45 show preferred embodiments of the application system that are provided in each preferred embodiment with a one-way transmission mechanism SWC101 between the steering shaft S103 connected to the engine ICE101 and the driven side of the centrifugal clutch FC101, and an output shaft S104 connected to the drive side of the centrifugal clutch FC101.

Figure 38:
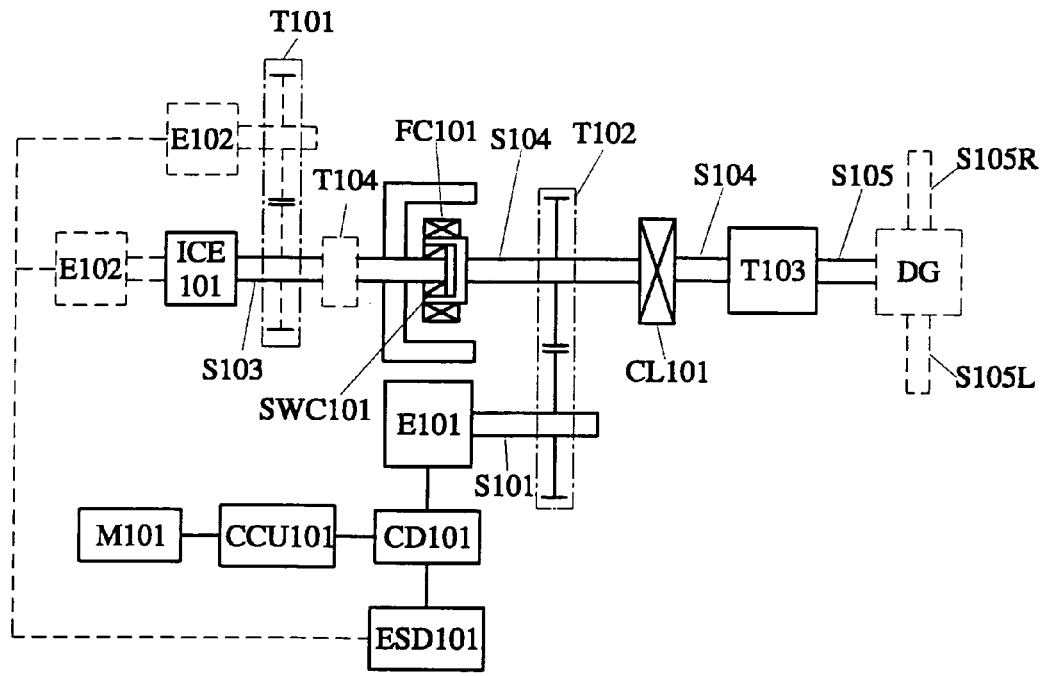
FIG. 38 is a first preferred embodiment of an application system taken from FIG. 1 in which a one-way transmission mechanism is provided between a steering shaft incorporated with the engine on the driven side of the centrifugal clutch and an output shaft on the drive side of the centrifugal clutch.

FIG. 38 shows a first preferred embodiment of an application system taken from the preferred embodiment illustrated in FIG. 1, which is changed in that a one-way transmission mechanism is provided between the steering shaft of the engine on the driven side of the centrifugal clutch and the output shaft incorporated with the drive side of the centrifugal clutch. The centrifugal clutch FC101 and the one-way transmission mechanism SWC101 are selected for steering operation to control the operation of both steering shafts S103 and S104 to couple or interrupt transmission, and are provided between the steering shaft S103 driven by the engine ICE101 and the load side steering shaft S104. The steering shaft S103 driven by the engine ICE101 is coupled to the driven side of the centrifugal clutch FC101 while the load side steering shaft S104 is coupled to the drive side of the centrifugal clutch FC101 so that when the load side steering shaft S104 reaches its preset rpm, the centrifugal clutch FC101 is forthwith closed, thus to cause the steering shaft S103 to either be directly driven by the engine ICE101, or driven via the transmission mechanism T104. The load side steering shaft S104 is provided to drive the load and transmission mechanism T102 described above may be provided on the load side steering shaft S104 to engage in mutual transmission with the primary dynamo-electric unit E101 while the other units comprising the system are the same as those provided in the preferred embodiment illustrated in FIG. 1.

The combination of those structures described above for the system are subject to control by the manual control interface M101, the central control unit CCU101, the drive control device CD101 and the storage discharging device ESD101. The specific system structure described above provides functions related to those described in subparagraphs (1) through (10) or other specific function, and also provides patterns related to those operation patterns described in A1 through A3 or other specific operation pattern.

Figure 39:
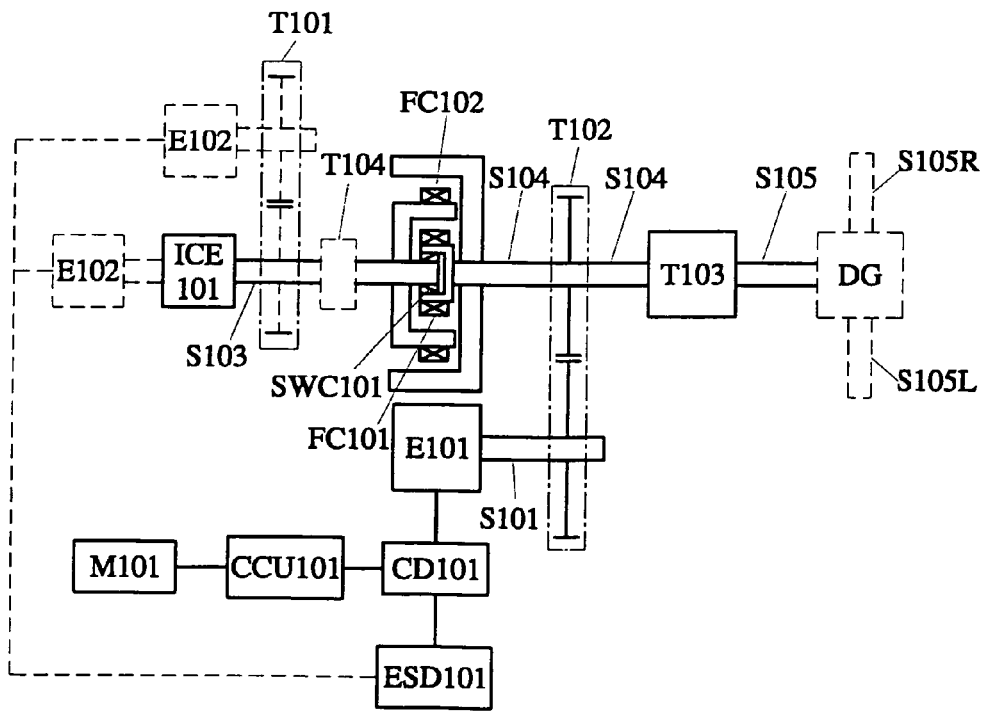
FIG. 39 is a second preferred embodiment of an application system taken from FIG. 2 in which a one-way transmission mechanism is provided between a steering shaft incorporated with the engine on the driven drawing side of the centrifugal clutch and an output shaft on the drive side of the centrifugal clutch.

FIG. 39 shows a second preferred embodiment of an application system taken from the preferred embodiment illustrated in FIG. 2. A one-way transmission mechanism is provided between the steering shaft of the engine on the driven side of the centrifugal clutch and the output shaft on the drive draw side of the centrifugal clutch. The double-acting centrifugal clutches FC101 and FC102 are connected in series and in sequence between the steering shaft S103 and the load side steering shaft S104 of the engine ICE101, and on the one-way transmission to mechanism SWC101 selected for steering operation. The double acting centrifugal clutches FC101 and FC102 form a 3-layer structure containing an inner layer, an intermediate layer and an outer layer. The inner layer and the inner side of the intermediate layer form the centrifugal clutch FC101. The inner layer incorporated to the load side steering shaft S104 and is provided with a drive power-locking unit to act outwardly when the centrifugal force reaches a preset value. The outer side of the intermediate layer and the inner side of the outer layer form the centrifugal clutch FC102. The intermediate layer is coupled to the steering shaft S103 driven by the engine having its inner side provided with a circumferential coupling surface for power-locking and its outer side provided with a drive power-locking unit acting outwardly when the centrifugal force reaches its preset value to function as an output clutch with the power-locking circumferential coupling surface on the inner side of the outer layer. The outer layer is also incorporated to the load side steering shaft S104 so as to provide linkage with the load when the engine runs at low rpm or is temporarily cutoff. The steering shaft S103 is either directly driven by the engine or driven through transmission mechanism T104, and is coupled to the driven side of the centrifugal clutch FC101, the load side steering shaft S104 being coupled to the drive side of the centrifugal clutch FC101 so as to forthwith close the centrifugal clutch FC101 and further to cause the steering shaft S103 to be driven by the engine ICE101 when the load side steering shaft S104 reaches its preset rpm. Alternatively, transmission mechanism T102 may be provided on the load side steering shaft S104 to engage in mutual transmission with the primary dynamo-electric unit while the other units comprising the system are the same as those disclosed in the preferred embodiment illustrated in FIG. 2.

The combination of those structures described above for the system are subject to control by the manual control interface M101, the central control unit CCU101, the drive control device CD101 and the storage discharging device ESD101. The specific system structure described above provides functions related to those described in subparagraphs (1) through (10) or other specific function, and also provides patterns related to those operation patterns described in A1 through A3 or other specific operation pattern.

Figure 40:
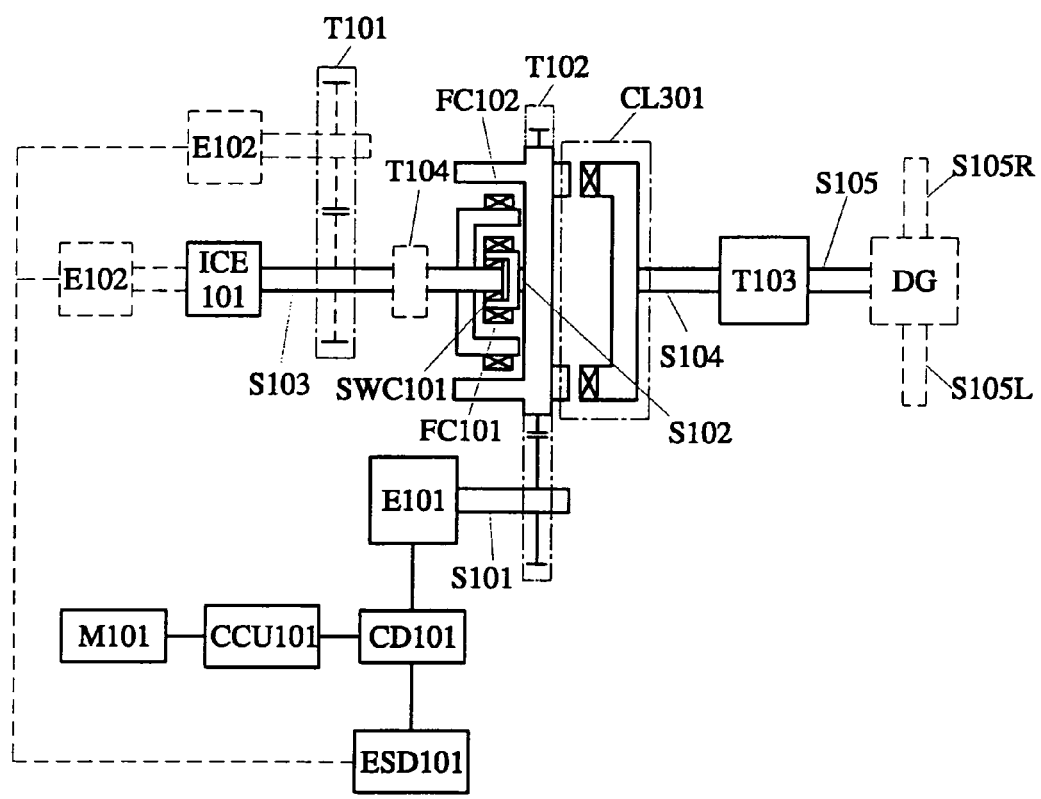
FIG. 40 is a third preferred embodiment of an application system taken from FIG. 3 in which a one-way transmission mechanism is provided between a steering shaft incorporated with the engine on the driven drawing side of the centrifugal clutch and an output shaft on the drive side of the centrifugal clutch.

FIG. 40 shows a third preferred embodiment of an application system taken from the preferred embodiment illustrated in FIG. 3, in which a one-way transmission mechanism is provided between the steering shaft of the engine incorporated on the driven side of the centrifugal clutch and the output shaft incorporated on the drive side of the centrifugal clutch. The transmission mechanism T102 taken from the preferred embodiment illustrated in FIG. 39 is jointly incorporated with the intermediate steering shaft S102 into the coupling surface of the inner circumference of the double-acting centrifugal clutch FC101 for power locking and the coupling surface of the outer circumference of the double-acting centrifugal clutch FC102. The double-acting centrifugal clutches are comprised of two units of centrifugal to clutches FC101 and FC102 inserted within each other in a three-layer structure, including inner, intermediate, and an outer layers as described above. The steering shaft S103 is either directly driven or driven through transmission mechanism T104 by the engine and is coupled to the s driven side of the centrifugal clutch FC101, the one-way transmission mechanism SWC101 selected for steering operation being provided between the steering shaft S103 and the intermediate shaft S102 while the intermediate shaft S102 is coupled to the drive side of the centrifugal clutch FC101 so as to forthwith to close the centrifugal clutch FC101 and further to draw the steering shaft S103 driven by the engine ICE101 when the intermediate steering shaft S102 reaches its preset rpm.

The intermediate steering shaft S102 is directly outputted to the load, or alternatively, to an output clutch CL301, before being outputted to the load via the load side steering shaft S104, or as required, to execute single shaft output through transmission mechanism T103, then through a steering shaft S105; or through an optional transmission mechanism comprised of a differential gear set DG for differential output through two units of differential steering shafts S105R and S105L. The additional output clutch CL301 is provided between the intermediate steering shaft S102 and the load side steering shaft S104 with both steering shafts driven by the power-locking coupling surfaces on the inner and outer circumferences of the double-acting centrifugal clutches FC101 and FC102 while the other units comprising the system are the same as those disclosed in the preferred embodiment illustrated in FIG. 3.

The combination of those structures described above for the system are subject to control by the manual control interface M101, the central control unit CCU101, the drive control device CD101 and the storage discharging device ESD101. The specific system structure described above provides same functions same as those by the preferred embodiment illustrated in FIG. 39 when the output clutch CL301 is closed; and when the output clutch CL301 is disengaged, the specific system structure to described above provides additional functions related to those described in subparagraphs (1) through (10) or other specific function, and also provides patterns related to those operation patterns described in A1 through A3 or other specific operation pattern.

Figure 41:
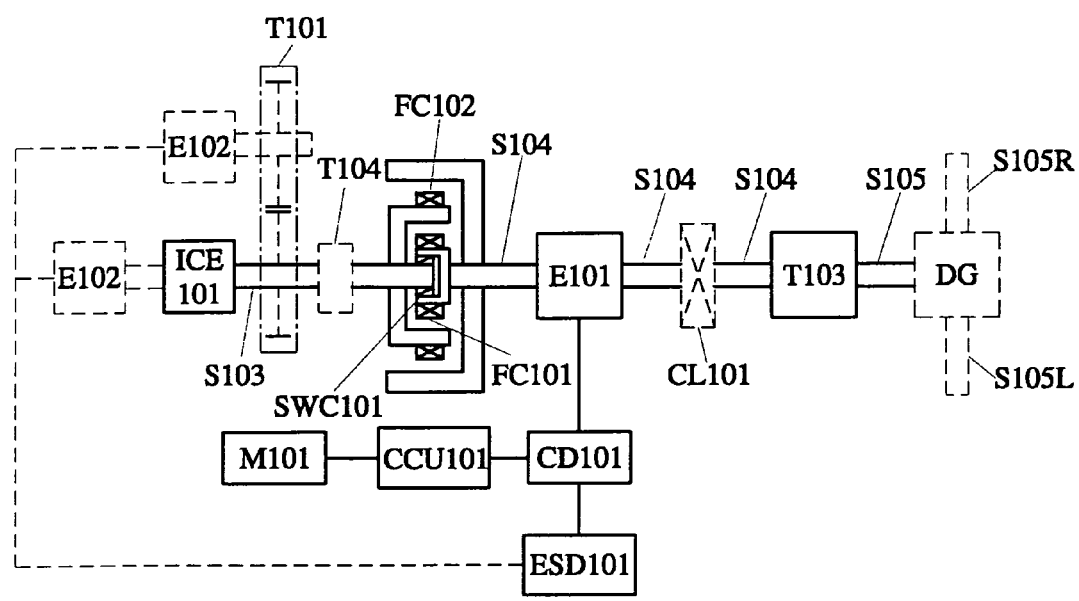
FIG. 41 is a fourth preferred embodiment of an application system taken from FIG. 4 in which a one-way transmission mechanism is provided between a steering shaft having the engine on the driven drawing side of the centrifugal clutch and an output shaft on the drive side of the centrifugal clutch.

FIG. 41 shows a fourth preferred embodiment of an application system taken from the preferred embodiment illustrated in FIG. 4. A one-way transmission mechanism is provided between the steering shaft of the engine incorporated with the driven side of the centrifugal clutch and the output shaft incorporated with the drive side of the centrifugal clutch. The primary dynamo-electric unit E101 and the load side steering shaft S104 form a coaxial structure and the double-acting centrifugal clutches FC101 and FC102 are provided between the dynamo-electric unit E101 and the engine ICE101 with its inner and outer structures incorporated with the load side steering shaft S104, which in turn is incorporated with the output terminal of the primary dynamo-electric unit E101, its intermediate structure being incorporated with the steering shaft S103 driven by the engine ICE101. The double-acting centrifugal clutches are comprised of two units of centrifugal clutches FC101 and FC102 inserted into each other in a three-layer structure, including inner, intermediate, and outer layers, again as described above. The one-way transmission mechanism SWC101 selected for steering operation is provided between the steering shaft S103 and the load side steering shaft S104, and the load side steering shaft S104 is incorporated with the drive side of the centrifugal clutch FC101 so that once the load side steering shaft S104 reaches its rpm, the centrifugal clutch FC101 is closed to couple the steering shaft S103 driven by the engine ICE101. The output clutch CL101 when required is provided between the output side of the primary dynamo-electric unit E101 and the transmission mechanism T103. The output clutch CL101 is controlled by manual, mechanical, electromagnetic, hydraulic or centrifugal force while the other units comprising the system are the same as those provided in the preferred embodiment illustrated in FIG. 4.

The combination of those structures described above for the system are subject to control by the manual control interface M101, the central control unit CCU101, the drive control device CD101 and the storage discharging device ESD101. The specific system structure described above provides functions related to those described in subparagraphs (1) through (10) or other specific function, and also provides patterns related to those operation patterns described in A1 through A3 or other specific operation pattern.

Figure 42:
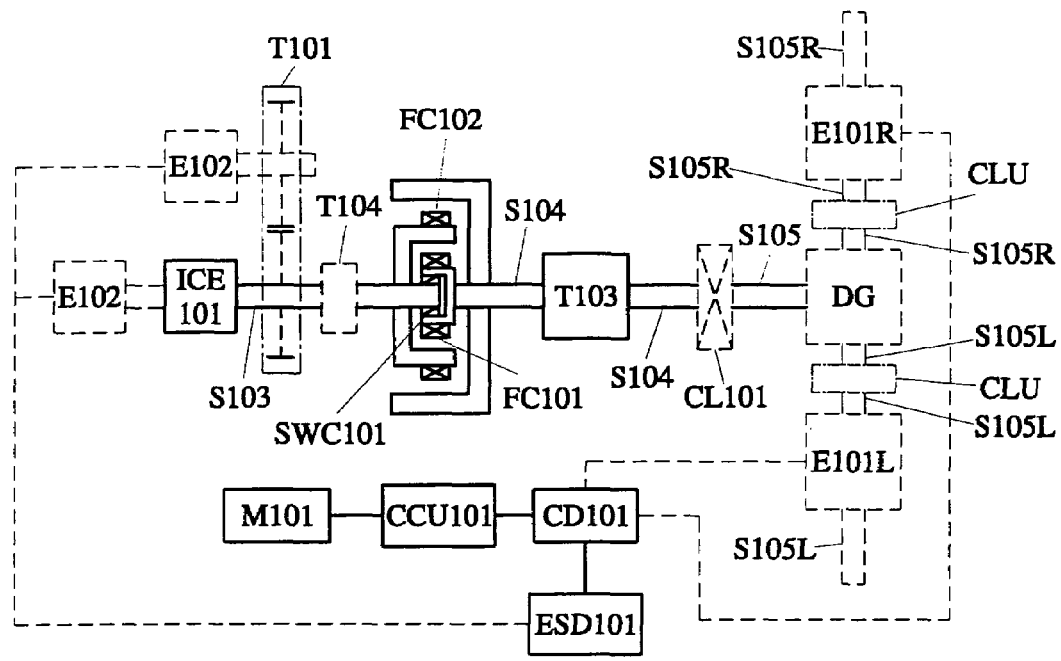
FIG. 42 is a view showing that the primary dynamo-electric unit in the preferred embodiment taken from FIG. 41 is replaced by two independent dynamo-electric units respectively provided by the side of two output shafts from the differential gear unit.

FIG. 42 is a schematic view showing a modification of the preferred embodiment illustrated in FIG. 41 in which the primary dynamo-electric unit is replaced by two independent dynamo-electric units respectively provided on the side of two output shafts of a differential gear set. The primary dynamo-electric unit E101 of the preferred embodiment in FIG. 41 are replaced by a primary dynamo-electric unit E101R to the right and another primary dynamo-electric unit E101L on the left. The primary dynamo-electric unit E101R to the right is directly connected in series with the steering shaft S105R to the right of the differential gear set DG, or alternatively adapted with a one-way or two-way clutch CLU before being connected in series to the steering shaft S105R to the right of the differential gear set DG. The other primary dynamo-electric unit E101L on the left is directly connected in series with a steering shaft S105L to the left of a differential gear set DG or alternatively adapted to with a one-way or two-way clutch CLU before being connected in series to the steering shaft S105L to the left of the differential gear set DG. The steering shaft S104 on the load side of the centrifugal clutch FC101 is directly outputted to the steering shaft S105 of the differential gear set DG, or through the fixed or variable speed ratio or variable steering transmission or planetary transmission mechanism T103 before being outputted to the steering shaft S105 of the differential gear set DG, or alternatively, by means of the output clutch CL101, before being outputted to the steering shaft S105 of the differential gear set DG. Both the primary dynamo-electric unit E101R to the right and the other primary dynamo-electric unit E101L on the left are subject to equal speed or differential drive by a drive control device CD101.

Figure 43:
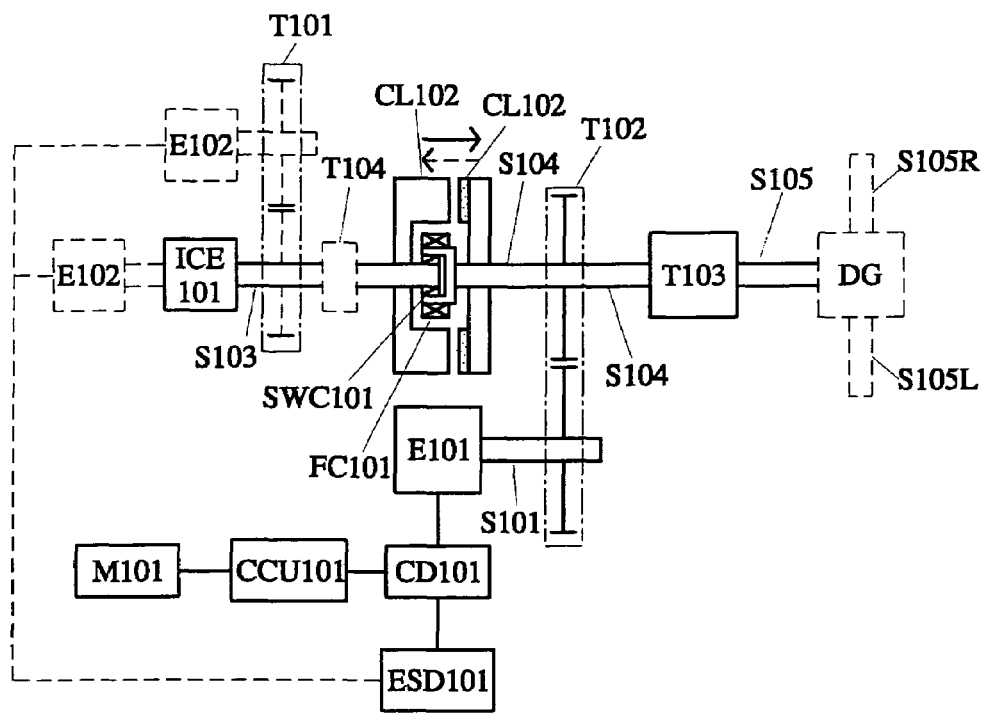
FIG. 43 is a view showing that the preferred embodiment of the present invention given in FIG. 38 is provided with a controllable clutch.

FIG. 43 is a view showing that the preferred embodiment taken from FIG. 38 of the present invention is provided with a controllable clutch. The centrifugal clutch FC101 and another clutch CL102 described above are provided between the engine steering shaft S103 and the load side steering shaft S104 so to execute power coupling or interruption on both of the engine steering shaft S103 and the load side steering shaft S104 to further acquire another specific function for the engine rotation power driven load. The steering shaft S103 is either directly driven by the engine ICE101, or driven through transmission mechanism T104, and is coupled to the driven side of the centrifugal clutch FC101 while the load side steering shaft S104 is coupled to the drive side of the centrifugal clutch FC101. That is, once the load-side steering shaft S104 reaches the preset rpm, the centrifugal clutch FC101 is forthwith closed to cause the steering shaft S103 to be driven by the engine ICE101. The centrifugal clutch FC101 and the controllable clutch CL102 are individually provided or share the same structure;

The combination of those structures described above for the system are subject to control by the manual control interface M101, the central control unit CCU101, the drive control device CD101 and the storage discharging device ESD101. The specific system structure described above provides functions related to those described in subparagraphs (1) through (10) or other specific function, and also provides patterns related to those operation patterns described in A1 through A3 or other specific operation pattern.

Figure 44:
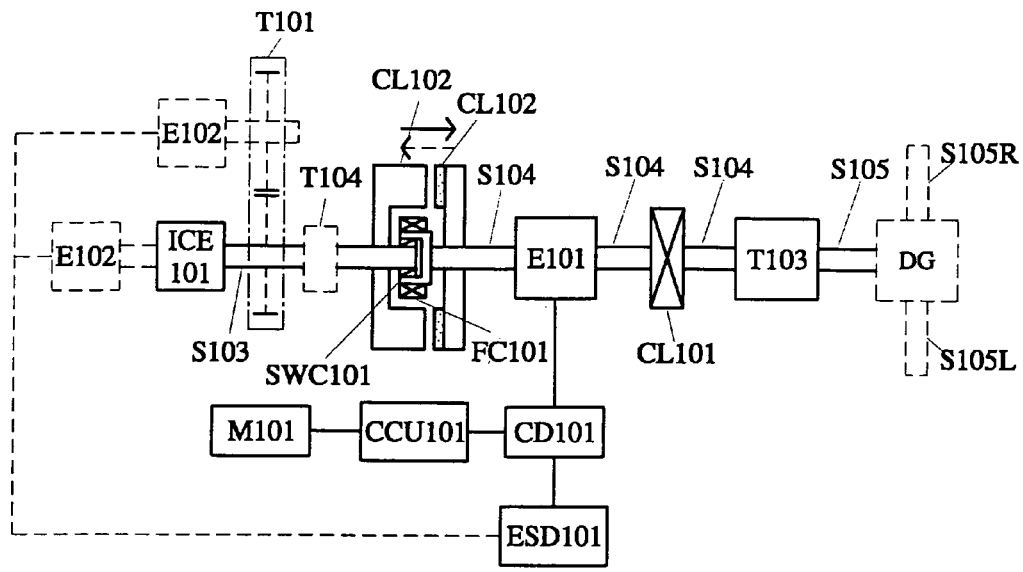
FIG. 44 is a view showing that the preferred embodiment of the present invention given in FIG. 43 is provided with an output clutch.

FIG. 44 is a view showing that the preferred embodiment given in FIG. 43 is provided with an output clutch CL101 as described above. The output clutch CL101 is provided between the load side steering shaft S104 driven by the primary dynamo-electric unit E101 and the load. When the output clutch CL101 is closed, it provides the same function as the preferred embodiment illustrated in FIG. 43; and additional functions when the output clutch CL101 is disengaged, including being separated from the load to permit the engine to simultaneously drive the first and the second dynamo-electric units E101 and E102 to function as generators, or to drive the primary dynamo-electric E101 alone to operate as a generator while the primary dynamo-electric unit E101 is provided between the output clutch CL101 and the controllable clutch CL102; as well as those functions related to subparagraphs (1) through (10) or other specific function, and patterns related to those operation patterns described in A1 through A3 or other specific operation pattern.

Figure 45:
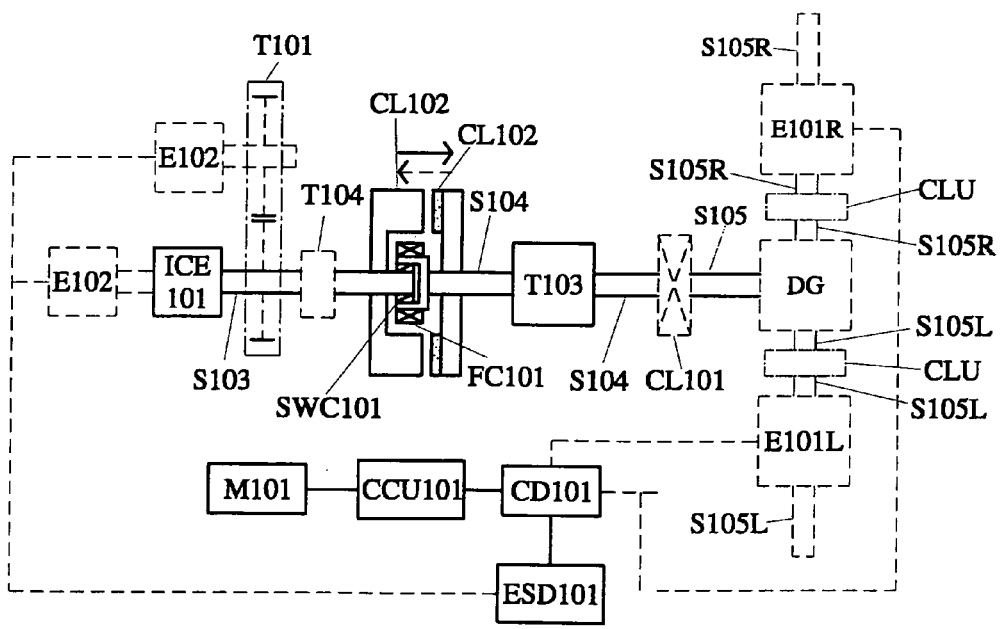
FIG. 45 is a view showing that the primary dynamo-electric unit in the preferred embodiment taken from FIG. 44 is replaced by two independent dynamo-electric units respectively provided by the side of two output shafts from the differential gear unit.

FIG. 45 is a schematic view showing a further modification of the preferred embodiment illustrated in FIG. 44 in which the primary dynamo-electric unit is replaced by two independent dynamo-electric units respectively provided on the side of two output shafts of a differential gear set. The primary dynamo-electric unit E101 of the preferred embodiment in FIG. 44 is replaced by a primary dynamo-electric unit E101R to the right and another primary dynamo-electric unit E101L on the left. The primary dynamo-electric unit E101R to the right is directly connected in series with the steering shaft S105R to the right of the differential gear set DG, or alternatively adapted with a one-way or two-way clutch CLU before being connected in series to the steering shaft S105R to the right of the differential gear set DG. The other primary dynamo-electric unit E101L on the left is directly connected in series with a steering shaft S105L to the left of a differential gear set DG or alternatively adapted with a one-way or two-way clutch CLU before being connected in series to the steering shaft S105L to the left of the differential gear set DG. The steering shaft S104 on the load side of the centrifugal clutch FC101 is directly outputted to the steering shaft S105 of the differential gear set DG, or through the transmission mechanism T103 before being outputted to the steering shaft S105 of the differential gear set DG, or alternatively, by means of the output clutch CL101, before being outputted to the steering shaft S105 of the differential gear set DG. Both the primary dynamo-electric unit E101R to the right and the other primary dynamo-electric unit E101L on the left are subject to equal speed or differential drive by a drive control device CD101 for providing functions same as those described for the preferred embodiment illustrated in FIG. 44.

F. As illustrated in FIGS. 46 through 53, the preferred embodiments taken from FIGS. 38 through 45 are further provided with various centrifugal clutches and a one-way transmission mechanism SWC101 between the steering shaft S103 and the load side steering shaft S104 driven by the engine ICE101 in opposition direction to function as the drive application system.

Figure 46:
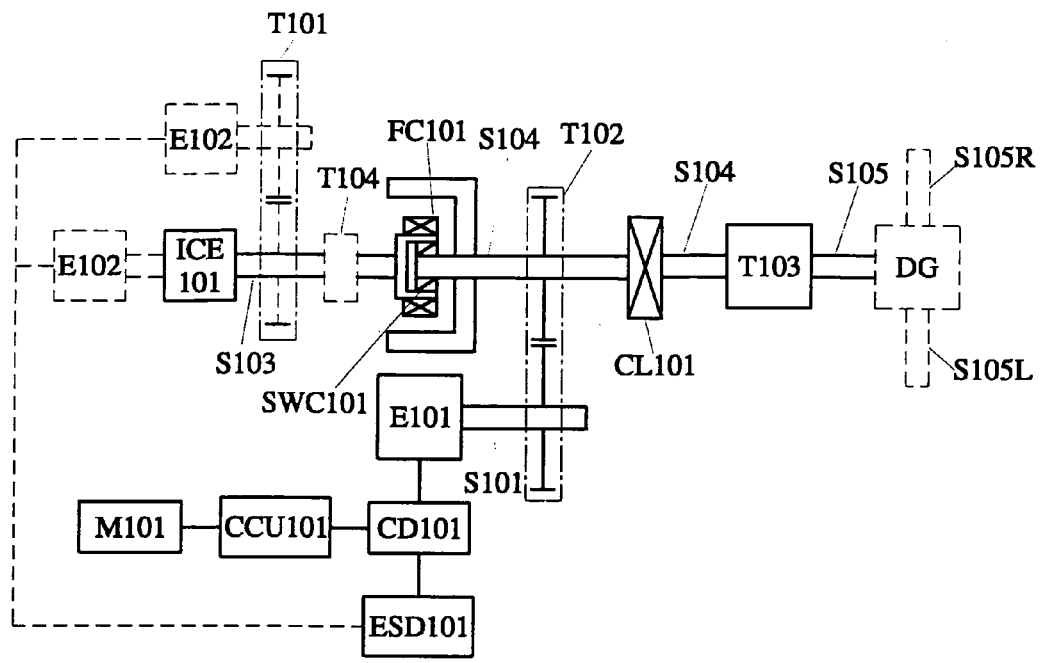
FIG. 46 is a view showing a first preferred embodiment of an application system of the preferred embodiment given in FIG. 38 in which the drive control is comprised of a centrifugal clutch provided in opposition to the acting direction and a one-way transmission mechanism with a selected steering direction.

FIG. 46 shows a first preferred embodiment of a drive application system of the present invention in which the centrifugal clutch from the preferred embodiment of FIG. 38 is provided in opposite directions and a one-way transmission mechanism is selected for steering operation. The centrifugal clutch FC101 is provided between the steering shaft S103 driven by the engine ICE101 and the load side steering shaft S104 to control the operation of coupling or interruption the transmission by both of the steering shafts S103 and S104. The steering shaft S103 driven by the engine ICE101 is coupled to the drive side of the centrifugal clutch FC101 and the load side steering shaft S104 is coupled to the driven side of the centrifugal clutch FC101. The one-way transmission mechanism SWC101 is provided between the drive steering shaft S103 and the load side steering shaft S104 driven by the engine ICE101 so that once the steering shaft S103, which is directly driven by the engine ICE101 or through transmission mechanism T104, reaches the preset rpm, it drives to close the centrifugal clutch FC101, thus to couple the load side steering shaft S104. The steering shaft S104 on the load side is provided to drive the load, and transmission mechanism T102 is provided on the steering shaft S104 on the load side to engage in mutual transmission with a primary dynamo-electric unit E101 while the other units comprising the system are the same as those provided in the preferred embodiment illustrated in FIG. 38.

The combination of those structures described above for the system are subject to control by the manual control interface M101, the central control unit CCU101, the drive control device CD101 and the storage discharging device ESD101. The system structure described above provides functions related to those described in subparagraphs (1) through (10) or other specific function, and also provides patterns related to those operation patterns described in A1 through A3 or other specific operation pattern.

Figure 47:
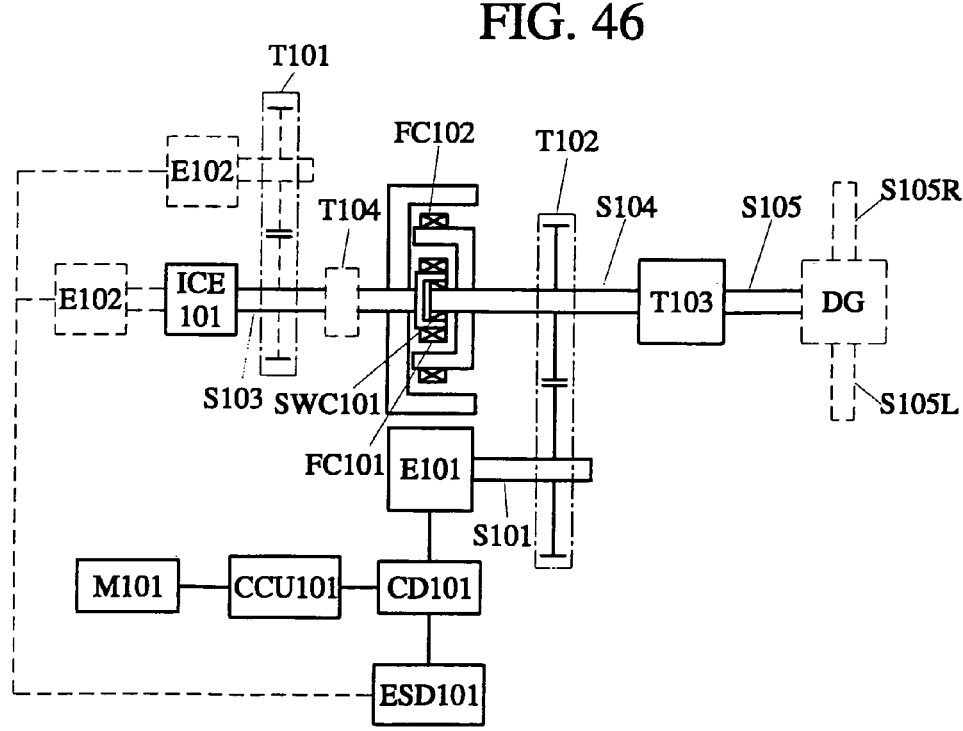
FIG. 47 is a view showing a second preferred embodiment of an application system of the preferred embodiment given in FIG. 39 in which the drive control is comprised of a centrifugal clutch provided in opposition to the acting direction and a one-way transmission mechanism with a selected steering direction.

FIG. 47 shows that a second preferred embodiment of a drive application system the present invention is comprised of having the centrifugal clutch from the preferred embodiment of FIG. 39 provided in opposite directions and a one-way to transmission mechanism selected for steering operation. The double-acting centrifugal clutches FC101 and FC102 are connected in series between the steering shaft S103 and the drive load side steering shaft S104 of the engine ICE101. The double-acting centrifugal clutches FC101 and FC102 form a 3-layer structure containing an inner layer, an intermediate layer and an outer layer as described above. The load side steering shaft S103 is either directly driven by the engine or driven through transmission mechanism T104 by the engine, and is coupled through the one-way transmission mechanism SWC101 selected for steering operation to the drive side of the centrifugal clutch FC101, the load side steering shaft S104 being coupled to the driven side of the centrifugal clutch FC101 so to forthwith close the centrifugal clutch FC101 and further to draw the load side steering shaft S104 when the load side steering shaft S104 reaches its preset rpm. Alternatively, transmission mechanism T102 is provided on the load side steering shaft S104 to engage in mutual transmission with the primary dynamo-electric unit E101; while the other units comprising the system are the same as those provided in the preferred embodiment illustrated in FIG. 39.

The combination of those structures described above for the system are subject to control by the manual control interface M101, the central control unit CCU101, the drive control device CD101 and the storage discharging device ESD101. The specific system structure described above provides functions related to those described in subparagraphs (1) through (10) or other specific function, and also provides patterns related to those operation patterns described in A1 through A3 or other specific operation pattern.

Figure 48:
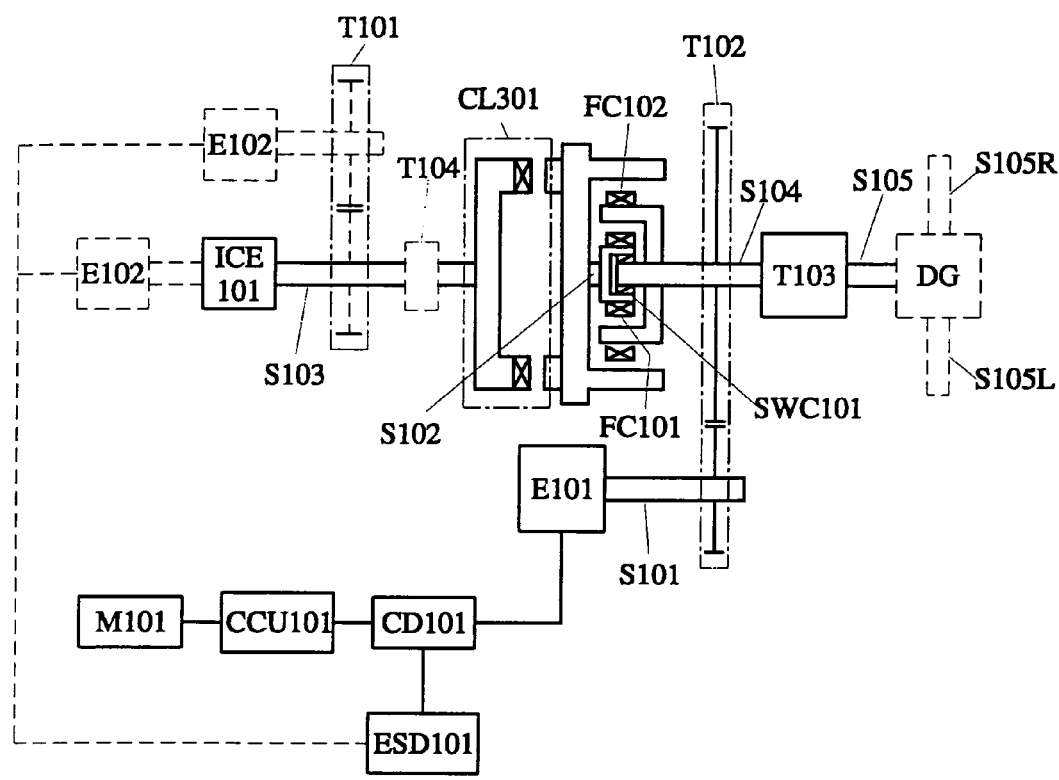
FIG. 48 is a view showing a third preferred embodiment of an application system of the preferred embodiment given in FIG. 40 in which the drive control is comprised of a centrifugal clutch provided in opposition to the acting direction and a one-way transmission mechanism with a selected steering direction.

FIG. 48 shows that a third preferred embodiment of a drive application system the present invention is comprised of having the centrifugal clutch from the preferred embodiment of FIG. 40 to be provided in opposite direction and a one-way transmission mechanism selected for steering operation. The output clutch CL301 controlled by manual, mechanical, electromagnetic or hydraulic force is alternatively provided between the steering shaft S103 on the side of the engine ICE101 and the double-acting centrifugal clutches between the drive side of the centrifugal clutch FC101 and the driven side of the centrifugal clutch FC102, while the other units comprising the system are the same as those provided in the preferred embodiment illustrated in FIG. 40.

The combination of those structures described above for the system are subject to control by the manual control interface M101, the central control unit CCU101, the drive control device CD101 and the storage discharging device ESD101. The specific system structure described above provides same functions same as those by the preferred embodiment illustrated in FIG. 47 when the output clutch CL301 is closed; and when the output clutch CL301 is disengaged, the specific system structure described above provides additional functions related to those described in subparagraphs (1) through (10) or other specific function, and also provides patterns related to those operation patterns described in A1 through A3 or other specific operation pattern.

Figure 49:
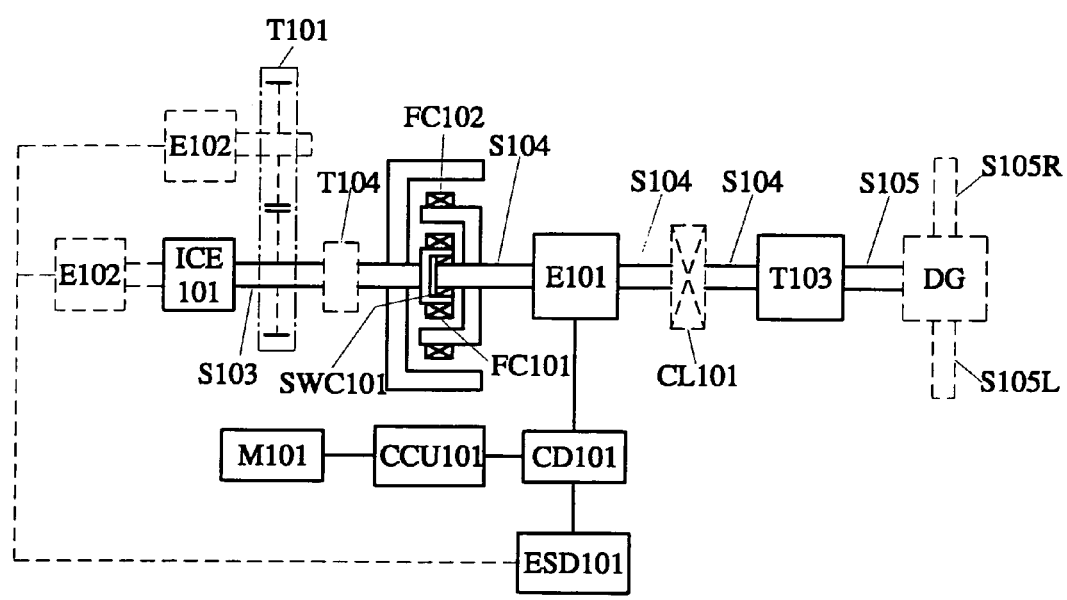
FIG. 49 is a view showing a variation of the preferred embodiment given in FIG. 41 in which the drive control is comprised of a centrifugal clutch provided in opposition to the acting direction and a one-way transmission mechanism with a selected steering direction.

FIG. 49 shows that a fourth preferred embodiment of a drive application system the present invention is comprised of having the centrifugal clutch from the preferred embodiment of FIG. 41 provided in an opposite direction and a one-way transmission mechanism selected for steering operation. The dynamo-electric unit E101 and the load side steering shaft S104 indicate a coaxial structure with the double-acting centrifugal clutches FC101 and FC102 provided between the dynamo-electric unit E101 and the engine ICE101. The intermediate structure is incorporated with the load side steering shaft S104 in the same structure of the output shaft of the primary dynamo-electric unit E101, and its inner and outer layers are incorporated to the engine steering shaft S103. The double acting centrifugal clutches FC101 and FC102 to form a 3-layer structure containing an inner layer, an intermediate layer and an outer layer as described above.

The engine ICE101 is either directly or, by means of the steering shaft S103, driven by transmission mechanism T104, and coupled to the drive side of the centrifugal clutch FC101 and the driven side of the other centrifugal clutch FC102. Meanwhile, the load side steering shaft S104 is coupled to the driven side of the centrifugal clutch FC101 and the drive side of the other centrifugal clutch FC102 so that when the load side steering to shaft S104 reaches its preset rpm, the other centrifugal clutch FC102 is closed to cause the steering shaft S103 to be driven by the engine ICE101. When the steering shaft S103 on the side of the engine ICE101 reaches its preset rpm, the centrifugal clutch FC101 is closed, thus causing the load side steering shaft S104 to drive the load. As required, the output clutch CL101 is provided between the output side of the primary dynamo-electric unit E101 and transmission mechanism T103. The output clutch CL101 is controlled by manual, mechanical, electromagnetic, hydraulic or centrifugal force while the other units comprising the system are the same as those provided in the preferred embodiment illustrated in FIG. 41.

The combination of those structures described above for the system are subject to control by the manual control interface M101, the central control unit CCU101, the drive control device CD101 and the storage discharging device ESD101. The specific system structure described above provides functions related to those described in subparagraphs (1) through (10) or other specific function, and also provides patterns related to those operation patterns described in A1 through A3 or other specific operation pattern.

Figure 50:
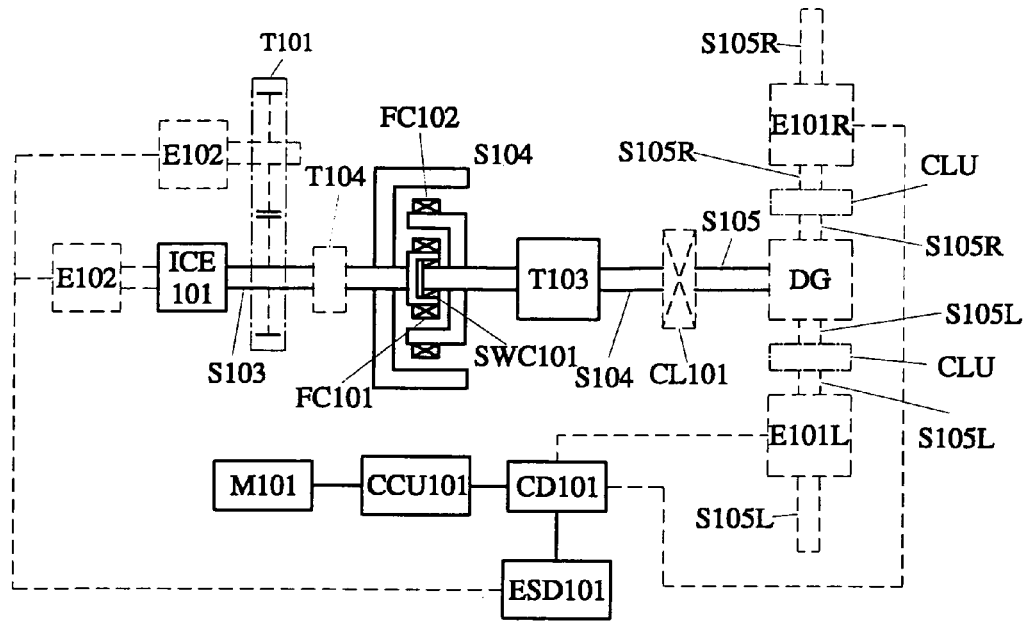
FIG. 50 is a view showing that the primary dynamo-electric unit in the preferred embodiment taken from FIG. 49 is replaced by two independent dynamo-electric units respectively provided by the side of two output shafts from the differential gear unit.

FIG. 50 is a schematic view showing that the primary dynamo-electric unit in the preferred embodiment taken from FIG. 49 is replaced by two independent dynamo-electric units respectively provided on the side of two output shafts of the differential gear set. The primary dynamo-electric unit E101 of the preferred embodiment in FIG. 49 is replaced by a primary dynamo-electric unit E101R to the right and another to primary dynamo-electric unit E101L on the left. The primary dynamo-electric unit E101R to the right is directly connected in series with the steering shaft S105R to the right of the differential gear set DG, or alternatively, adapted with a one-way or two-way clutch CLU before being connected in series to the steering shaft S105R to the right of the differential gear set DG. The other primary dynamo-electric unit E101L on the left is directly connected in series with a steering shaft S105L to the left of a differential gear set DG or alternatively adapted with a one-way or two-way clutch CLU before being connected in series to the steering shaft S105L to the left of the differential gear set DG. The steering shaft S104 on the load side of the centrifugal clutch FC101 is directly outputted to the steering shaft S105 of the differential gear set DG, or through transmission mechanism T103 before being outputted to the steering shaft S105 of the differential gear set DG, or alternatively, by means of the output clutch CL101, before being outputted to the steering shaft S105 of the differential gear set DG. Both the primary dynamo-electric unit E101R to the right and the other primary dynamo-electric unit E101L on the left are subject to equal speed or differential drive by a drive control device CD101.

Figure 51:
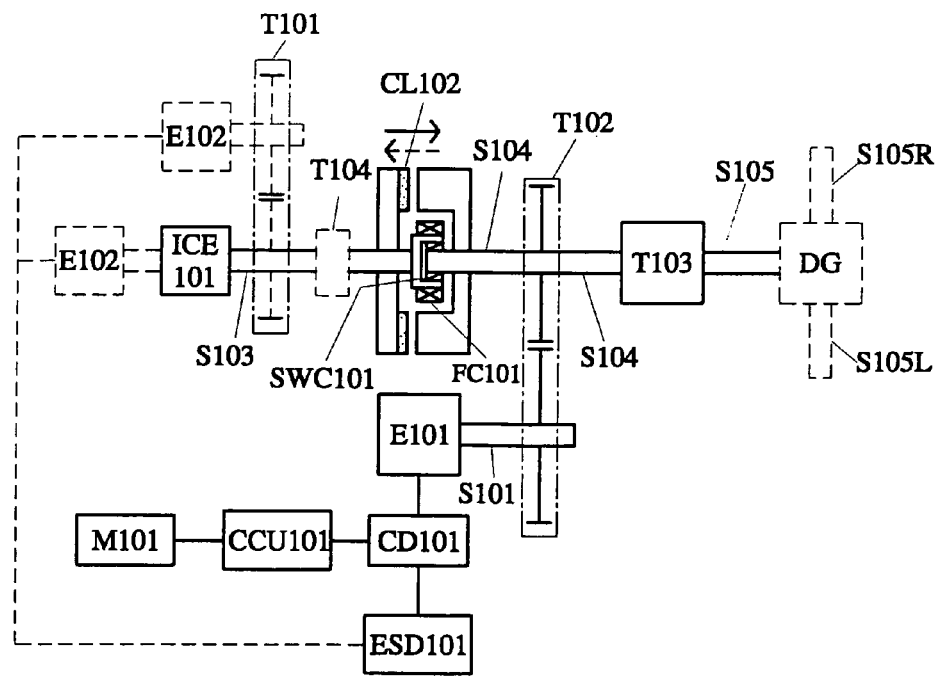
FIG. 51 is a view showing that the preferred embodiment of the present invention given in FIG. 46 is provided with a controllable clutch.

FIG. 51 shows that the preferred embodiment of FIG. 46 is provided with centrifugal clutch FC101 and another clutch CL102 provided between the engine steering shaft S103 and the load side steering shaft S104 so as to execute power coupling or interruption on both of the engine steering shaft S103 and the load side steering shaft S104. The steering shaft S103 is either directly driven by the engine ICE101, or through transmission mechanism T104, and is coupled to the drive side of the centrifugal clutch FC101 while the load side steering shaft S104 is coupled to the driven side of the centrifugal clutch FC101. That is, once the steering shaft S103 on the side of the engine ICE101 reaches the preset rpm, the centrifugal clutch FC101 is forthwith closed to couple the load side steering shaft S104. The centrifugal clutch FC101 and the controllable clutch CL102 are individually provided or share the same structure, while the other units comprising the system are the same as those provided in the preferred embodiment illustrated in FIG. 46.

The combination of those structures described above for the system are subject to control by the manual control interface M101, the central control unit CCU101, the drive control device CD101 and the storage discharging device ESD101. The specific system structure described above provides functions related to those described in subparagraphs (1) through (10) or other specific function, and also provides patterns related to those operation patterns described in A1 through A3 or other specific operation pattern.

Figure 52:
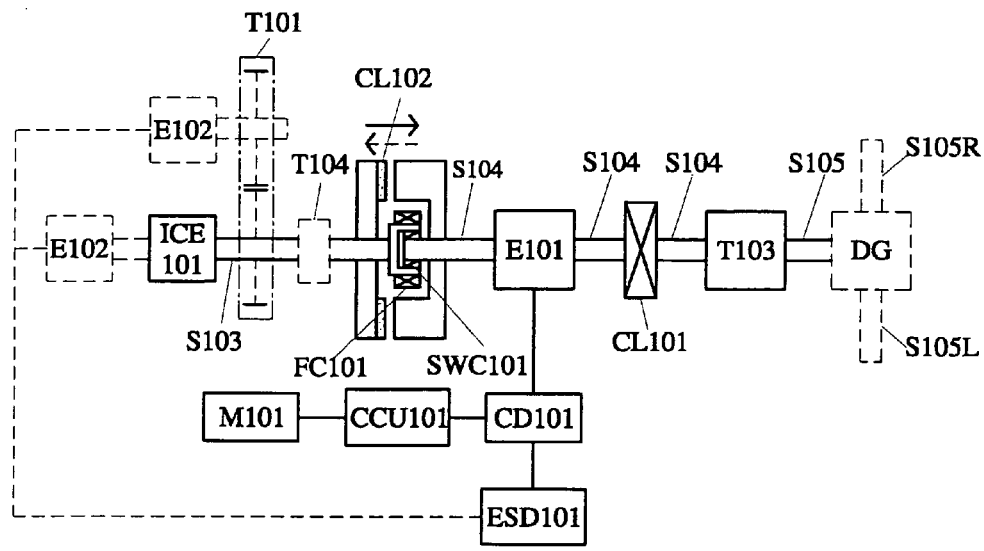
FIG. 52 is a view showing that the preferred embodiment of the present invention given in FIG. 51 is provided with an output clutch.

FIG. 52 shows that the preferred embodiment of FIG. 51 is provided with an output clutch CL101 disposed between the load side steering S104 driven by the primary dynamo-electric unit E101 and the load. When the output shaft CL101 is closed, it provides the same functions as those provided by the preferred embodiment given in FIG. 51; and when it is disengaged, the engine ICE101 simultaneously drives the primary dynamo-electric unit E101 and the secondary dynamo-electric unit E102 to operate as a generator or the primary dynamo-electric unit E101 is driven alone to operate as a generator and also provides additional functions related to those described in subparagraphs (1) through (10) or other specific function, and also provides patterns related to those operation patterns described in A1 through A3 or other specific operation pattern.

Figure 53:
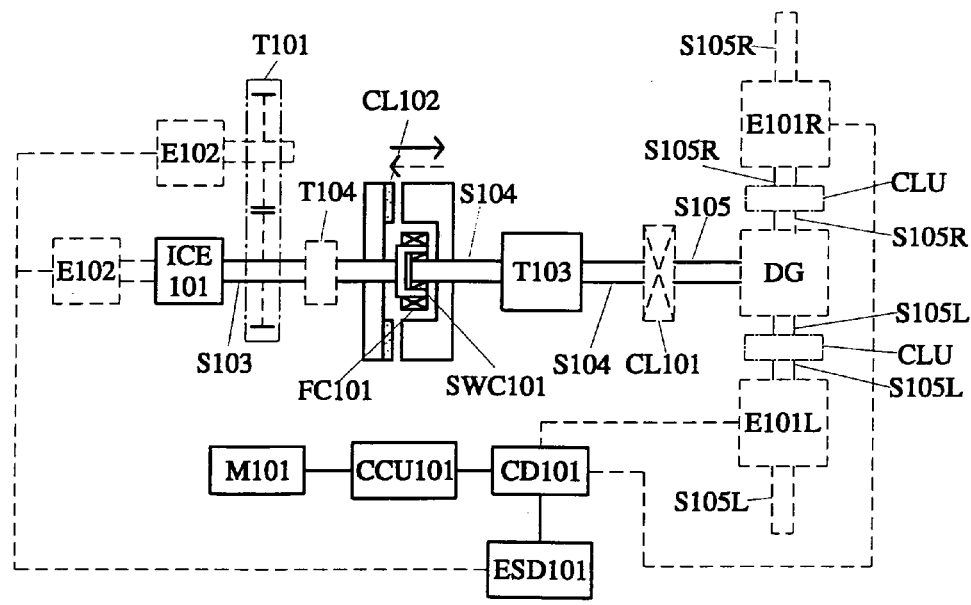
FIG. 53 is a view showing that the primary dynamo-electric unit in the preferred embodiment taken from FIG. 52 is replaced by two independent dynamo-electric units respectively provided by the side of two output shafts from the differential gear unit.

FIG. 53 is a schematic view showing that the primary dynamo-electric unit in the preferred embodiment taken from FIG. 52 is replaced by two independent dynamo-electric units respectively provided on the side of two output shafts of the differential gear set. The primary dynamo-electric unit E101 of the preferred embodiment in FIG. 52 is replaced by a primary dynamo-electric unit E101R to the right and another primary dynamo-electric unit E101L on the left. The primary dynamo-electric unit E101R to the right is directly connected in series with the steering shaft S105R to the right of the differential gear set DG, or alternatively adapted with a one-way or two-way clutch CLU before being connected in series to the steering shaft S105R to the right of the differential gear set DG. The other primary dynamo-electric unit E101L on the left is directly connected in series with a steering shaft S105L to the left of a differential gear set DG or alternatively adapted with a one-way or two-way clutch CLU before being connected in series to the steering shaft S105L to the left of the differential gear set DG. The steering shaft S104 on the load side of the centrifugal clutch FC101 is directly outputted to the steering shaft S105 of the differential gear set DG, or through the transmission mechanism T103, before being outputted to the steering shaft S105 of the differential gear set DG, or alternatively, by means of the output clutch CL101, before being outputted to the steering shaft S105 of the differential gear set DG. Both the primary dynamo-electric unit E101R to the right and the other primary dynamo-electric unit E101L on the left are subject to equal speed or differential drive by a drive control device CD101, while providing the same functions as those provided in the preferred embodiment illustrated in FIG. 52.

Figure 54:
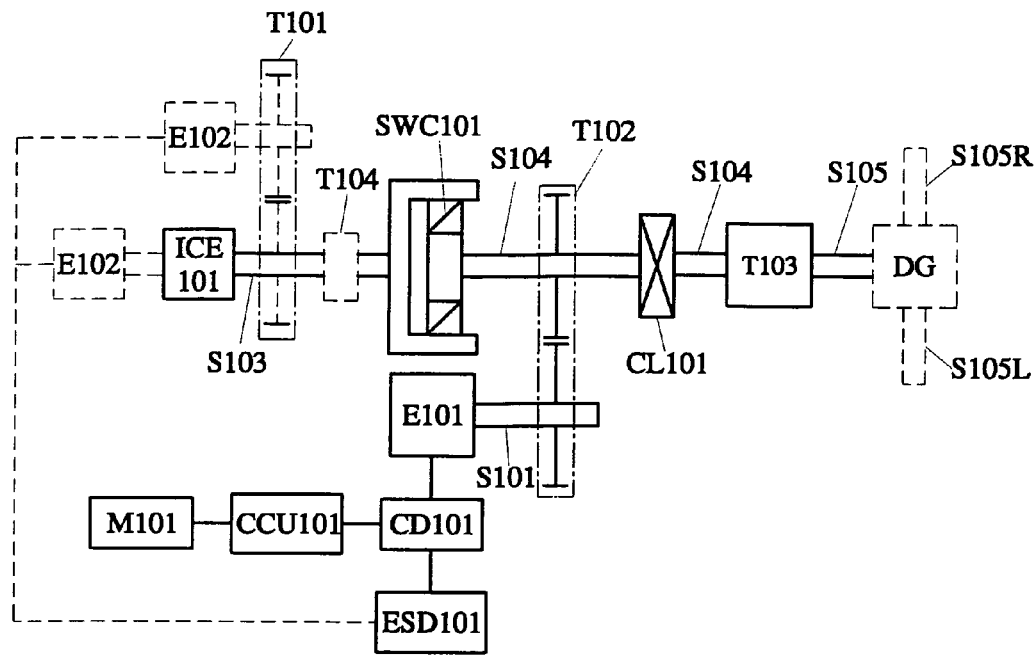
FIG. 54 is a view of a first preferred embodiment of an application system of the prevent invention having a one-way transmission mechanism as the drive control provided between the load side steering shaft and the engine power source.

FIG. 54 shows a first preferred embodiment of an application system that provides a one-way transmission mechanism between the load side steering shaft and the engine power source. The one-way transmission mechanism SWC101 is provided between the steering shaft S103 and the load side steering shaft S104 driven by the engine ICE101. When the rpm of the load side steering shaft S104 is higher than that of the steering shaft S103 driven directly by the engine ICE101 or through transmission mechanism T104, the one-way transmission mechanism SWC101 idles without transmitting rotational kinetic energy, and the rpm of the steering shaft S103 driven directly by the engine ICE101 or through transmission mechanism T104 is higher than that of the load side steering shaft S104. The rotational kinetic energy from the shaft S103 is transmitted through the one-way transmission mechanism SWC101 to the load side steering shaft S104. The load side steering shaft S104 is provided for driving the load and the steering shaft S103 is driven directly by the engine ICE101 or through transmission mechanism T102 provided on the load side steering shaft S104 to provide mutual transmission with the primary dynamo-electric unit E101 while the other units comprising the system are the same as those described in the preferred embodiment illustrated in FIG. 1.

The combination of those structures described above for the system are subject to control by the manual control interface M101, the central control unit CCU101, the drive control device CD101 and the storage discharging device ESD101. The specific system structure described above provides functions related to those described in subparagraphs (1) through (10) or other specific function, and also provides patterns related to those operation on patterns described in A1 through A3 or other specific operation pattern.

Figure 55:
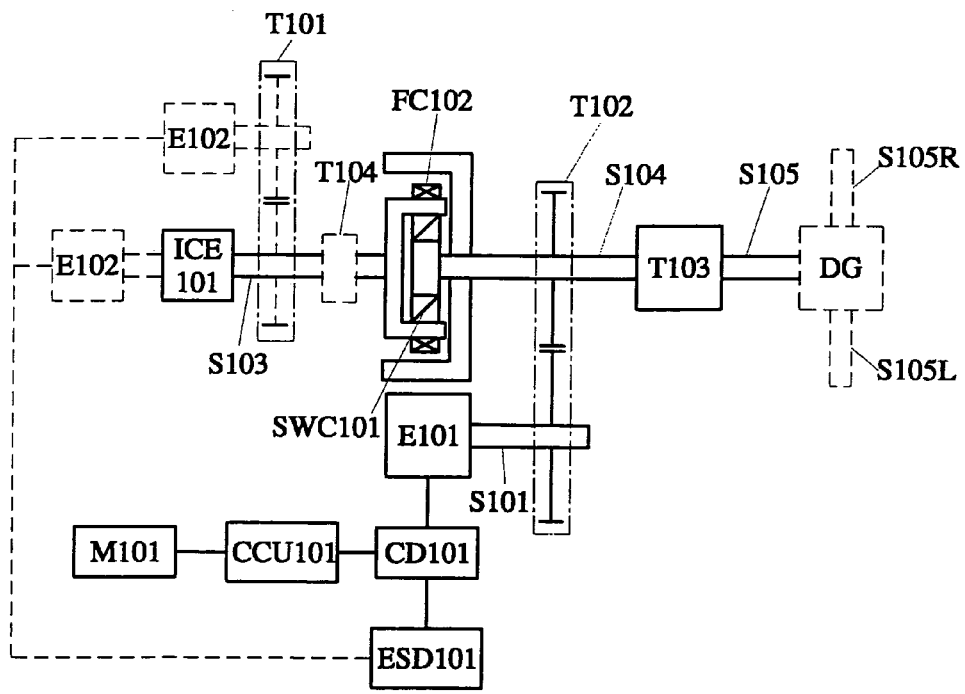
FIG. 55 is a view of a second preferred embodiment of an application system of the prevent invention having a one-way transmission mechanism as the drive control provided between the load side steering shaft and the engine power source.

FIG. 55 shows a second preferred embodiment of an application system that provides a one-way transmission mechanism between the load side steering shaft and the engine power source. The one-way transmission mechanism SWC101 and the centrifugal clutch FC102 are provided between the steering shaft S103 and the load side steering shaft S104 driven by the engine ICE101. The steering shaft S103 is driven directly by the engine ICE101 or through transmission mechanism T104 and is coupled to the drive side of the centrifugal clutch FC102, the load side steering shaft S104 being coupled to the driven side of the centrifugal clutch FC102 so that when the rpm of the load side steering shaft S104 is higher than that of the steering shaft S103 driven by the transmission mechanism T104, the one-way transmission mechanism SWC101 idles without transmitting rotational kinetic energy, and the rpm of the steering shaft S103 driven directly by the engine ICE101 or through transmission mechanism T104 is higher than that of the load side steering shaft S104. The rotational kinetic energy from the steering shaft S103 is transmitted through the one-way transmission mechanism SWC101 to the load side steering shaft S104. When the steering shaft S103 directly driven by engine ICE101, or through transmission mechanism or planetary transmission mechanism T104, reaches its preset rpm, the centrifugal clutch FC102 is forthwith closed to couple the load side steering shaft S104. Alternatively, the transmission mechanism T102 is provided on the load side steering shaft S104 to provide mutual transmission with the primary dynamo-electric unit E101 while the other units comprising the system are the same as those described in the preferred embodiment illustrated in FIG. 2.

The combination of those structures described above for the system are subject to control by the manual control interface M101, the central control unit CCU101, the drive control device CD101 and the storage discharging device ESD101. The specific system structure described above provides functions related to those described in subparagraphs (1) through (10) or other specific function, and also provides patterns related to those operation patterns described in A1 through A3 or other specific operation pattern.

Figure 56:
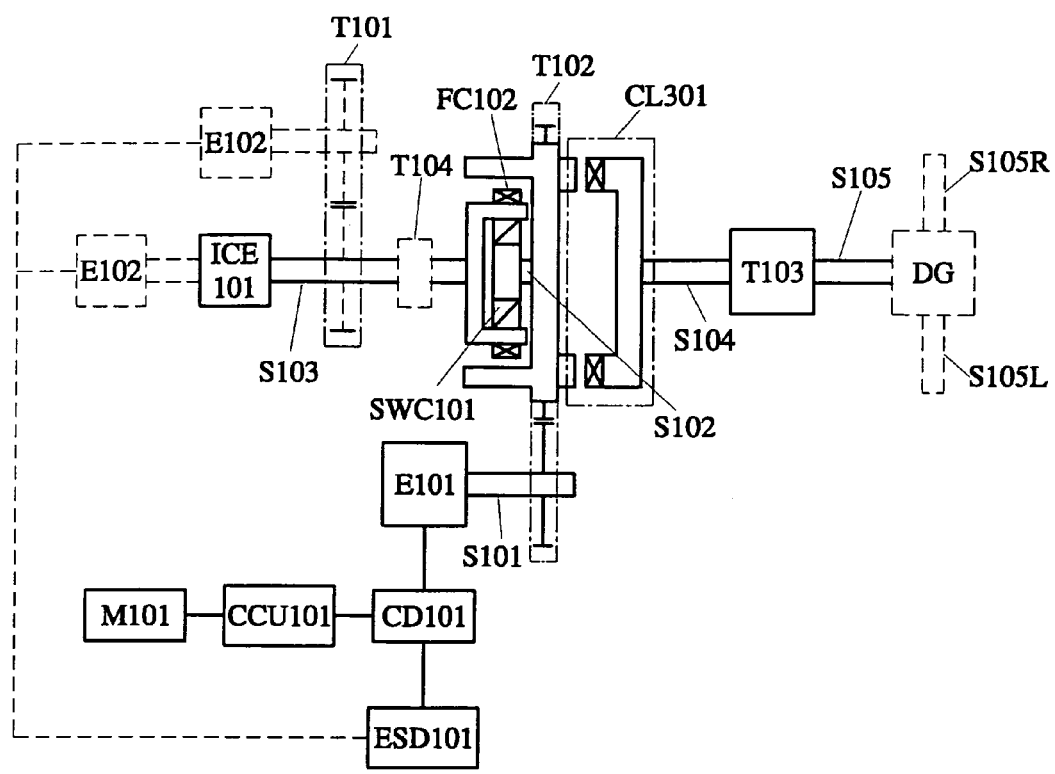
FIG. 56 is a view of a third preferred embodiment of an application system of the prevent invention having a one-way transmission mechanism as the drive control provided between the load side steering shaft and the engine power source.

FIG. 56 shows a third preferred embodiment of an application system that provides a one-way transmission mechanism between the load side steering shaft and the engine power source, in which the transmission mechanism T102 given in the preferred embodiment illustrated in FIG. 55 is joined to the intermediate steering shaft S102 with the coupling surface on the outer circumference on the driven side of the centrifugal clutch FC102. Its intermediate layer is provided with a drive power-locking unit acting outwardly when the centrifugal force reaches its preset value. The intermediate layer is coupled to the steering shaft S103 driven by the engine ICE101, and the one-way transmission mechanism SWC101 selected for steering operation is provided on the inner side to be coupled to the intermediate steering shaft S102 so to cut off the linkage to the load when the engine stops or runs at low rpm. The steering shaft S103 is directly driven or through the transmission mechanism T104, and is incorporated with the drive side of the centrifugal clutch FC102, and the intermediate steering shaft S102 being coupled to the driven side of the centrifugal clutch FC102 so that once the rpm of the intermediate steering shaft S102 is higher than that of the steering shaft S103 directly driven or driven through transmission mechanism T104, the one-way transmission mechanism SWC101 idles without transmitting rotational kinetic energy, and the rpm of the steering shaft S103 driven directly by the engine ICE101 or through transmission mechanism T104 is higher than that of the load side steering shaft S104. The rotational kinetic energy from the steering shaft S103 is transmitted through the one-way transmission mechanism SWC101 to the intermediate steering shaft S102. The intermediate steering shaft S102 is directly outputted to the load, or alternatively via the load side steering shaft S104 before being outputted to the load by means of optional output clutch CL301; or alternatively, via the steering shaft S105 for single axial output by means of the variable speed ration or variable transmission mechanism or transmission mechanism T102; or alternatively, through two units of differential steering shafts S105R and S105L for differential output by means of the transmission mechanism comprised of the differential gear set DG. The optional output clutch CL301 may be provided between the intermediate steering shaft S102, as described above, drawn by the power-locking coupling surface on the outer circumference of the centrifugal clutch FC102 and the load side steering shaft S104.

The intermediate steering shaft S102 is directly outputted to the load, or alternatively, to output clutch CL301 before being outputted to the load; or as required, executes single shaft output through transmission mechanism T103, then through a steering shaft S105; or an optional transmission mechanism comprised of a differential gear set DG for differential output through two units of differential steering shafts S105R and S105L. The additional output clutch CL301 is provided between the intermediate steering shaft S102 and the load side steering shaft S104 with both steering shafts driven by the power-locking coupling surfaces on the inner and outer circumferences of the double-acting centrifugal clutches FC101 and FC102, while the other unit comprising the system are the same with those described in the preferred embodiment illustrated in FIG. 3.

The combination of those structures described above for the system are subject to control by the manual control interface M101, the central control unit CCU101, the drive control device CD101 and the storage discharging device ESD101. The specific system structure described above provides functions same as those by the preferred embodiment given in FIG. 55 when the output clutch CL301 is closed; and when the output clutch CL301 is disengaged, and provides functions related to those described in subparagraphs (1) through (10) or other specific function, it also provides patterns related to those operation patterns described in A1 through A3 or other specific operation pattern.

Figure 57:
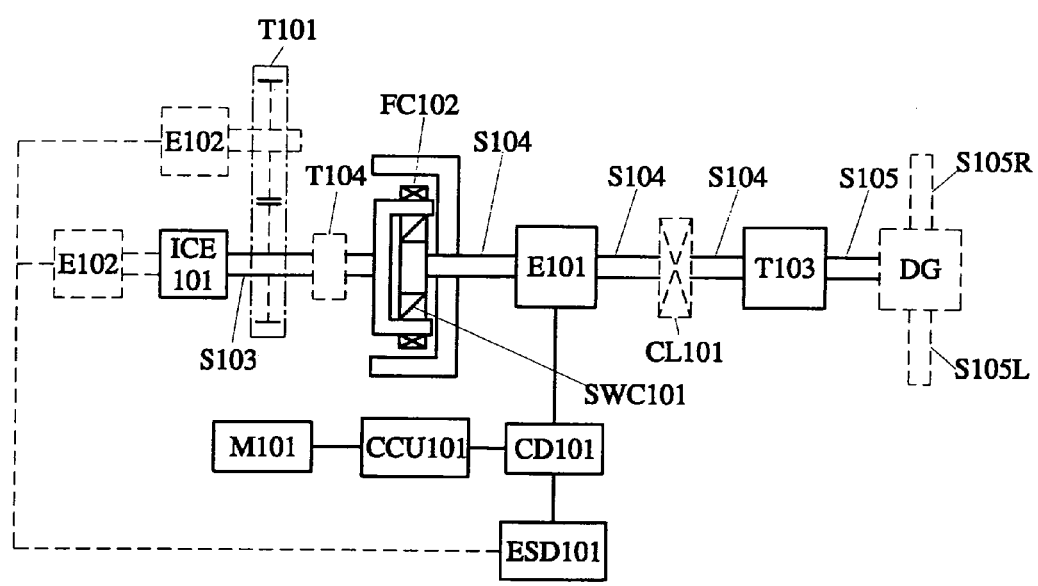
FIG. 57 is a view of a fourth preferred embodiment of an application system of the prevent invention having a one-way transmission mechanism as the drive control provided between the load side steering shaft and the engine-power source.

FIG. 57 shows a fourth preferred embodiment of an application system that provides a one-way transmission mechanism between the load side steering shaft and the engine power source. The dynamo-electric unit E101 and the load side steering shaft S104 form a coaxial structure and the centrifugal clutch FC102 is provided between the primary dynamo-electric unit E101 and the engine ICE101. The driven side of the centrifugal clutch FC102 is incorporated to the load side steering shaft S104 coupled to the output shaft of the primary dynamo-electric unit E101 and the drive side of the centrifugal clutch FC102 is coupled to the steering shaft S103 driven by the engine ICE101. The one-way transmission mechanism SWC101 selected for steering operation is provided between the steering shaft S103 and the load side steering shaft S104. The drive side is provided with a drive power-locking unit acting outwardly once the centrifugal force reaches its preset value to provide the function of an output clutch jointly with the inner circumference coupling surface for power-locking on the driven side. The engine ICE101 is directly incorporated or drive through the steering shaft S103 by transmission mechanism T104, into the drive side of the centrifugal clutch FC101 while the load side steering shaft S104 is incorporated into the driven side of the centrifugal clutch FC101 so that once the rpm of the steering shaft S103 driven by the engine ICE101 is higher than that of the load side steering shaft S104, rotational kinetic energy from the engine ICE101 drives the load side steering shaft S104 by means of the transmission from the one-way transmission mechanism SWC101, or when the steering shaft S103 driven by the engine ICE101 reaches its preset rpm, the centrifugal clutch FC102 is closed to couple the engine ICE101 and the load side steering side S104. As required, the output clutch CL101 is provided between the output side of the primary dynamo-electric unit E101 and the transmission mechanism T103. The output clutch CL101 is controlled by manual, mechanism, electromagnetic, hydraulic or centrifugal force while the other units comprising the system are the same as those described in the preferred embodiment illustrated in FIG. 4.

The combination of those structures described above for the system are subject to control by the manual control interface M101, the central control unit CCU101, the drive control device CD101 and the storage discharging device ESD101. The specific system structure described above provides functions related to those described in subparagraphs (1) through (10) or other specific function, and also provides patterns related to those operation patterns described in A1 through A3 or other specific operation pattern.

Figure 58:
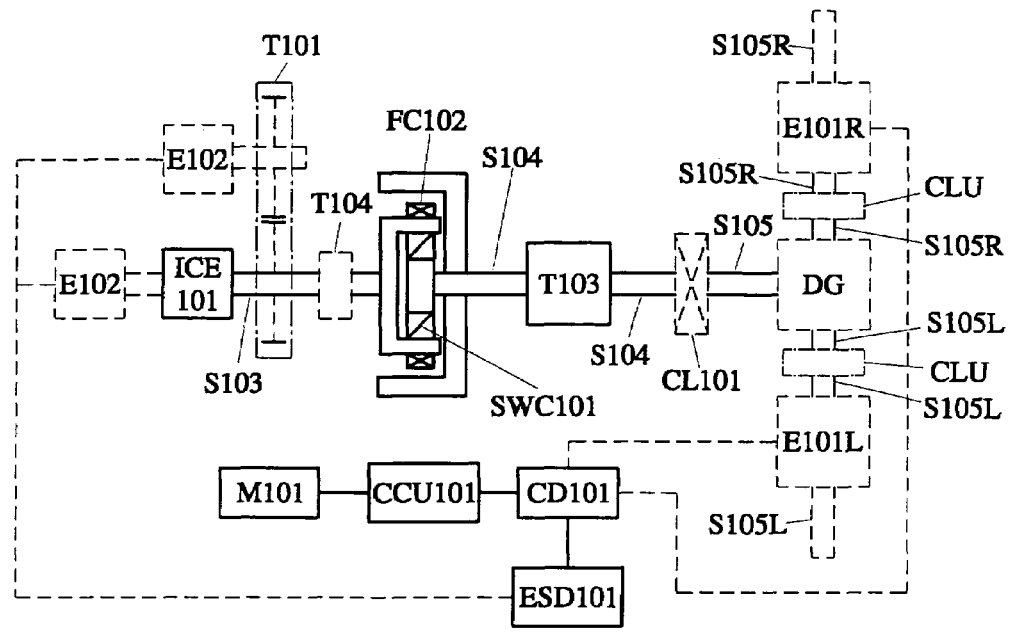
FIG. 58 is a view showing that the primary dynamo-electric unit in the preferred embodiment taken from FIG. 57 is replaced by two independent dynamo-electric units respectively provided by the side of two output shafts from the differential to gear unit.

FIG. 58 is a schematic view showing that the primary dynamo-electric unit in the preferred embodiment taken from FIG. 57 is replaced by two independent dynamo-electric units respectively provided on the side of two output shafts of the differential gear set. The primary dynamo-electric unit E101 of the preferred embodiment in FIG. 57 is replaced by a primary dynamo-electric unit E101R to the right and another primary dynamo-electric unit E101L on the left. The primary dynamo-electric unit E101R to the right is directly connected in series with the steering shaft S105R to the right of the differential gear set DG, or alternatively adapted with a one-way or two-way clutch CLU before being connected in series to the steering shaft S105R to the right of the differential gear set DG. The other primary dynamo-electric unit E101L on the left is directly connected in series with a steering shaft S105L to the left of a differential gear set DG or alternatively adapted with a one-way or two-way clutch CLU before being connected in series to the steering shaft S105L to the left of the differential gear set DG. The load side steering shaft S104 coaxial with the primary dynamo-electric unit E101 is driven by the controllable clutch CL102 and directly outputted to the steering shaft S105 of the differential gear set DG, or through transmission mechanism T103, before being outputted to the steering shaft S105 of the differential gear set DG, or alternatively, by means of the output clutch CL101, before being outputted to the steering shaft S105 of the differential gear set DG. Both of the primary dynamo-electric unit E101R to the right and the other primary dynamo-electric unit E101L on the left are subject to equal speed or differential drive by a drive control device CD101.

Figure 59:
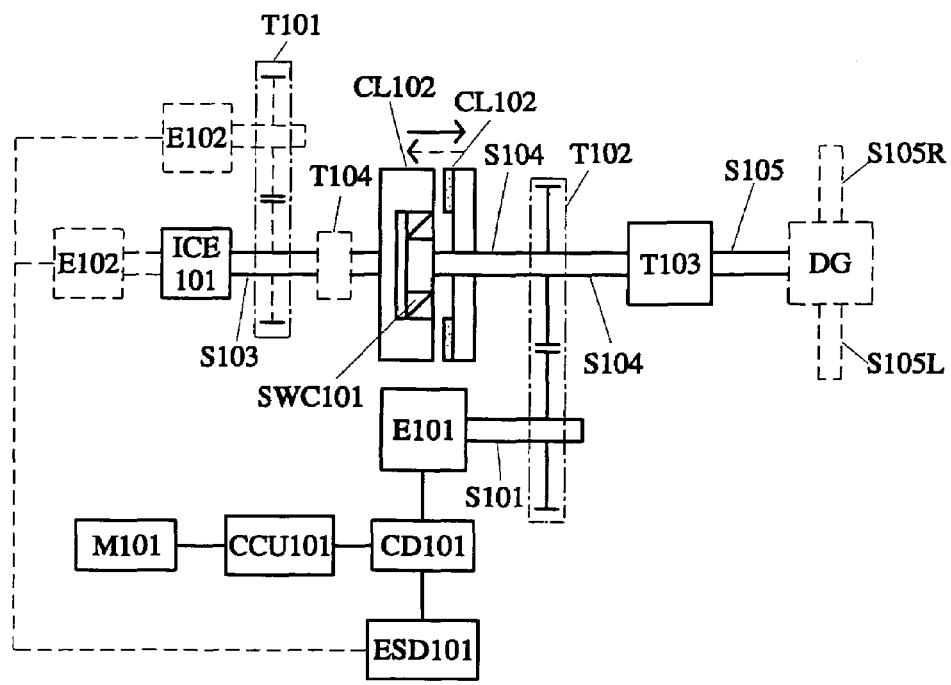
FIG. 59 is a view showing that the preferred embodiment of the present invention given in FIG. 54 is provided with a controllable clutch.

FIG. 59 shows that the preferred embodiment illustrated in FIG. 54 of the present invention is provided with a power-locking type or hydraulic coupling type controllable clutch CL102, clutch CL102, and the one-way transmission mechanism SWC101 selected for steering operation of the preferred embodiment in FIG. 54 being provided between the engine steering shaft S103 and the load side steering shaft S104 so to execute power coupling or interruption on both of the engine steering shaft S103 and the load side steering shaft S104. In turn, the system is provided with power-locking or hydraulic coupling type controllable clutch CL102 and the engine throttle to obtain another specific function of the load driven by the rotation power from the engine so that when the rpm of the load side steering shaft S104 is higher than that of the steering shaft S103 driven by the engine ICE101 and the one-way transmission mechanism SWC101 is idling, or the rpm of the steering shaft S103 is higher than that of the load side steering shaft S104, the engine ICE101 drives the output steering shaft S104 while the other units comprising the system are the same as those described in the preferred embodiment illustrated in FIG. 54.

The combination of those structures described above for the system are subject to control by the manual control interface M101, the central control unit CCU101, the drive control device CD101 and the storage discharging device ESD101 The specific system structure described above provides functions related to those described in subparagraphs (1) through (10) or other specific function, and also provides patterns related to those operation patterns described in A1 through A3 or other specific operation pattern.

Figure 60:
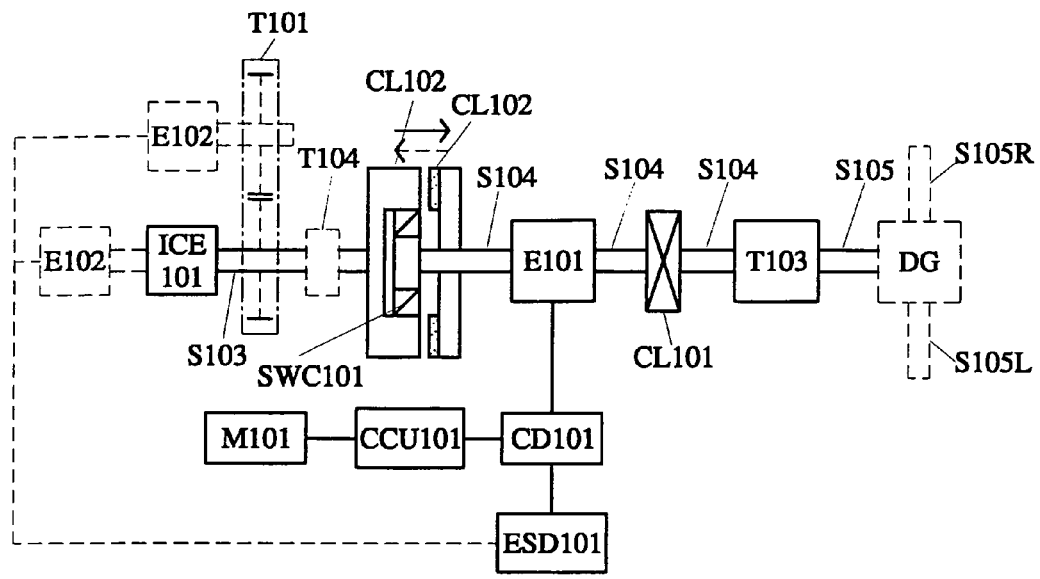
FIG. 60 is a view showing that the preferred embodiment 15 of the present invention given in FIG. 59 is provided with an output clutch.

FIG. 60 shows that the preferred embodiment taken from FIG. 59 of the present invention is provided with an output clutch CL101 controlled by manual, mechanical, electromagnetic, hydraulic or centrifugal force. The output clutch CL101 is provided between the load side steering shaft S104 driven by the primary dynamo-electric unit E101 and the load. When the output clutch CL101 is closed, it provides the same functions as provided by the preferred embodiment in FIG. 59. When the output clutch CL101 is disengaged, it provides additional functions including that it is separated from the load and leaves the engine ICE101 to simultaneously drive both of the primary dynamo-electric unit and the secondary dynamo-electric unit E102 to operate as a generator, or the primary dynamo-electric unit E101 is driven alone to operate as a generator, and provide functions related to those described in subparagraphs (1) through (10) or other specific function, and also provide patterns related to those operation patterns described in A1 through A3 or other specific operation pattern.

Figure 61:
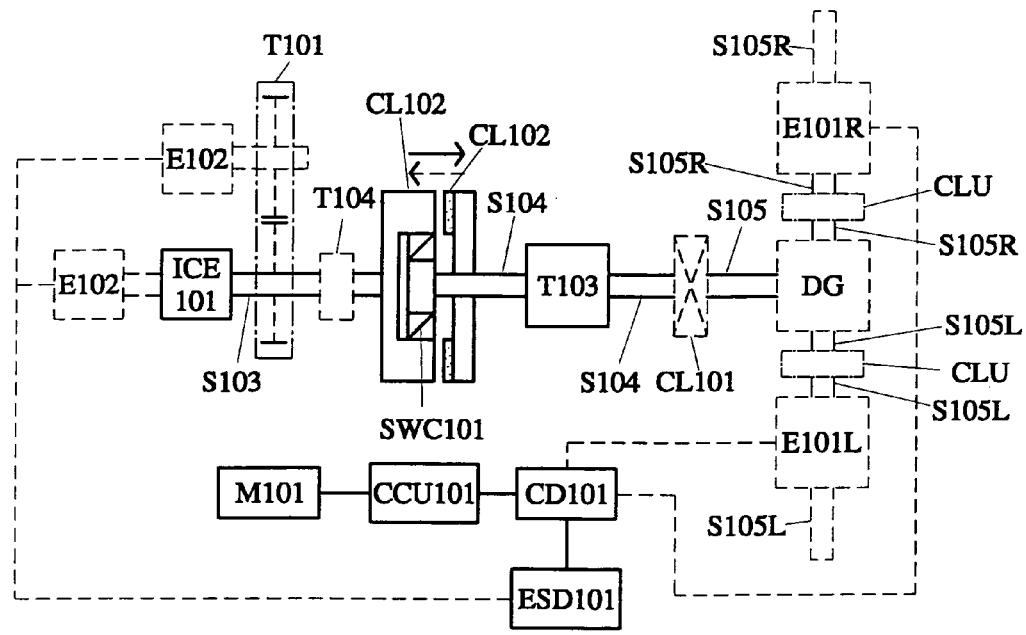
FIG. 61 is a view showing that the primary dynamo-electric unit in the preferred embodiment taken from FIG. 60 is replaced by two independent dynamo-electric units respectively provided by the side of two output shafts from the differential gear unit.

FIG. 61 is a schematic view showing that the primary dynamo-electric unit in the preferred embodiment taken from FIG. 60 is replaced by two independent dynamo-electric units respectively provided on the side of two output shafts of the differential gear set. The primary dynamo-electric unit E101 of the preferred embodiment in FIG. 60 is replaced by a primary dynamo-electric unit E101R to the right and another primary dynamo-electric unit E101L on the left. The primary dynamo-electric unit E101R to the right is directly connected in series with the steering shaft S105R to the right of the differential gear set DG, or alternatively adapted with a one-way or two-way clutch CLU before being connected in series to the steering shaft S105R to the right of the differential gear set DG. The other primary dynamo-electric unit E101L on the left is directly connected in series with a steering shaft S105L to the left of a differential gear set DG or alternatively adapted with a one-way or two-way clutch CLU before being connected in series to the steering shaft S105L to the left of the differential gear set DG. The load side steering shaft S104 is coaxial with the primary dynamo-electric unit E101 driven by the controllable clutch CL102 and is directly outputted to the steering shaft S105 of the differential gear set DG, or through the transmission mechanism T103, before being outputted to the steering shaft S105 of the differential gear set DG, or alternatively, by means of the output clutch CL101, before being outputted to the steering shaft S105 of the differential gear set DG. Both the primary dynamo-electric unit E101R to the right and the other primary dynamo-electric unit E101L on the left are subject to equal speed or differential drive by a drive control device CD101 having the same functions as those provided by the preferred embodiment in FIG. 60.

In the system, for those preferred embodiments illustrated in FIGS. 1–8, 22–37 and 39–61, the load is driven by the output directly from the steering shaft S103 or via the variable steering or planetary transmission mechanism T104 with fixed or variable speed ratio; and the originally disclosed load side steering shaft S104 is provided to be directly coupled, or coupled through the variable steering or planetary transmission mechanism T102 with fixed or variable speed ratio, to the primary dynamo-electric unit E101. Meanwhile, the output clutch CL101 driven by the load side steering shaft S104, the variable steering or planetary transmission mechanism T103 with fixed or variable speed ratio, and the load side device of the differential gear set DG can be all or partially reserved or removed.

Furthermore, in each of those preferred embodiments illustrated in FIGS. 1–61, the load is driven by the output directly from the steering shaft S103 or via the variable steering or planetary transmission mechanism T104 with fixed or variable speed ratio, and the primary dynamo-electric unit E101 driven by the engine ICE101 operates as a generator; or the electric energy generated by the secondary dynamo-electric unit E102, which is driven directly by the electric energy from the storage discharging ESD101, by the engine, or by the output directly from the steering shaft S103, or via the variable steering or planetary transmission mechanism T101 with fixed or variable speed ratio, is controlled by the manual control interface M101, the central control unit CCU101, the drive control device CD101 for the primary dynamo-electric unit E101 to operate as a motor, thus to start the engine ICE101, or drive only the load with or without the engine ICE101.

As disclosed above, the drive motor speed controlled compound power system and its devices are characterized in that through the control of the operation of the engine ICE101 and the operation of both of the primary and the secondary dynamo-electric units E101 and E102 to function as a motor or a generator in conjunction with the primary centrifugal clutch FC101 or the secondary centrifugal clutch FC102, the one-way transmission mechanism SWC101 and other optional peripherals, subject to the control by the manual control interface M101, the central control unit CCU101, and the drive control device CD101, a variety of diversified operational functions are created that are both innovative and practical.

I claim:

1. A speed-controlled dynamo-electric compound system, comprising:
   at least one primary dynamo-electric unit (E101) arranged to rotate a shaft (S104 and/or S105);
   a first centrifugal clutch (FC101) having a driving side connected to the shaft (S104 and/or S105) and a driven side connected to an engine (ICE101), wherein rotation of said dynamo-electric unit at a preset speed causes said driving side of the first centrifugal clutch to engage said driven side and thereby connect said engine (ICE101) to said shaft (S104 and/or S105);
   a transmission mechanism for connecting said primary dynamo-electric unit to said shaft;
   a transmission mechanism for connecting said engine to said secondary dynamo-electric unit;
   a load connected to said shaft (S104 and/or S105) through an output device; and
   a second centrifugal clutch (FC102) arranged to engage said load when a speed of said engine is above a preset value, and to disengage said load when a speed of said engine is below a preset value.

2. A speed-controlled dynamo-electric compound system as claimed in claim 1, wherein said first and second centrifugal clutches form a three-layer structure including an inner layer, an intermediate layer, and an outer layer, and wherein said intermediate layer is connected to said engine and said inner layer is connected to said shaft, said inner layer expanding outwardly to engage said intermediate layer when said primary dynamo-electric unit exceeds said preset speed, and said intermediate layer acting outwardly to engage an inner surface of said outer layer when a speed of said engine exceeds said preset value.

3. A speed-controlled dynamo-electric compound system as claimed in claim 1, wherein said output device comprises an output clutch.

4. A speed-controlled dynamo-electric compound system as claimed in claim 1, wherein said output device comprises an output transmission mechanism and an output clutch.

5. A speed-controlled dynamo-electric compound system as claimed in claim 1, further comprising a shaft connected to said output device, and a differential gear set connected to said shaft.

6. A speed-controlled dynamo-electric compound system as claimed in claim 5, further comprising a plurality of differential shafts connected to said differential gear set.

7. A speed-controlled dynamo-electric compound system, comprising:
- at least one primary dynamo-electric unit (E101) arranged to rotate a shaft (S104 and/or S105);
- a first centrifugal clutch (FC101) having a driving side connected to the shaft (S104 and/or S105) and a driven side connected to an engine (ICE101), wherein rotation of said dynamo-electric unit at a preset speed causes said driving side of the first centrifugal clutch to engage said driven side and thereby connect said engine (ICE101) to said shaft (S104 and/or S105);
- a load connected to said shaft (S104 and/or S105) through an output device; and
- a second centrifugal clutch (FC102) arranged to engage said load when a speed of said engine is above a preset value, and to disengage said load when a speed of said engine is below a preset value;
- a secondary dynamo-electric unit (E102) coupled to said engine (ICE101);
- an electrical energy storage device (ESD101) connected to said secondary dynamo-electric unit (E102) and said primary dynamo-electric unit (E101); and
- a controller,
- wherein when said primary dynamo-electric unit (E101) is supplied with electricity from said electrical energy storage device (ESD101) and caused to rotate at below said preset speed, said dynamo-electric unit drives said shaft (S104 and/or S105) to selectively drive said output device, and when said primary dynamo-electric unit (E101) is caused to rotate at above said preset speed, said driving side of said first centrifugal clutch (FC101) engages said driven side, thereby connecting said engine (ICE101) to said primary dynamo-electric unit (E101),
- wherein said controller includes a central control unit (CCU101), a drive control device (CD101) connected to said primary and secondary dynamo-electric units, and a manual control interface (M101), said drive control device (CD101) being arranged to control a speed of said primary dynamo-electric unit (E101), and further to control whether said primary and secondary dynamo-electric units function as motors, or generators, or one of each.

8. A speed-controlled dynamo-electric compound system, comprising:
- at least one primary dynamo-electric unit (E101) arranged to rotate a shaft (S104 and/or S105);
- a first centrifugal clutch (FC101) having a driving side connected to the shaft (S104 and/or S105) and a driven side connected to an engine (ICE101), wherein rotation of said dynamo-electric unit at a preset speed causes said driving side of the first centrifugal clutch to engage said driven side and thereby connect said engine (ICE101) to said shaft (S104 and/or S105);
- a load connected to said shaft (S104 and/or S105) through an output device; and
- a second centrifugal clutch (FC102) arranged to engage said load when a speed of said engine is above a preset value, and to disengage said load when a speed of said engine is below a preset value,
- wherein said first and second centrifugal clutches form a three-layer structure including an inner layer, an intermediate layer, and an outer layer, and wherein said intermediate layer is connected to said engine and said inner layer is connected to said shaft, said inner layer expanding outwardly to engage said intermediate layer when said primary dynamo-electric unit exceeds said preset speed, and said intermediate layer acting outwardly to engage an inner surface of said outer layer when a speed of said engine exceeds said preset value; and
- further comprising a transmission mechanism connected between said engine and said intermediate layer.

9. A speed-controlled dynamo-electric compound system as claimed in claim 8, further comprising a transmission mechanism connected between said outer layer and said primary dynamo-electric unit.

10. A speed-controlled dynamo-electric compound system as claimed in claim 8, further comprising an output clutch connected between said outer layer and said shaft.

11. A speed-controlled dynamo-electric compound system, comprising:
- at least one primary dynamo-electric unit (E101) arranged to rotate a shaft (S104 and/or S105);
- a first centrifugal clutch (FC101) having a driving side connected to the shaft (S104 and/or S105) and a driven side connected to an engine (ICE101), wherein rotation of said dynamo-electric unit at a preset speed causes said driving side of the first centrifugal clutch to engage said driven side and thereby connect said engine (ICE101) to said shaft (S104 and/or S105);
- a load connected to said shaft (S104 and/or S105) through an output device;
- a second centrifugal clutch (FC102) arranged to engage said load when a speed of said engine is above a preset value, and to disengage said load when a speed of said engine is below a preset value; and
- an output clutch connected between the driven side of said first centrifugal clutch and said load.

12. A speed-controlled dynamo-electric compound system, comprising:
- at least one primary dynamo-electric unit (E101) arranged to rotate a shaft (S104 and/or S105);
- a first centrifugal clutch (FC101) having a driving side connected to the shaft (S104 and/or S105) and a driven side connected to an engine (ICE101), wherein rotation of said dynamo-electric unit at a preset speed causes said driving side of the first centrifugal clutch to engage said driven side and thereby connect said engine (ICE101) to said shaft (S104 and/or S105);
- a load connected to said shaft (S104 and/or S105) through an output device; and
- a second centrifugal clutch (FC102) arranged to engage said load when a speed of said engine is above a preset value, and to disengage said load when a speed of said engine is below a preset value,
- wherein said first and second centrifugal clutches form a three-layer structure including an inner layer, and intermediate layer, and an outer layer, and wherein said intermediate layer is connected to said shaft and said inner layer is connected to said engine, said inner layer expanding outwardly to engage said intermediate layer when a speed of said engine exceeds said preset value, and said intermediate layer acting outwardly to engage an inner surface of said outer layer when said primary dynamo-electric unit exceeds said preset speed.

13. A speed-controlled dynamo-electric compound system as claimed in claim 12, further comprising a transmission mechanism connected between said engine and said inner layer.

14. A speed-controlled dynamo-electric compound system as claimed in claim 12, further comprising a clutch (CL301) connected between said outer layer and said engine, said outer and inner layers being fixed to each other.

15. A speed-controlled dynamo-electric compound system, comprising:
- at least one primary dynamo-electric unit (E101) arranged to rotate a shaft (S104 and/or S105);
- a first centrifugal clutch (FC101) having a driving side connected to the shaft (S104 and/or S105) and a driven side connected to an engine (ICE101), wherein rotation of said dynamo-electric unit at a preset speed causes said driving side of the first centrifugal clutch to engage said driven side and thereby connect said engine (ICE101) to said shaft (S104 and/or S105);
- a load connected to said shaft (S104 and/or S105) through an output device;
- a second centrifugal clutch (FC102) arranged to engage said load when a speed of said engine is above a preset value, and to disengage said load when a speed of said engine is below a preset value; and
- a transmission mechanism connected between said first centrifugal clutch and said engine.

\* \* \* \* \*